(12) United States Patent
Liao et al.

(10) Patent No.: US 12,047,521 B2
(45) Date of Patent: Jul. 23, 2024

(54) ROTATION SHAFT STRUCTURE AND ELECTRONIC DEVICE

(71) Applicant: HUAWEI TECHNOLOGIES CO., LTD., Guangdong (CN)

(72) Inventors: Changliang Liao, Dongguan (CN); Weifeng Wu, Dongguan (CN); Li Liao, Dongguan (CN); Kenji Nagai, Yokohama (JP); Ding Zhong, Dongguan (CN); Qiao Deng, Yokohama (JP); Tao Huang, Dongguan (CN); Qiang Zhan, Shanghai (CN); Haiqiang Tian, Dongguan (CN); Yuehua Hu, Dongguan (CN); Feng Zhao, Dongguan (CN); Gang Wang, Dongguan (CN); Bo Huang, Shanghai (CN); Zhixiao Xu, Shanghai (CN); Shangyun Wang, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 223 days.

(21) Appl. No.: 17/837,965

(22) Filed: Jun. 10, 2022

(65) Prior Publication Data

US 2022/0303371 A1    Sep. 22, 2022

Related U.S. Application Data

(63) Continuation of application No. PCT/CN2020/135961, filed on Dec. 11, 2020.

(30) Foreign Application Priority Data

Dec. 13, 2019 (CN) .......................... 201911286336.8
Jan. 19, 2020 (CN) .......................... 202010059260.1

(Continued)

(51) Int. Cl.
*H04M 1/02* (2006.01)
*G06F 1/16* (2006.01)

(52) U.S. Cl.
CPC ........ *H04M 1/0216* (2013.01); *G06F 1/1616* (2013.01); *G06F 1/1652* (2013.01);
(Continued)

(58) Field of Classification Search
CPC combination set(s) only.
See application file for complete search history.

(56) References Cited

U.S. PATENT DOCUMENTS 9,348,450 B1     5/2016  Kim
9,848,502 B1 *  12/2017  Chu .......................... E05D 7/00
(Continued)

FOREIGN PATENT DOCUMENTS

CN    101046221 A    10/2007
CN    101534331 A     9/2009
(Continued)

OTHER PUBLICATIONS

Wu Jianjun et al.,"Fatigue Failure Analysis and Life Prediction of Elliptical Flexible Hinge",2019, vol. 43,total:6pages.

*Primary Examiner* — Lisa Lea-Edmonds
(74) *Attorney, Agent, or Firm* — WOMBLE BOND DICKINSON (US) LLP

(57)    ABSTRACT

This application provides a rotation shaft structure and an electronic device. The rotation shaft structure includes a main shaft assembly, and two folding assemblies. The folding assembly includes a rotation assembly, a support plate, and a housing mounting bracket. The rotation assembly is rotationally connected to the main shaft assembly. The support plate is rotationally connected to the housing mounting bracket and slidably connected to the rotation assembly. When two housing mounting brackets rotate toward each
(Continued)

other, two support plates rotate in a same direction relative to the housing mounting brackets on corresponding sides, so that the two support plates and the main shaft assembly can form a triangle-like display accommodation space. When the electronic device is in a closed state, the display accommodation space can be used for accommodating a bent portion of the flexible display, so that the flexible display is not damaged by extrusion.

30 Claims, 31 Drawing Sheets

(30) Foreign Application Priority Data

| | | |
|---|---|---|
| Jul. 1, 2020 | (CN) | 202010619631.7 |
| Jul. 8, 2020 | (CN) | 202010651834.4 |
| Jul. 29, 2020 | (CN) | 202010741274.1 |
| Jul. 29, 2020 | (CN) | 202010741295.3 |
| Sep. 30, 2020 | (CN) | 202011062457.7 |
| Oct. 31, 2020 | (CN) | 202011198925.3 |

(52) U.S. Cl.
CPC ........ *G06F 1/1681* (2013.01); *H04M 1/0268* (2013.01); *H04M 2201/38* (2013.01)

(56) References Cited

U.S. PATENT DOCUMENTS

| | | | |
|---|---|---|---|
| 10,545,541 B1 | 1/2020 | Dighde et al. | |
| 10,564,681 B2 | 2/2020 | Siddiqui et al. | |
| 10,664,021 B1 | 5/2020 | Hsu et al. | |
| 10,754,377 B2 | 8/2020 | Siddiqui et al. | |
| 10,761,572 B1 | 9/2020 | Siddiqui et al. | |
| 11,231,754 B2 | 1/2022 | Kang et al. | |
| 11,243,578 B2 | 2/2022 | Torres et al. | |
| 11,294,431 B2 | 4/2022 | Torres et al. | |
| 11,336,759 B2* | 5/2022 | Liao | H04M 1/022 |
| 11,467,633 B2* | 10/2022 | Liao | G06F 1/1681 |
| 11,522,985 B1 | 12/2022 | Lim et al. | |
| 11,703,916 B2* | 7/2023 | Tian | G06F 1/1616 |
| | | | 361/679.27 |
| 11,706,886 B2* | 7/2023 | Wu | G06F 1/1681 |
| | | | 361/807 |
| 11,726,530 B2 | 8/2023 | Kang et al. | |
| 11,914,433 B2* | 2/2024 | Liao | G06F 1/1652 |
| 2007/0129609 A1 | 6/2007 | Kawasaki | |
| 2014/0062279 A1 | 3/2014 | Chiu et al. | |
| 2017/0139446 A1 | 5/2017 | Lan et al. | |
| 2017/0142240 A1 | 5/2017 | Xu | |
| 2018/0292860 A1 | 10/2018 | Siddiqui et al. | |
| 2019/0278338 A1 | 9/2019 | Siddiqui et al. | |
| 2020/0029449 A1 | 1/2020 | Makinen et al. | |
| 2020/0348732 A1 | 11/2020 | Kang et al. | |
| 2020/0355216 A1 | 11/2020 | Bae et al. | |
| 2021/0034116 A1 | 2/2021 | Torres et al. | |
| 2021/0034117 A1 | 2/2021 | Torres et al. | |
| 2021/0165466 A1 | 6/2021 | Kang et al. | |
| 2021/0181808 A1* | 6/2021 | Liao | G06F 1/1616 |
| 2021/0271294 A1* | 9/2021 | Liao | G06F 1/1681 |
| 2021/0355988 A1* | 11/2021 | Cheng | G06F 1/1681 |
| 2022/0035422 A1 | 2/2022 | Torres et al. | |
| 2022/0051594 A1 | 2/2022 | Eguchi et al. | |
| 2022/0104370 A1* | 3/2022 | Wu | H05K 5/0017 |
| 2022/0116489 A1 | 4/2022 | Nagai et al. | |
| 2022/0137676 A1* | 5/2022 | Tian | G06F 1/1616 |
| | | | 361/679.27 |
| 2022/0155828 A1 | 5/2022 | Hsiang et al. | |
| 2022/0164002 A1 | 5/2022 | An et al. | |
| 2022/0166456 A1 | 5/2022 | Dannenberg et al. | |
| 2022/0182476 A1 | 6/2022 | Cha et al. | |
| 2022/0303371 A1* | 9/2022 | Liao | G06F 1/1616 |
| 2022/0417351 A1 | 12/2022 | Nam et al. | |
| 2023/0054923 A1* | 2/2023 | Liao | G06F 1/1641 |
| 2023/0075646 A1* | 3/2023 | Niu | G06F 1/1652 |
| 2023/0171334 A1* | 6/2023 | Xu | H04M 1/022 |
| | | | 455/566 |
| 2023/0403347 A1* | 12/2023 | Liu | H04M 1/022 |

FOREIGN PATENT DOCUMENTS

| | | |
|---|---|---|
| CN | 105407187 A | 3/2016 |
| CN | 105491193 A | 4/2016 |
| CN | 205978043 U | 2/2017 |
| CN | 206100081 U | 4/2017 |
| CN | 107750310 A | 3/2018 |
| CN | 108173995 A | 6/2018 |
| CN | 207647964 U | 7/2018 |
| CN | 108712535 A | 10/2018 |
| CN | 207977992 U | 10/2018 |
| CN | 208421694 U | 1/2019 |
| CN | 109495621 A | 3/2019 |
| CN | 109654112 A | 4/2019 |
| CN | 109658826 A | 4/2019 |
| CN | 11127137 A | 6/2019 |
| CN | 109979328 A | 7/2019 |
| CN | 110007715 A | 7/2019 |
| CN | 110010008 A | 7/2019 |
| CN | 110035140 A | 7/2019 |
| CN | 110213417 A | 9/2019 |
| CN | 110273915 A | 9/2019 |
| CN | 209430596 U | 9/2019 |
| CN | 209472651 U | 10/2019 |
| CN | 110515426 A | 11/2019 |
| CN | 110552953 A | 12/2019 |
| CN | 110594279 A | 12/2019 |
| CN | 209724948 U | 12/2019 |
| CN | 209731301 U | 12/2019 |
| CN | 209882285 U | 12/2019 |
| CN | 110701176 A | 1/2020 |
| CN | 110805610 A | 2/2020 |
| CN | 210839653 U | 6/2020 |
| JP | 2009299861 A | 12/2009 |
| JP | 2021513237 A | 5/2021 |
| KR | 101487189 B1 | 1/2015 |
| KR | 20180094172 A | 8/2018 |
| KR | 20180138494 A | 12/2018 |
| KR | 20190065641 A | 6/2019 |
| KR | 20190097898 A | 8/2019 |
| KR | 20190110244 A | 9/2019 |
| RU | 191212 U1 | 7/2019 |
| WO | 2006080309 A1 | 8/2006 |
| WO | 2017211115 A1 | 12/2017 |
| WO | 2018082338 A1 | 5/2018 |
| WO | 2019085891 A1 | 5/2019 |
| WO | 2019149238 A1 | 8/2019 |
| WO | 2019225930 A1 | 11/2019 |

\* cited by examiner

ROTATION SHAFT STRUCTURE AND ELECTRONIC DEVICE

CROSS-REFERENCE TO RELATED APPLICATIONS

This application is a continuation of International Application No. PCT/CN2020/135961, filed on Dec. 11, 2020, which claims priority to Chinese Patent Application No. 201911286336.8, filed on Dec. 13, 2019 and Chinese Patent Application No. 202010059260.1, filed on Jan. 19, 2020 and Chinese Patent Application No. 202010619631.7, filed on Jul. 1, 2020 and Chinese Patent Application No. 202010651834.4, filed on Jul. 8, 2020 and Chinese Patent Application No. 202010741295.3, filed on Jul. 29, 2020 and Chinese Patent Application No. 202010741274.1, filed on Jul. 29, 2020 and Chinese Patent Application No. 202011062457.7, filed on Sep. 30, 2020 and Chinese Patent Application No. 202011198925.3, filed on Oct. 31, 2020. All of the aforementioned patent applications are hereby incorporated by reference in their entireties.

TECHNICAL FIELD

This application relates to the field of electronic device technologies, and in particular, to a rotation shaft structure and an electronic device.

BACKGROUND

With rapid development of communication and electronic technologies, electronic devices such as mobile phones have become indispensable tools in people's daily lives. Currently, an electronic device provides increasingly diversified functions, and a user also expects to better use the foregoing functions by using a larger and wider display. However, the larger display also increases an overall structure of the electronic device. Consequently, the electronic device is not portable and compact enough.

At a current stage, a flexible display technology is increasingly mature, so that foldable electronic devices can be implemented. The foldable electronic devices are becoming more popular among consumers because they have large displays and are easy to carry. When a foldable electronic device is used, a display needs to be frequently folded along with the electronic device. Consequently, a service life of the display is short.

To prolong a service life of a flexible display and improve reliability of a foldable electronic device, a folded part of the flexible display needs to have specific curvature deformation. In addition, curvature uniformity of the folded part of the flexible display also has important effect on prolonging the service life of the flexible display. A key to implementing the curvature deformation and the curvature uniformity of the folded part of the flexible display lies in a rotation shaft structure of the electronic device. Therefore, how to design the rotation shaft structure to improve reliability of the flexible display is an urgent problem to be resolved currently.

SUMMARY

This application provides a rotation shaft structure and an electronic device, to prolong a service life of a flexible display and improve reliability of the electronic device.

According to a first aspect, this application provides a rotation shaft structure. The rotation shaft structure includes a main shaft assembly, and a first folding assembly and a second folding assembly that are symmetrically disposed with respect to the main shaft assembly. The first folding assembly and the second folding assembly may rotate toward or against each other relative to the main shaft assembly. When the first folding assembly is specifically disposed, the first folding assembly includes a first rotation assembly, a first support plate, and a first housing mounting bracket. The first rotation assembly is rotationally connected to the main shaft assembly. The first support plate is rotationally connected to the first housing mounting bracket and is slidably connected to the first rotation assembly. When the second folding assembly is specifically disposed, the second folding assembly includes a second rotation assembly, a second support plate, and a second housing mounting bracket. The second rotation assembly is rotationally connected to the main shaft assembly. The second support plate is rotationally connected to the second housing mounting bracket and is slidably connected to the second rotation assembly. A direction in which the first support plate slides relative to the first rotation assembly may be perpendicular to a rotation axis of the first rotation assembly. Similarly, a direction in which the second support plate slides relative to the second rotation assembly may be perpendicular to a rotation axis of the second rotation assembly.

In this way, when the first housing mounting bracket and the second housing mounting bracket rotate toward each other, the first housing mounting bracket drives the first rotation assembly to rotate around the main shaft assembly. In this case, the first rotation assembly drives the first support plate to rotate relative to the first housing mounting bracket, and drives one end that is of the first support plate and that is close to the main shaft assembly to move in a direction away from the main shaft assembly. Correspondingly, the second housing mounting bracket drives the second rotation assembly to rotate around the main shaft assembly. The second rotation assembly drives the second support plate to rotate relative to the second housing mounting bracket, and drives one end that is of the second support plate and that is close to the main shaft assembly to move in the direction away from the main shaft assembly, so that the first support plate and the second support plate form a preset included angle when rotating to a first position, and enclose a display accommodation space together with the main shaft assembly.

According to the rotation shaft structure in this application, when the first housing mounting bracket and the second housing mounting bracket rotate toward each other, the first support plate rotates in a same direction relative to the first housing mounting bracket, and the second support plate rotates in a same direction relative to the second housing mounting bracket, so that the first support plate, the second support plate, and the main shaft assembly can form the triangle-like display accommodation space. When an electronic device is in a closed state, the display accommodation space can be used for accommodating a bent portion of a flexible display, so that the flexible display is not damaged by extrusion. This prolongs a service life of the flexible display.

In addition, when the first housing mounting bracket and the second housing mounting bracket rotate against each other, the first housing mounting bracket drives the first rotation assembly to rotate around the main shaft assembly, and the second housing mounting bracket drives the second rotation assembly to rotate around the main shaft assembly. In addition, the first rotation assembly drives the first support plate to rotate in a same direction relative to the first housing mounting bracket, to drive one end that is of the first support plate and that is close to the main shaft assembly to move in a direction approaching the main shaft assembly. The second rotation assembly drives the second support plate to rotate in a same direction relative to the second housing mounting bracket, to drive one end that is of the second support plate and that is close to the main shaft assembly to move in a direction approaching the main shaft assembly, so that when the first support plate and the second support plate rotate to a second position, the first support plate, the second support plate, and the main shaft assembly are unfolded flat to form a support surface. Therefore, the flat support surface can be provided for the flexible display, to avoid a partial collapse problem of the flexible display, and improve flatness of the flexible display.

In one embodiment, to implement a rotational connection between the first support plate and the first housing mounting bracket, a first circular arc groove may be disposed in the first housing mounting bracket, and a first circular arc shaft is disposed on the first support plate, so that the rotational connection between the first support plate and the first housing mounting bracket is implemented by using a virtual axis formed by sliding fit between the first circular arc shaft and the first circular arc groove. Similarly, a second circular arc groove is disposed in the second housing mounting bracket, and a second circular arc shaft is disposed on the second support plate. In this way, a rotational connection between the second support plate and the second housing mounting bracket is implemented by using a virtual axis formed by sliding fit between the second circular arc shafts and the second circular arc grooves. Through relative movements of the circular arc shafts and the circular arc grooves, the rotational connection between the first support plate and the first housing mounting bracket and the rotational connection between the second support plate and the second housing mounting bracket are implemented by using the virtual axes. A rotational connection structure is simple, and space occupied by the rotation axis is small. This helps reduce a thickness of the rotation shaft structure, and it is easier to implement a lighter and thinner design of the electronic device.

In one embodiment, when the first rotation assembly is specifically disposed, the first rotation assembly includes a first swing arm and a first driven arm. One end of the first swing arm is rotationally connected to the main shaft assembly, and the other end is rotationally connected to the first housing mounting bracket. One end of the first driven arm is rotationally connected to the main shaft assembly, and the other end is slidably connected to the first housing mounting bracket. Rotation axis centers of the first driven arm and the first swing arm on the main shaft assembly are parallel to each other and do not coincide with each other. Similarly, the second rotation assembly includes a second swing arm and a second driven arm. One end of the second swing arm is rotationally connected to the main shaft assembly, and the other end is rotationally connected to the second housing mounting bracket. One end of the second driven arm is rotationally connected to the main shaft assembly, and the other end is slidably connected to the second housing mounting bracket. Rotation axis centers of the second driven arm and the second swing arm on the main shaft assembly are parallel to each other and do not coincide with each other. Because the rotation axes of the first driven arm and the first swing arm do not coincide, the rotation axis centers of the second driven arm and the second swing arm do not coincide. When the first rotation assembly and the second rotation assembly rotate toward each other, the first housing mounting bracket slides relative to the first driven arm in a direction away from the rotation axis center of the first driven arm, and the second housing mounting bracket slides relative to the second driven arm in a direction away from the rotation axis center of the second driven arm, so that the first housing mounting bracket and the first swing arm stretch relative to the first driven arm, and the second housing mounting bracket and the second swing arm stretch relative to the second driven arm, to increase extension lengths of the first folding assembly and the second folding assembly relative to the main shaft assembly, and increase a length of the rotation shaft structure. In addition, when the first rotation assembly and the second rotation assembly rotate against each other, the first housing mounting bracket slides relative to the first driven arm in a direction approaching the rotation axis center of the first driven arm, and the second housing mounting bracket slides relative to the second driven arm in a direction approaching the rotation axis center of the second driven arm, so that the first housing mounting bracket and the first swing arm contract relative to the first driven arm, to reduce extension lengths of the first folding assembly and the second folding assembly relative to the main shaft assembly, and reduce a length of the rotation shaft structure. In this way, when the rotation shaft structure is in a closed state, an unfolded state, or a folding process, the extension lengths of the first folding assembly and the second folding assembly relative to the main shaft assembly can adapt to a length of the flexible display, so that the flexible display is not stretched or extruded.

In one embodiment, a slidable connection between the first support plate and the first rotation assembly may be reflected as a slidable connection between the first support plate and the first swing arm. In this case, a first guide shaft may be disposed on the first swing arm, and a first track slot may be disposed in the first support plate. In this way, after an included angle between the first swing arm and the first housing mounting bracket changes, the first swing arm may drive, through sliding fit between the first guide shaft and the first track slots of the first support plate, the first support plate to rotate relative to the first housing mounting bracket.

Similarly, a slidable connection between the second support plate and the second rotation assembly may be reflected as a slidable connection between the second support plate and the second swing arm. In this case, a second guide shaft may be disposed on the second swing arm, and a second track slot may be disposed in the second support plate. In this way, after an included angle between the second swing arm and the second housing mounting bracket changes, the second swing arm may drive, through sliding fit between the second guide shaft and the second track slots of the second support plate, the second support plate to rotate relative to the second housing mounting bracket. Because the two support plates can be driven by the swing arms on corresponding sides, the two support plates always have enough driving force, and can have good movement smoothness in a movement process, so that the two support plates can move in place when the first housing mounting bracket and the second housing mounting bracket are folded or unfolded relative to each other. This helps protect the flexible display.

In addition, a slidable connection between the first support plate and the first rotation assembly is reflected as a slidable connection between the first support plate and the first driven arm. In this case, a first guide shaft may be disposed on the first driven arm, and a first track slot may be disposed in the first support plate. In this way, after an included angle between the first driven arm and the first housing mounting bracket changes, the first driven arm may drive, through sliding fit between the first guide shaft and the first track slots of the first support plate, the first support plate to rotate relative to the first housing mounting bracket.

Similarly, a slidable connection between the second support plate and the second rotation assembly is reflected as a slidable connection between the second support plate and the second driven arm. In this case, a second guide shaft may be disposed on the second driven arm, and a second track slot may be disposed in the second support plate. In this way, after an included angle between the second driven arm and the second housing mounting bracket changes, the second driven arm may drive, through sliding fit between the second guide shaft and the second track slots of the second support plate, the second support plate to rotate relative to the second housing mounting bracket. Because the two support plates can be driven by the driven arms on corresponding sides, the two support plates always have enough driving force, and can have good movement smoothness in a movement process, so that the two support plates can move in place when the first housing mounting bracket and the second housing mounting bracket are folded or unfolded relative to each other. This helps protect the flexible display.

When the first support plate is slidably connected to the first driven arm, one end that is of the first driven arm and that is slidably connected to the first support plate may be recessed to form a first concave region, one end of the first guide shaft is connected to one side of the first concave region, and the other end is connected to the other side of the first concave region, so that the first guide shaft is accommodated in the first concave region. Similarly, when the second support plate is slidably connected to the second driven arm, one end that is of the second driven arm and that is slidably connected to the second support plate may be recessed to form a second concave region, one end of the second guide shaft is connected to one side of the second concave region, and the other end is connected to the other side of the second concave region, so that the second guide shaft is accommodated in the second concave region. In this way, a space occupied by the rotation shaft structure may be reduced, and it is easier to implement a lighter and thinner design of the rotation shaft structure and the electronic device with the rotation shaft structure.

In one embodiment, the first track slot in the first support plate and the second track slot in the second support plate may be arc-shaped slots or straight slots, and may be adjusted based on movement track requirements of the two support plates, so that the support plates can rotate to a rotation position that meets an angle requirement.

In one embodiment, to improve stability of relative sliding between the first support plate and the first rotation assembly, a first lap joint part may be disposed on the first swing arm or the first driven arm, and the first lap joint part extends in a direction from the main shaft assembly to the first housing mounting bracket. The first support plate has a first surface and a second surface that are disposed opposite to each other. The first surface supports the flexible display. A second lap joint part is disposed on a side that is of the first support plate and that is close to the main shaft assembly. The second lap joint part is disposed on the second surface of the first support plate. When the first support plate slides relative to the first rotation assembly, the second lap joint part is slidable along a surface of the first lap joint part. Therefore, an assembly clearance between the first support plate and the first rotation assembly can be compensated for, to improve movement stability of the first support plate.

Similarly, a third lap joint part is disposed on the second swing arm or the second driven arm, and the third lap joint part extends in a direction from the main shaft assembly to the second housing mounting bracket. The second support plate has a third surface and a fourth surface that are disposed opposite to each other. The third surface supports the flexible display. A fourth lap joint part is disposed on a side that is of the second support plate and that is close to the main shaft assembly. The fourth lap joint part is disposed on the fourth surface of the second support plate. When the second support plate slides relative to the second rotation assembly, the fourth lap joint part is slidable along a surface of the third lap joint part. Therefore, an assembly clearance between the second support plate and the second rotation assembly can be compensated for, to improve movement stability of the second support plate.

When the first lap joint part and the second lap joint part are specifically disposed, a surface that is of the first lap joint part and that is in contact with the second lap joint part may be a cambered surface; or a surface that is of the second lap joint part and that is in contact with the first lap joint part may be a cambered surface; or both a surface that is of the first lap joint part and that is in contact with the second lap joint part and a surface that is of the second lap joint part and that is in contact with the first lap joint part may be cambered surfaces. Similarly, a surface that is of the third lap joint part and that is in contact with the fourth lap joint part may be a cambered surface; or a surface that is of the fourth lap joint part and that is in contact with the third lap joint part may be a cambered surface; or both a surface that is of the third lap joint part and that is in contact with the fourth lap joint part and a surface that is of the fourth lap joint part and that is in contact with the third lap joint part may be cambered surfaces. In this way, the first lap joint part on the first rotation assembly and the second lap joint part on the first support plate can move more smoothly in a process of contact and relative sliding. In addition, the third lap joint part on the second rotation assembly and the fourth lap joint part on the second support plate can move more smoothly in a process of contact and relative sliding.

In addition, when the surfaces that are of the two lap joint parts and that are in contact with each other are cambered surfaces, the cambered surface may be formed by splicing at least two curved surfaces, and a preset included angle may be formed between two adjacent curved surfaces, so that the cambered surface can be more adapted to a movement track along which the second lap joint part slides relative to the first lap joint part, to more accurately control sliding tracks of the first support plate and the second support plate.

In one embodiment, a fifth lap joint part is disposed on a side that is of the main shaft assembly and that is close to the first support plate. The fifth lap joint part and the first lap joint part are located on a same side of the second lap joint part. The second lap joint part is lap-joined on a surface of the fifth lap joint part. Similarly, a sixth lap joint part is disposed on a side that is of the main shaft assembly and that is close to the second support plate. The sixth lap joint part and the third lap joint part are located on a same side of the fourth lap joint part. The fourth lap joint part is lap-joined on a surface of the sixth lap joint part. The fifth lap joint part and the sixth lap joint part are disposed on the main shaft assembly. This can effectively improve control precision of movement tracks of the first support plate and the second support plate, and effectively reduce an avoidance clearance between the main shaft assembly and both of the first support plate and the second support plate, so that the first support plate and the second support plate can effectively support the flexible display, to reduce a collapse area of the flexible display. In addition, because an effective area of the rotation shaft structure for supporting the flexible display is significantly increased, the flexible display can bear extrusion force in a vertical direction. This reduces a risk of a problem such as a pressing failure in a use process of the flexible display.

In one embodiment, to reduce shaking of the first support plate and the second support plate in a movement process, the rotation shaft structure may further include a first rotation auxiliary assembly and a second rotation auxiliary assembly. The first rotation auxiliary assembly includes a first elastic member. One end of the first elastic member is fastened to the first housing mounting bracket, and the other end is slidable along a surface of the first support plate. Similarly, the second rotation auxiliary assembly includes a second elastic member. One end of the second elastic member is fastened to the second housing mounting bracket, and the other end is slidable along a surface of the second support plate. The first rotation auxiliary assembly and the second rotation auxiliary assembly are disposed, so that a possibility that an included angle between the first support plate and the second support plate cannot reach an angle required by design due to a movement clearance between parts is minimized, and the included angle between the first support plate and the second support plate can reach an optimal angle required by design.

When the first elastic member and the second elastic member are specifically disposed, the first elastic member may be a torsion spring, and the first elastic member and the first swing arm are coaxially disposed. In addition, the second elastic member is a torsion spring, and the second elastic member and the first swing arm are coaxially disposed. In this way, parts of the rotation shaft structure can be effectively reduced. This helps reduce space occupied by the rotation shaft structure, and implement a thinner design of the rotation shaft structure.

To control a sliding track of the first elastic member on the first support plate, a first stopper structure may be disposed on the first support plate. A first guide hole is disposed in the first stopper structure. The other end of the first elastic member penetrates through the first guide hole, and slides along the surface of the first support plate under a guiding function of the first guide hole. Similarly, a second stopper structure is disposed on the second support plate. A second guide hole is disposed in the second stopper structure. The other end of the second elastic member penetrates through the second guide hole, and slides along the surface of the second support plate under a guiding function of the second guide hole. Sliding tracks of the first elastic member and the second elastic member on the corresponding support plates are controlled, so that pulling force between the first support plate and the second support plate and the housing mounting brackets on corresponding sides can be controlled. The pulling force can move the first support plate and the second support plate to specified positions.

In one embodiment, when rotational connections between the first swing arm and the second swing arm and the main shaft assembly are specifically implemented, a third circular arc groove and a fourth circular arc groove are disposed in the main shaft assembly. A third circular arc shaft is disposed at one end of the first swing arm, and a fourth circular arc shaft is disposed at one end of the second swing arm. In this way, the third circular arc shaft may be disposed in the third circular arc groove, and the fourth circular arc shaft may be disposed in the fourth circular arc groove, so that the rotational connections between the first swing arm and the second swing arm and the main shaft assembly are implemented by using virtual axes. Therefore, a connection structure between the first swing arm and the second swing arm and the main shaft assembly may be well hidden in the main shaft assembly. This helps improve integration and user experience of the rotation shaft structure. In addition, a connection manner of the virtual axes further helps implement a thinner design of an entire machine.

The main shaft assembly may include an inner housing and an outer housing that are snap-fitted. The third circular arc groove and the fourth circular arc groove of the main shaft assembly may be implemented through cooperation of the inner housing and the outer housing. Specifically, two protrusions are disposed on the inner housing of the main shaft assembly. Two recesses are disposed in the outer housing. The outer housing and the inner housing are snap-fitted. The two protrusions and the two recesses are disposed in a one-to-one correspondence manner to form the third circular arc groove and the fourth circular arc groove. Therefore, a disposing manner of the third circular arc groove and the fourth circular arc groove of the main shaft assembly can be effectively simplified.

In one embodiment, when a rotational connection between the first swing arm and the first housing mounting bracket and a rotational connection between the second swing arm and the second housing mounting bracket are specifically implemented, a first shaft hole may be disposed in the first swing arm, a second shaft hole may be disposed in the first housing mounting bracket, and the first shaft hole and the second shaft hole may be connected through a pin shaft. Similarly, a third shaft hole is disposed in the second swing arm, a fourth shaft hole is disposed in the second housing mounting bracket, and the third shaft hole and the fourth shaft hole are connected through a pin shaft. Therefore, the first swing arm and the second swing arm are reliably connected to the housing mounting brackets on corresponding sides.

In one embodiment, to implement a slidable connection between the first driven arm and the first housing mounting bracket and a slidable connection between the second driven arm and the second housing mounting bracket, a first sliding slot is disposed in the first housing mounting bracket, a first sliding rail is disposed on the first driven arm, and the first sliding rail is slidably disposed in the first sliding slot. A second sliding slot is disposed in the second housing mounting bracket, a second sliding rail is disposed on the second driven arm, and the second sliding rail is slidably disposed in the second sliding slot. In this way, it is easier to implement relative sliding movements between the two driven arms and the housing mounting brackets on corresponding sides, and control precision is higher.

To implement synchronous movements of the first folding assembly and the second folding assembly in a process of folding and unfolding the rotation shaft structure, the rotation shaft structure may further include a synchronization assembly. The synchronization assembly may be drivingly connected to the first driven arm and the second driven arm, to implement synchronous opposite rotation between the first folding assembly and the second folding assembly.

When the synchronization assembly is specifically disposed, the synchronization assembly may include a first gear and a second gear that are engaged with each other. The first gear is fastened to one end of the first driven arm. The second gear is fastened to one end of the second driven arm. The first gear and the first driven arm rotate coaxially. The second gear and the second driven arm rotate coaxially. Therefore, a structure of the rotation shaft structure can be effectively simplified.

In addition, the synchronization assembly may further include an even quantity of driven gears. The first gear and the second gear are drivingly connected through the even quantity of driven gears. This can effectively improve stability of synchronous rotation of the first rotation assembly and the second rotation assembly.

In one embodiment, the rotation shaft structure may further include a damping assembly. The damping assembly may be disposed in the main shaft assembly, or may be disposed in the structure of the rotation shaft structure.

When the damping assembly is disposed in the main shaft assembly, one end of the damping assembly elastically presses against the first driven arm and the second driven arm. The damping assembly may be configured to provide damping force when the first driven arm and the second driven arm rotate relative to each other. In this case, the following disposing manners may be used.

In a first disposing manner, one end of the damping assembly presses against the first driven arm and the second driven arm, and the other end presses against the main shaft assembly, to provide damping force when the first driven arm and the second driven arm rotate relative to each other. The damping force may be transferred to the housings on corresponding sides through the first driven arm and the second driven arm, so that a user has an obvious feeling on a folding or unfolding process of the electronic device. This improves user experience.

In this application, when the first driven arm and the second driven arm are rotationally connected to the main shaft assembly, the first driven arm may be rotationally connected to the main shaft assembly through the first rotation shaft, and the second driven arm may be rotationally connected to the main shaft assembly through the second rotation shaft.

In one embodiment, in a length direction of the main shaft assembly, first cam structures are disposed at two ends of the first gear, and second cam structures are disposed at two ends of the second gear.

In this embodiment, when the damping assembly is specifically disposed, the damping assembly further includes a first conjoined cam, a second conjoined cam, a first elastic structural member, and a second elastic structural member. In the length direction of the main shaft assembly, the first conjoined cam and the second conjoined cam are disposed on two sides of the synchronization assembly, the first conjoined cam is engaged with the first cam structure and the second cam structure that are disposed on a same side, and the second conjoined cam is engaged with the first cam structure and the second cam structure that are disposed on a same side. A first via hole and a second via hole are disposed in the first conjoined cam, a third via hole and a fourth via hole are disposed in the second conjoined cam, the first rotation shaft penetrates through the first via hole and the third via hole, and the second rotation shaft penetrates through the second via hole and the fourth via hole.

In addition, in the length direction of the main shaft assembly, the first elastic structural member and the second elastic structural member are disposed on a side that is of the first conjoined cam and that is away from the second conjoined cam, the first elastic structural member is sleeved on the first rotation shaft, and the second elastic structural member is sleeved on the second rotation shaft. The first elastic structural member and the second elastic structural member elastically press against the first conjoined cam, and press the first conjoined cam to the synchronization assembly. When the rotation shaft structure is in a flattened state, a closed state, or an intermediate state, damping force is generated through engagement of the first conjoined cam and the second conjoined cam with the first cam structure and the second cam structure, so that the rotation shaft structure can be kept in a corresponding stable state. In addition, when convex portions of the first cam structure and the second cam structure tend to slide into concave portions of the first conjoined cam and the second conjoined cam, under effect of the damping force, the convex portions of the first cam structure and the second cam structure continue to slide in a direction of sliding into the concave portions of the first cam structure and the second cam structure until a stable flattened state or closed state, to implement automatic unfolding or closing of the rotation shaft structure and further implement automatic unfolding or closing of the electronic device. This helps improve structural stability and use safety of the electronic device.

In one embodiment, to prevent the first elastic structural member and the second elastic structural member from being disengaged from the corresponding rotation shafts, the damping assembly further includes a first arrestor structure and a second arrestor structure. The first arrestor structure is limited to one end that is of the first rotation shaft and that is away from the first conjoined cam and one end that is of the second rotation shaft and that is away from the first conjoined cam. The first elastic structural member and the second elastic structural member press against the first arrestor structure. In addition, the second arrestor structure is limited to one end that is of the first rotation shaft and that is away from the second conjoined cam and one end that is of the second rotation shaft and that is away from the second conjoined cam, so that the second conjoined cam is not disengaged from the first rotation shaft and the second rotation shaft, and the second conjoined cam is engaged with the first cam structure and the second cam structure.

When the synchronization assembly includes the driven gears, the driven gear rotates around a middle shaft. In the length direction of the main shaft assembly, third cam structures may also be disposed at two ends of the driven gear. The first conjoined cam is further engaged with the third cam structure disposed on a same side, and the second conjoined cam is further engaged with the third cam structure disposed on a same side. Fifth via holes are disposed in the first conjoined cam. Sixth via holes are further disposed in the second conjoined cam. The middle shaft penetrates through the fifth via hole and the sixth via hole.

In addition, the damping assembly further includes a third elastic structural member. The third elastic structural member is disposed on a side that is of the first conjoined cam and that is away from the second conjoined cam. The third elastic structural member is sleeved on the middle shaft and elastically presses against the first conjoined cam. In this way, the first conjoined cam may be pressed to the first cam structure and the second cam structure, so that the first conjoined cam is engaged with the first cam structure and the second cam structure. This increases damping force between the first driven arm and the second driven arm, further increases damping force between the first rotation assembly and the second rotation assembly, and improves rotation reliability of the rotation shaft structure.

In this case, the first arrestor structure is limited to one end that is of the first rotation shaft and that is away from the first conjoined cam, one end that is of the second rotation shaft and that is away from the first conjoined cam, and one end that is of the middle shaft and that is away from the first conjoined cam. The first elastic structural member, the second elastic structural member, and the third elastic structure member press against the first arrestor structure. In addition, the second arrestor structure is limited to one end that is of the first rotation shaft and that is away from the second conjoined cam, one end that is of the second rotation shaft and that is away from the second conjoined cam, and one end that is of the middle shaft and that is away from the second conjoined cam, and the second conjoined cam presses against the second arrestor structure, so that the second conjoined cam is not disengaged from the first rotation shaft and the second rotation shaft, and the second conjoined cam is engaged with the first cam structure and the second cam structure.

In the foregoing implementation, when the first arrestor structure is specifically disposed, the first arrestor structure are provided with a plurality of arrestor parts. The plurality of arrestor parts are in a one-to-one correspondence to the first rotation shaft, the second rotation shaft, and the middle shafts. The plurality of arrestor parts may be connected to each other, to improve integration of the first arrestor structure and improve structural stability of the first arrestor structure. Alternatively, the plurality of arrestor parts may be independent of each other, to improve disposing flexibility of the first arrestor structure.

In another embodiment, the driven gear rotates around a middle shaft. In a length direction of the main shaft assembly, third cam structures are disposed at two ends of the driven gear. The damping assembly further includes a first conjoined cam, a second conjoined cam, and a third elastic structural member. In the length direction of the main shaft assembly, the first conjoined cam and the second conjoined cam are disposed on two sides of the synchronization assembly. The first conjoined cam is engaged with the third cam structure disposed on a same side, and the second conjoined cam is engaged with the third cam structure disposed on a same side. Fifth via holes are disposed in the first conjoined cam. Sixth via holes are further disposed in the second conjoined cam. The middle shaft penetrates through the fifth via hole and the sixth via hole. The third elastic structural member is disposed on a side that is of the first conjoined cam and that is away from the second conjoined cam. The third elastic structural member is sleeved on the middle shaft and elastically presses against the first conjoined cam. Therefore, the first conjoined cam is pressed to the first cam structure and the second cam structure, so that the first conjoined cam is engaged with the first cam structure and the second cam structure. This increases damping force between the first rotation assembly and the second rotation assembly, and improves rotation reliability of the rotation shaft structure.

It may be understood that, in this embodiment, the damping assembly may further include a first arrestor structure and a second arrestor structure. The first arrestor structure and the second arrestor structure may be specifically disposed with reference to the foregoing implementation. In this way, the first arrestor structure may be limited to one end that is of the middle shaft and that is away from the first conjoined cam, and the third elastic structural member presses against the first arrestor structure, so that the third elastic structural member is not disengaged from the middle shaft. In addition, the second arrestor structure is limited to one end that is of the middle shaft and that is away from the second conjoined cam, and the second conjoined cam presses against the second arrestor structure, so that the second conjoined cam is not disengaged from the middle shaft, and the second conjoined cam is engaged with the first cam structure and the second cam structure.

In a second disposing manner, in a length direction of the main shaft assembly, end peripheral sides that are of the first gear, the driven gears, and the second gear and that are on a same side are each provided with at least two ball slots. The ball slots of the first gear and the driven gear that are adjacent to each other, the ball slots of the two adjacent driven gears, and the ball slots of the driven gear and the second gear that are adjacent to each other are paired to form an accommodation slot.

When the damping assembly is specifically disposed, the damping assembly includes a guide part. The guide part is located on a side that is of the synchronization assembly and that allows the accommodation slots to be formed. Positioning slots that are in a one-to-one correspondence to the accommodation slots are disposed in a side that is of the guide part and that faces toward the synchronization assembly. Openings of the positioning slots face toward the accommodation slots. A ball is disposed in each of the positioning slots. When the positioning slot is opposite to an opening of the corresponding accommodation slot, a part of the ball is located in the accommodation slot, and a part of the ball is located in the positioning slot.

In addition, the damping assembly further includes a first elastic structural member and a second elastic structural member. A first via hole and a second via hole are disposed in the guide part. The first rotation shaft penetrates the first via hole. The second rotation shaft penetrates the second via hole.

In the length direction of the main shaft assembly, the first elastic structural member and the second elastic structural member are disposed on a side that is of the guide part and that is away from the synchronization assembly. The first elastic structural member is sleeved on the first rotation shaft. The second elastic structural member is sleeved on the second rotation shaft. The first elastic structural member and the second elastic structural member elastically press against the guide part. The first elastic structural member and the second elastic structural member are configured to push the guide part to press the balls onto an end face of the synchronization assembly. In this embodiment, when the first folding assembly and the second folding assembly are in a flattened state, a closed state, or an intermediate state, the damping assembly is in a positioning work station. In this case, the first elastic structural member and the second elastic structural member are in a pressed state, so that the ball is located between the accommodation slot and the positioning slot, and the first folding assembly and the second folding assembly are kept in a stable state. When the ball is in a position outside the ball slot, the ball is in an unstable state. In this case, under action force of the first elastic structural member and the second elastic structural member, the ball is pushed toward the ball slot until entering the ball slot, so that the rotation shaft structure is in a stable state, to implement automatic unfolding or closing of the rotation shaft structure and further implement automatic unfolding or closing of the electronic device. This helps improve structural stability and use safety of the electronic device.

When the synchronization assembly includes the driven gears, the driven gear rotates around a middle shaft. The damping assembly further includes a third elastic structural member. The third elastic structural member is disposed on a side that is of the guide part and that is away from the synchronization assembly. The third elastic structural member is sleeved on the middle shaft. The third elastic structural member elastically presses against the guide part, and is configured to push the guide part to press the balls onto an end face of the synchronization assembly. In this case, the first elastic structural member, the second elastic structural member, and the third elastic structural member jointly apply elastic force to the guide part. Therefore, greater damping force can be provided for relative rotation of the first rotation assembly and the second rotation assembly, so that the first rotation assembly and the second rotation assembly have higher movement stability and keep stability in place.

In one embodiment, when the positioning slot of the guide part is specifically disposed, an inner diameter of the positioning slot is less than a diameter of the ball, and a spherical surface of the ball presses against an opening that is of the positioning slot and that faces toward the gears. Therefore, the ball always presses against an edge of the opening of the positioning slot under the force applied by each elastic structural member to the guide part.

In addition, the guide part may include a guide sleeve and a pressing block that is disposed between the guide sleeve and both of the first elastic structural member and the second elastic structural member. In this case, the positioning slots may be disposed in the guide sleeve.

The positioning slots may be through slots, columnar protrusions are disposed on a side that is of the pressing block and that faces toward the guide sleeve, and the columnar protrusions are inserted into the through slots. In this structure, the columnar protrusion can be used for applying action force to the ball.

In addition, an inner diameter of the through slot may be less than a diameter of the ball, and the spherical surface of the ball presses against an edge of the opening that is of the through slot and that faces toward the gears. In this structure, the spherical surface of the ball may also press against the columnar protrusion, to increase a contact point between the ball and the guide part. This improves stability of the structure. Alternatively, an inner diameter of the through slot may be greater than a diameter of the ball, and the columnar protrusion presses against a spherical surface that is of the ball and that is away from the synchronization assembly. In this structure, the ball may entirely enter the through slot in a sliding process, and the columnar protrusion may press against the ball. In this way, the ball is more stable in a rolling process, and can be effectively prevented from being disengaged.

In one embodiment, to prevent the first elastic structural member and the second elastic structural member from being disengaged from the corresponding rotation shafts, the damping assembly further includes a first arrestor structure and a second arrestor structure. The first arrestor structure is limited to one end that is of the first rotation shaft and that is away from the guide part and one end that is of the second rotation shaft and that is away from the guide part. The first elastic structural member and the second elastic structural member press against the first arrestor structure. In addition, the second arrestor structure is limited to one end that is of the first rotation shaft and that is away from the synchronization assembly and one end that is of the second rotation shaft and that is away from the synchronization assembly.

In a third disposing manner, the damping assembly may include one or more damping groups located between the first rotation shaft and the second rotation shaft. The first rotation shaft is fastened to the first gear. The second rotation shaft is fastened to the second gear. A first stopper slot is disposed in a peripheral surface of the first rotation shaft. A second stopper slot is disposed in a peripheral surface of the second rotation shaft. Each damping group includes an elastic structural member, a first ball, and a second ball. The first ball is located at a first end of the elastic structural member. The elastic structural member presses the first ball against the peripheral surface of the first rotation shaft. The second ball is located at a second end of the elastic structural member. The elastic structural member presses the second ball against the peripheral surface of the second rotation shaft.

In this embodiment, neither the first rotation shaft and the first gear nor the second rotation shaft and the second gear rotate relative to each other. When the first gear and the second gear rotate relative to each other, the first rotation shaft and the second rotation shaft are driven to rotate relative to each other. In this case, the first ball is rollable relative to the peripheral surface of the first rotation shaft and is capable of being positioned in the first stopper slot. The second ball is rollable relative to the peripheral surface of the second rotation shaft and is capable of being positioned in the second stopper slot. When the first ball is positioned in the first stopper slot and the second ball is positioned in the second stopper slot, the first rotation assembly and the second rotation assembly may be in a stable flattened state.

In addition, a third stopper slot may be further disposed in the first rotation shaft. The third stopper slot is disposed in a rotation direction of the first rotation shaft, and is spaced from the first stopper slot. In addition, a fourth stopper slot is disposed in the second rotation shaft. The fourth stopper slot is disposed in a rotation direction of the second rotation shaft, and is spaced from the second stopper slot. When the first ball is positioned in the third stopper slot and the second ball is positioned in the fourth stopper slot, the first rotation assembly and the second rotation assembly may be in a stable closed state.

In this way, when a part of the first ball is aligned with the first stopper slot and a part of the second ball is aligned with the second stopper slot, the first ball and the second ball are in an unstable state. In this case, the first ball and the second ball automatically enter the first stopper slot and the second stopper slot respectively under pushing force of the elastic structural member, so that the first rotation assembly and the second rotation assembly are unfolded flat relative to each other, and the rotation shaft structure is automatically unfolded flat to an extent. Similarly, when a part of the first ball is aligned with the third stopper slot and a part of the second ball is aligned with the fourth stopper slot, the first ball and the second ball are in an unstable state. In this case, the first ball and the second ball automatically enter the third stopper slot and the fourth stopper slot respectively under pushing force of the elastic structural member, so that the first rotation assembly and the second rotation assembly are closed relative to each other, and the rotation shaft structure is automatically closed to an extent. It may be understood that another stopper slot may be further disposed between the first stopper slot and the third stopper slot and between the second stopper slot and the fourth stopper slot, so that the first rotation assembly and the second rotation assembly can stably stay in an intermediate state.

In one embodiment, the damping assembly may further include a first positioning member and a second positioning member. The first positioning member is disposed between the first ball and the elastic structural member. The first positioning member includes a first positioning slot. A part of the first ball is accommodated in the first positioning slot. The first end of the elastic structural member is connected to a surface that is of the first positioning member and that is opposite to the first positioning slot. The second positioning member is disposed between the second ball and the elastic structural member. The second positioning member includes a second positioning slot. A part of the second ball is accommodated in the second positioning slot. The second end of the elastic structural member is connected to a surface that is of the second positioning member and that is opposite to the second positioning slot. In this way, elastic force of the elastic structural member is transferred to the first ball and the second ball through the first positioning member and the second positioning member respectively, so that the first ball and the second ball are tightly pressed onto the rotation shafts on corresponding sides.

In addition, the first positioning member further includes a positioning cradle. The positioning cradle is disposed on the surface that is of the first positioning member and that is opposite to the first positioning slot. The positioning cradle extends into the elastic structural member. The second positioning member may further include a positioning cradle. The positioning cradle is disposed on the surface that is of the second positioning member and that is opposite to the second positioning slot. The positioning cradle extends into the elastic structural member. The positioning cradles that can extend into the elastic structural member are respectively disposed on the first positioning member and the second positioning member, to effectively improve movement stability of the elastic structural member.

The first positioning member further includes a third positioning slot. The third positioning slot and the first positioning slot are respectively located on two surfaces that are of the first positioning member and that are opposite to each other. A part of the elastic structural member is accommodated in the third positioning slot. The second positioning member further includes a fourth positioning slot. The fourth positioning slot and the second positioning slot are respectively located on two surfaces that are of the second positioning member and that are opposite to each other. A part of the elastic structural member is located in the fourth positioning slot. In this embodiment, the positioning cradle of the first positioning member may be disposed in the third positioning slot, and the positioning cradle of the second positioning member may be disposed in the third positioning slot, to further improve movement stability of the elastic structural member.

In another embodiment, the first positioning member further includes a third positioning slot. The third positioning slot and the first positioning slot are respectively located on two surfaces that are of the first positioning member and that are opposite to each other. The third positioning slot is connected to the first positioning slot. The elastic structural member is located in the third positioning slot and presses against the first ball. The second positioning member further includes a fourth positioning slot. The fourth positioning slot and the second positioning slot are respectively located on two surfaces that are of the second positioning member and that are opposite to each other. The fourth positioning slot is connected to the second positioning slot. The elastic structural member is located in the fourth positioning slot and presses against the second ball. In this embodiment, the elastic force of the elastic structural member directly acts on the first ball and the second ball, so that the first ball and the second ball are tightly pressed onto the rotation shafts on the corresponding sides. When the elastic structural member elastically deforms, the elastic structural member and the first ball move relative to the first positioning member, and the elastic structural member and the second ball move relative to the second positioning member.

The damping assembly may further include a pair of clamping members. In a length direction of the main shaft assembly, the pair of clamping members are disposed on two sides of the damping group. The clamping member includes a third sliding slot. First sliders are disposed on two sides of the first positioning member. Second sliders are disposed on two sides of the second positioning member. The first slider and the second slider are located in the third sliding slot. When the elastic structural member elastically deforms, the first slider and the second slider slide in the third sliding slot. The clamping members are disposed on two sides of the first positioning member and the second positioning member, to effectively improve stability of the two positioning members. This allows the damping assembly to provide stable damping force, and stabilizes movements of the rotation shaft structure.

In addition, in a direction from the first folding assembly to the second folding assembly, two ends of the clamping member are rotationally connected to the first rotation shaft and the second rotation shaft respectively. Therefore, the rotation shaft structure is compact in structure. This facilitates a miniaturization design of the rotation shaft structure.

In the foregoing implementation of this application, the first ball may be fastened in the first positioning slot, so that the first ball is in stable contact with the first rotation shaft. Alternatively, the first ball is rollable in the first positioning slot. This helps reduce friction force between the first ball and the first rotation shaft. Similarly, the second ball may be fastened in the second positioning slot, so that the second ball is in stable contact with the second rotation shaft. Alternatively, the second ball is rollable in the second positioning slot. This helps reduce friction force between the second ball and the second rotation shaft.

In another embodiment, the damping assembly includes a first positioning member. The first positioning member is different from that in the foregoing implementation. Specifically, an accommodation slot is disposed in the first positioning member. Two opposite slot walls of the accommodation slot are each provided with a through hole. The elastic structural member is located in the accommodation slot. A part of the first ball is accommodated in one through hole. A part of the second ball is accommodated in the other through hole. The first end of the elastic structural member presses against the first ball. The second end of the elastic structural member presses against the second ball. The positioning member is simple in structure. The positioning member may be configured to position the first ball, the second ball, and the elastic structural member. The positioning member ensures that the first ball and the second ball are aligned with the elastic structural member, so that the elastic structural member can provide enough elastic force for the first ball and the second ball.

The damping assembly may be disposed in another structure of the rotation shaft structure. For example, the damping assembly may be disposed on the housing mounting bracket. In this case, the rotation shaft structure may include a first damping assembly and a second damping assembly. The first damping assembly is located in the first housing mounting bracket. One end of the first damping assembly elastically presses against the first driven arm. The second damping assembly is located in the second housing mounting bracket. One end of the second damping assembly elastically presses against the second driven arm. The first damping assembly and the second damping assembly are configured to provide damping force when the first driven arm and the second driven arm rotate relative to each other.

During specific implementation, a fourth sliding slot is further disposed in the first housing mounting bracket. In a length direction of the main shaft assembly, the fourth sliding slot is disposed on one side of the first sliding slot. The first sliding slot is connected to the fourth sliding slot through a first opening. First protrusions are disposed on a surface that is of a part, mounted in the first sliding slot, of the first driven arm and that faces toward the fourth sliding slot. The first damping assembly includes a first slider and a first elastic structural member. The first slider is inserted into the first opening. The first elastic structural member is accommodated in the fourth sliding slot. One end of the first elastic structural member presses against a surface of the first slider, and the other end presses against a slot wall of the fourth sliding slot. Under effect of elastic force of the first elastic structural member, the first slider is slidable along the first opening and extends into the first sliding slot, and the first slider is clamped to the first protrusions.

Similarly, a fifth sliding slot is further disposed in the second housing mounting bracket. In an extension direction of the main shaft assembly, the fifth sliding slot is disposed on one side of the second sliding slot. The second sliding slot is connected to the fifth sliding slot through a second opening. Second protrusions are disposed on a surface that is of a part, mounted in the second sliding slot, of the second driven arm and that faces toward the fifth sliding slot. The second damping assembly includes a second slider and a second elastic structural member. The second slider is inserted into the second opening. The second elastic structural member is accommodated in the fifth sliding slot. One end of the second elastic structural member presses against a surface of the second slider, and the other end presses against a slot wall of the fifth sliding slot. Under effect of elastic force of the second elastic structural member, the second slider is slidable along the second opening and extends into the second sliding slot, and the second slider is clamped to the second protrusions.

For the damping assembly in this disposing manner, when the housing mounting bracket is in a rotation position, the slider of the damping assembly extends into the sliding slot under effect of the elastic structural member, and is clamped to the protrusion of the driven arm, so that the housing mounting bracket is kept in the rotation position. When action force is applied to the housing mounting bracket to rotate the housing mounting bracket around the main shaft assembly, the protrusion extrudes the slider, and the elastic structural member is compressed. In this state, the slider may freely slide along the surface of the protrusion until being clamped to the protrusion, so that the housing mounting bracket is in a stable state again. This can effectively improve structural stability of the rotation shaft structure.

In addition, the damping assembly is disposed on the housing mounting bracket, so that an arm of force of damping force between the damping assembly and the housing mounting bracket is large. Therefore, the damping assembly can output large torque force in a narrow space, and the housing mounting bracket of the rotation shaft structure can be stably kept in a flattened state, closed state, or intermediate state. In addition, the rotation shaft structure in this disposing manner in this application can further meet an application scenario in which large torque force is required.

In one embodiment, there are at least two first protrusions. The at least two first protrusions are spaced. The first slider is clamped to the two first protrusions. There are at least two second protrusions. The at least two second protrusions are spaced. The second slider is clamped to the two second protrusions. There are at least two first protrusions and at least two second protrusions, so that the two housing mounting brackets can be kept in a stable state in a plurality of rotation positions, to meet a use requirement of a user. In addition, the first slider and the second slider are clamped to the two protrusions, to improve clamping reliability of the sliders and the protrusions.

When the first elastic structural member and the second elastic structural member are specifically disposed, the first elastic structural member may be a spring. A first stopper cradle is disposed on a surface that is of the first slider and that faces toward the first elastic structural member. The first elastic structural member is sleeved on the first stopper cradle. Similarly, the second elastic structural member is a spring. A second stopper cradle is disposed on a surface that is of the second slider and that faces toward the second elastic structural member. The second elastic structural member is sleeved on the second stopper cradle. The first elastic structural member and the second elastic structural member are sleeved on the corresponding stopper cradles, so that the elastic structural members can be prevented from bending in a movement process. This helps improve structural stability of the damping assemblies, and provides stable damping force for the rotation shaft structure.

In one embodiment, the first rotation assembly and the second rotation assembly may use another possible structure in addition to the structures in the foregoing implementations. Regardless of the disposing manner, the first rotation assembly and the second rotation assembly can both stably support the flexible display when the two housings are in a flattened state, and drive the first support plate and the second support plate to rotate around the housings on corresponding sides when the two housings rotate toward or against each other. In addition, the first rotation assembly and the second rotation assembly in any form are used. Provided that relative sliding occurs between the first rotation assembly and the first support plate and between the second rotation assembly and the second support plate, guide shafts may be disposed on the rotation assemblies on corresponding sides, and track slots are disposed in the support plates. Specifically, a first guide structure is disposed on the first support plate. A first track slot is disposed in the first guide structure. A first guide shaft is disposed on the first rotation assembly. The first guide shaft is slidably connected to the first track slot. A second guide structure is disposed on the second support plate. A second track slot is disposed in the second guide structure. A second guide shaft is disposed on the second rotation assembly. The second guide shaft is slidably connected to the second track slot. Therefore, the guide shafts slide in the track slots, to implement slidable connections between the support plates and the rotation assemblies.

In addition, a first lap joint part may further be disposed on the first rotation assembly. The first lap joint part extends in a direction from the main shaft assembly to the first housing mounting bracket. The first support plate has a first surface and a second surface that are disposed opposite to each other. The first surface supports the flexible display. A second lap joint part is disposed on a side that is of the first support plate and that is close to the main shaft assembly. The second lap joint part is disposed on the second surface of the first support plate. The second lap joint part is slidable along a surface of the first lap joint part. A third lap joint part is disposed on the second rotation assembly. The third lap joint part extends in a direction from the main shaft assembly to the second housing mounting bracket. The second support plate has a third surface and a fourth surface that are disposed opposite to each other. The third surface supports the flexible display. A fourth lap joint part is disposed on a side that is of the second support plate and that is close to the main shaft assembly. The fourth lap joint part is disposed on the fourth surface of the second support plate. The fourth lap joint part is slidable along a surface of the third lap joint part. In this way, when the first support plate slides relative to the first rotation assembly, the second lap joint part is slidable along the surface of the first lap joint part. When the second support plate slides relative to the second rotation assembly, the fourth lap joint part is slidable along the surface of the third lap joint part. Therefore, an assembly clearance between the first support plate and the first rotation assembly and an assembly clearance between the second support plate and the second rotation assembly can be compensated for, to improve movement stability of the first support plate and the second support plate.

When the first lap joint part and the second lap joint part are specifically disposed, a surface that is of the first lap joint part and that is in contact with the second lap joint part may be a cambered surface; or a surface that is of the second lap joint part and that is in contact with the first lap joint part may be a cambered surface; or both a surface that is of the first lap joint part and that is in contact with the second lap joint part and a surface that is of the second lap joint part and that is in contact with the first lap joint part may be cambered surfaces. Similarly, a surface that is of the third lap joint part and that is in contact with the fourth lap joint part may be a cambered surface; or a surface that is of the fourth lap joint part and that is in contact with the third lap joint part may be a cambered surface; or both a surface that is of the third lap joint part and that is in contact with the fourth lap joint part and a surface that is of the fourth lap joint part and that is in contact with the third lap joint part may be cambered surfaces. In this way, the first lap joint part on the first rotation assembly and the second lap joint part on the first support plate can move more smoothly in a process of contact and relative sliding. In addition, the third lap joint part on the second rotation assembly and the fourth lap joint part on the second support plate can move more smoothly in a process of contact and relative sliding.

In addition, when the surfaces that are of the two lap joint parts and that are in contact with each other are cambered surfaces, the cambered surface may be formed by splicing at least two curved surfaces, and a preset included angle may be formed between two adjacent curved surfaces, so that the cambered surface can be more adapted to a movement track along which the second lap joint part slides relative to the first lap joint part, to more accurately control sliding tracks of the first support plate and the second support plate.

In one embodiment, a fifth lap joint part is disposed on a side that is of the main shaft assembly and that is close to the first support plate. The fifth lap joint part and the first lap joint part are located on a same side of the second lap joint part. The second lap joint part is lap joined on a surface of the fifth lap joint part. Similarly, a sixth lap joint part is disposed on a side that is of the main shaft assembly and that is close to the second support plate. The sixth lap joint part and the third lap joint part are located on a same side of the fourth lap joint part. The fourth lap joint part is lap-joined on a surface of the sixth lap joint part. The fifth lap joint part and the sixth lap joint part are disposed on the main shaft assembly. This can effectively improve control precision of movement tracks of the first support plate and the second support plate, and effectively reduce an avoidance clearance between the main shaft assembly and both of the first support plate and the second support plate, so that the first support plate and the second support plate can effectively support the flexible display, to reduce a collapse area of the flexible display. In addition, because an effective area of the rotation shaft structure for supporting the flexible display is significantly increased, the flexible display can bear extrusion force in a vertical direction. This reduces a risk of a problem such as a pressing failure in a use process of the flexible display.

According to a second aspect, this application further provides an electronic device. The electronic device includes a first housing, a second housing, a flexible display, and the rotation shaft structure in the first aspect. The first housing mounting bracket is fastened to the first housing. The second housing mounting bracket is fastened to the second housing. The first housing includes a first surface. The second housing includes a second surface. The flexible display continuously covers the first surface of the first housing, the rotation shaft structure, and the second surface of the second housing. The flexible display is respectively fastened to the first surface of the first housing and the second surface of the second housing.

According to the electronic device in this application, when the first housing and the second housing are in a flattened state, the main shaft assembly, the first housing, the first support plate, the second support plate, and the second housing may jointly provide a flat support surface for the flexible display, to avoid a partial collapse problem of the flexible display, and improve flatness of the flexible display. When the first housing and the second housing are in a closed state, a specific angle is formed between the first support plate and the second support plate. In this case, a triangle-like display accommodation space is formed among the first support plate, the second support plate, and the main shaft assembly. In addition, because the flexible display is respectively fastened to the first surface of the first housing and the second surface of the second housing, when the first housing and the second housing are in the closed state, a bent portion of the flexible display is accommodated in the display accommodation space formed among the first support plate, the second support plate, and the main shaft assembly, and may be in a shape of a water drop. In this case, a curvature radius of the bent portion of the flexible display is large, and curvatures of the bent portion of the flexible display are uniform. This can reduce creases of the flexible display, and reduce a risk of bending damage to the flexible display.

In one embodiment, the flexible display includes a first region, a second region, a third region, a fourth region, and a fifth region that are consecutively disposed. The first region is fastened to the first surface of the first housing. The second region is fastened to a surface that is of the first support plate and that faces toward the flexible display. The third region is disposed opposite to the main shaft assembly. The third region is movable relative to the main shaft assembly. The fourth region is fastened to a surface that is of the second support plate and that faces toward the flexible display. The fifth region is fastened to the second surface of the second housing. In this way, when the first housing and the second housing are in a closed state, a bent portion of the flexible display is accommodated in a display accommodation space formed among the first support plate, the second support plate, and the main shaft assembly, and may be in a shape like a water drop. In this case, a curvature radius of the bent portion of the flexible display is large, and curvatures of the bent portion of the flexible display are more uniform. This can reduce creases of the flexible display, and reduce a risk of bending damage to the flexible display.

In one embodiment, when the second region of the flexible display is fastened to the first support plate and the fourth region is fastened to the second support plate, a part of the second region may be fastened to the surface that is of the first support plate and that faces toward the flexible display, and a part of the fourth region may be fastened to the surface that is of the second support plate and that faces toward the flexible display.

A part that is of the second region and that is not fastened to the first support plate is filled with a medium, and the medium is fastened to the flexible display or the first support plate. A part that is of the fourth region and that is not fastened to the second support plate is filled with a medium, and the medium is fastened to the flexible display or the second support plate. Therefore, the first support plate and the second support plate can flat support the second region and the fourth region of the flexible display.

In one embodiment, a rotation axis center of the first support plate relative to the first housing mounting bracket is at a distance of a specific height from the flexible display, and a rotation axis center of the second support plate relative to the second housing mounting bracket is at a distance of a specific height from the flexible display. Therefore, the flexible display is not stretched or extruded in a bending process, damage caused to the flexible display in the bending process can be minimized, and reliability is high.

DESCRIPTION OF REFERENCE NUMERALS OF MAIN COMPONENTS

Figure 1A:
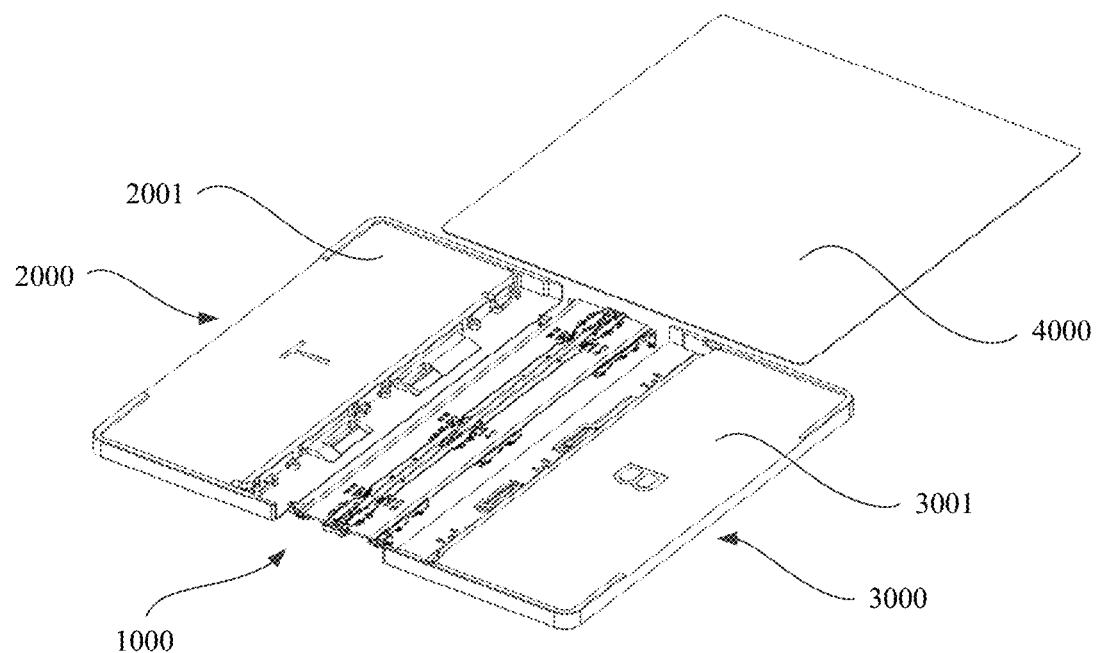
FIG. 1a is an exploded view of an electronic device according to an embodiment of this application.

1000—Rotation shaft structure; 100—Main shaft assembly; 10—Outer housing; 101—Recess;
102—Middle part; 103—Side part;
104—First clamping slot; 105—Second clamping slot; 106—First avoidance slot; 107—Second avoidance slot; 11—Inner housing; 111—Protrusion;
12—Circular arc groove; 13—Pin; 14—Lap joint part;
200—First folding assembly; 20—First housing mounting bracket; 21—Circular arc groove;
22—First sliding slot;
221—First guide space; 23—Second sliding slot; 24—Opening; 25—Stopper slot;
30—First rotation assembly; 31—First guide shaft; 32—First swing arm; 321—Circular arc shaft;
33—First driven arm;
331—First sliding rail; 332—First concave region; 333—First shaft hole; 334—Protrusion; 34—Second pin;
35—Lap joint part; 36a and 36b—Cam structure;
40—First support plate; 40a—First surface; 40b—Second surface; 401—Bonding region; 402—Non-bonding region;
41—First plate body; 42—First rotation structure; 421—First baffle plate; 422—Circular arc shaft; 43—First guide structure;
431—First face; 432—Second face; 433—Peripheral side face; 434—First track slot; 46—Lap joint part;
80—First rotation auxiliary assembly; 81—Shaft body; 82—Elastic member;
300—Second folding assembly; 50—Second housing mounting bracket; 51—Circular arc groove;
60—Second rotation assembly; 61—Second guide shaft; 62—Second swing arm; 63—Second driven arm;
64a and 64b—Cam structure;
70—Second support plate; 70a—Third surface; 70b—Fourth surface; 71—Second rotation structure; 711—Circular arc shaft;
72—Second guide structure; 721—Second track slot;
400—Synchronization assembly; 401—First gear; 4011—First end face; 4012—Second end face;
402—Second gear;
403—Driven gear; 404—Ball slot; 404a—Accommodation slot;
500—Damping assembly; 501a and 501b—Conjoined cam; 502a and 502b—Rotation shaft;
502a1—First stopper slot;
502a2—Third stopper slot; 502a3—Body part; 502a4—First edge part; 502b1—Second stopper slot;
502b2—Fourth stopper slot; 502b3—Body part; 502b4—Second edge part; 5021—Annular groove; 5022—Annular protrusion;
503a, 503b, and 503c—Elastic structural member; 504—Middle shaft; 5041—Annular groove;
505—Arrestor structure;
506—Arrestor structure; 5061—Clamping slot; 507—Guide part; 5071—Guide sleeve; 5071a—Positioning slot;
5071b—First mounting hole; 5072—Pressing block; 5072a—Columnar protrusion; 5072b—Second mounting hole; 508—Ball;
509—Damping group; 5091—Elastic structural member; 5091a—First end; 5091b—Second end;
5092a and 5092b—Ball;
510, 510a, and 510b—Positioning member; 510a1 and 510a2—Positioning slot; 5101—Slider; 5102—Positioning cradle;
5103—Accommodation slot; 5104—through hole; 511—Clamping member; 5111—Sliding slot; 5112—Via hole; 5113—Fastening hole;
512—Slider; 5121—Stopper cradle; 513—Elastic structural member; 514—Stopper;
2000—First housing; 2001—First surface; 2002—Second surface; 3000—Second housing; 3001—Third surface;
3002—Fourth surface; and 4000—Flexible display.

DESCRIPTION OF EMBODIMENTS

The following describes embodiments of this application with reference to the accompanying drawings in the following embodiments of this application.

An embodiment of this application provides a foldable electronic device. The foldable electronic device may include various electronic devices that have a flexible display and that can change an unfolded or folded form of the flexible display and the foldable electronic device. Under different use requirements, the foldable electronic device may be unfolded to a flattened state, or may be folded to a closed state, or may be in an intermediate state between the flattened state and the closed state. In other words, the foldable electronic device has at least two states: the flattened state and the closed state. In some cases, the foldable electronic device may further have a third state, namely the intermediate state between the flattened state and the closed state. It may be understood that the intermediate state is not a unique state, and may be any one or more states between the flattened state and the closed state of the electronic device.

For example, the foldable electronic device may be but is not limited to a mobile phone, a tablet computer, a notebook computer, an e-book reader, a camera, a wearable device, a home electronic device, or the like. For ease of understanding, in embodiments of this application, for example, the foldable electronic device is a mobile phone.

FIG. 1a is an exploded view of a foldable electronic device according to an embodiment of this application. The foldable electronic device may include a rotation shaft structure 1000, a first housing 2000, a second housing 3000, and a flexible display 4000.

The first housing 2000 and the second housing 3000 are disposed on two sides of the rotation shaft structure 1000 and are respectively connected to the rotation shaft structure 1000. The rotation shaft structure 1000 can move, so that the first housing 2000 and the second housing 3000 are folded or unfolded relative to each other.

The first housing 2000 and/or the second housing 3000 may respectively form a mounting space for mounting electronic components such as a circuit board, a battery, a receiver, a speaker, and a camera of the electronic device. The circuit board may integrate electronic components such as a main controller, a storage unit, an antenna module, and a power management module of the electronic device. The battery may supply power to the electronic components such as the flexible display 4000, the circuit board, the receiver, the speaker, and the camera. The first housing 2000 and the second housing 3000 may be equal in thickness, or may be unequal in thickness. This is not limited in this embodiment of this application. In one embodiment, the mounting space may be disposed in both the first housing 2000 and the second housing 3000, to distribute the components of the electronic device in the housings on the two sides. In another embodiment, the mounting space may be disposed in only the first housing 2000, to gather the components of the electronic device in the first housing 2000; or the mounting space may be disposed in both the first housing 2000 and the second housing 3000, but most of the components of the electronic device are disposed in the first housing 2000, and a small part is disposed in the second housing 3000, so that the second housing 3000 is lighter, to facilitate folding and unfolding.

Figure 1B:
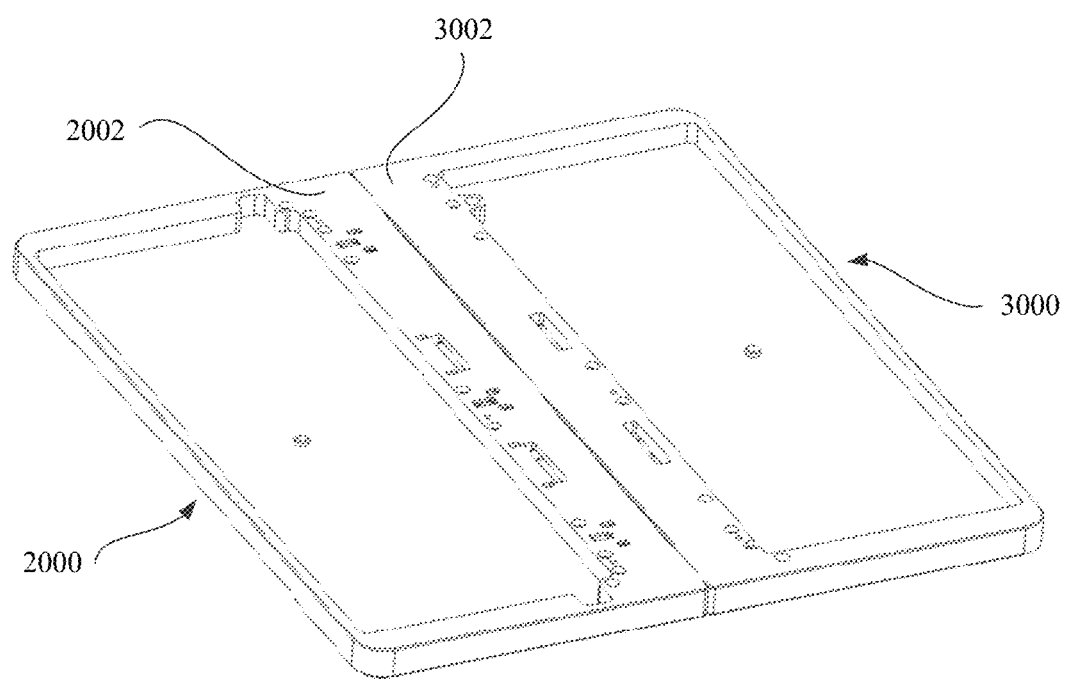
FIG. 1b is a rear view of an electronic device according to an embodiment of this application.

Refer to FIG. 1a and FIG. 1B. FIG. 1B is a schematic diagram of a back structure of a foldable electronic device according to an embodiment of this application. In this embodiment of this application, the first housing 2000 has a first surface 2001 and a second surface 2002 that is disposed opposite to the first surface 2001. The second housing 3000 has a third surface 3001 and a fourth surface 3002 that is disposed opposite to the third surface 3001. The first surface 2001 of the first housing 2000 and the third surface 3001 of the second housing 3000 may jointly support the flexible display 4000. The second surface 2002 of the first housing 2000 and the fourth surface 3002 of the second housing 3000 may be used as an appearance surface of the electronic device. In addition, it may be understood that in some application scenarios, a display may alternatively be disposed on the second surface 2002 of the first housing 2000 and/or the fourth surface 3002 of the second housing 3000. The display may be a flexible display or a non-flexible display. This is not specifically limited herein.

Figure 2:
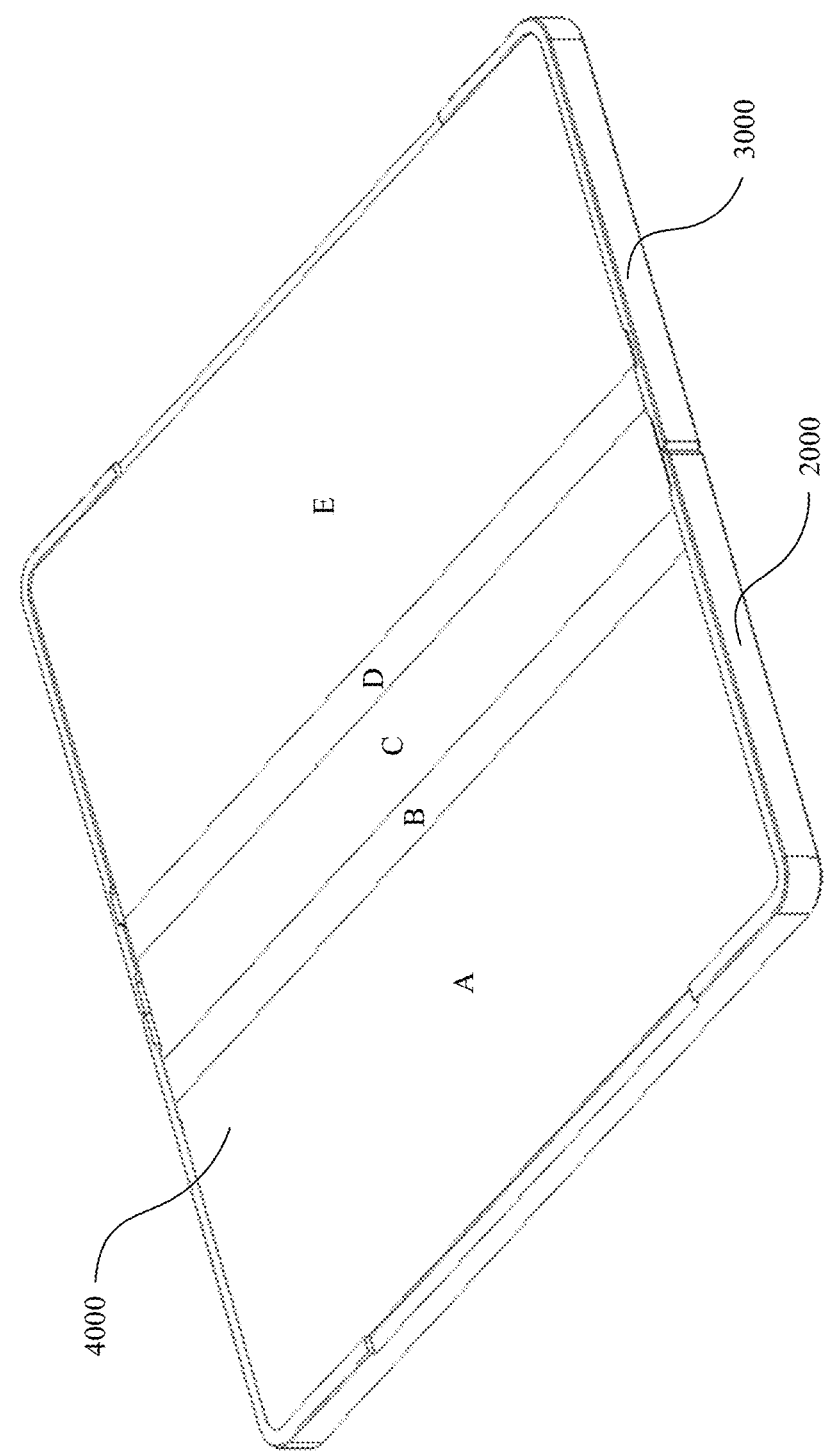
FIG. 2 is a schematic diagram of a structure of an electronic device in a flattened state according to an embodiment of this application.

FIG. 2 is a schematic diagram of a structure of an electronic device in which the first housing 2000 and the second housing 3000 are unfolded away from each other to a flattened state. In this embodiment of this application, when the first housing 2000 and the second housing 3000 are in the flattened state, as shown in FIG. 1a and FIG. 2, the first surface 2001 of the first housing 2000 and the third surface 3001 of the second housing 3000 are in a same plane. In this case, an included angle between the first surface 2001 and the third surface 3001 may be approximately 180° (a tolerance of a specific angle is also allowed, and the included angle between the first surface 2001 and the third surface 3001 is, for example, 165°, 177°, or 185°).

Figure 3A:
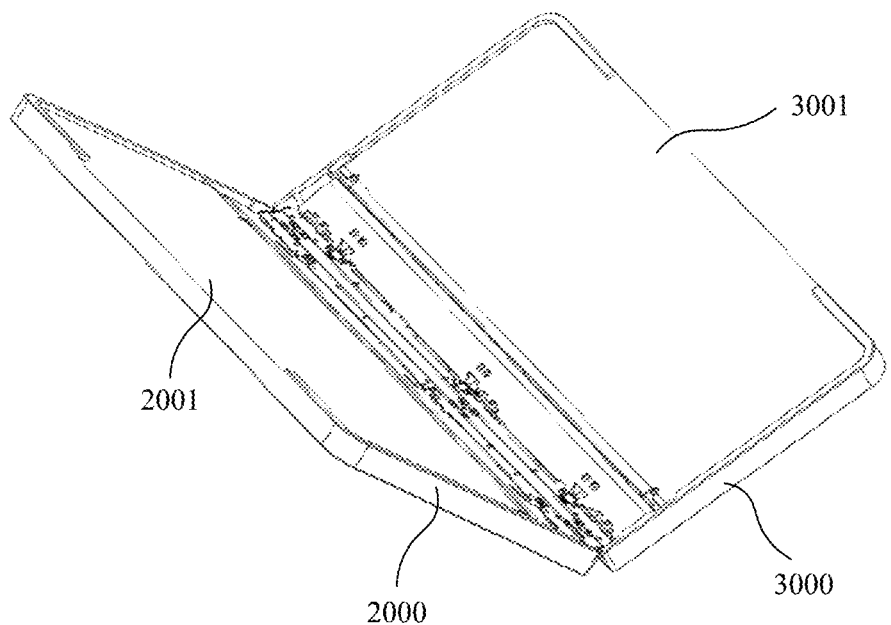
FIG. 3a and FIG. 3b are schematic diagrams of a structure of an electronic device in an intermediate state according to an embodiment of this application.
Figure 3B:
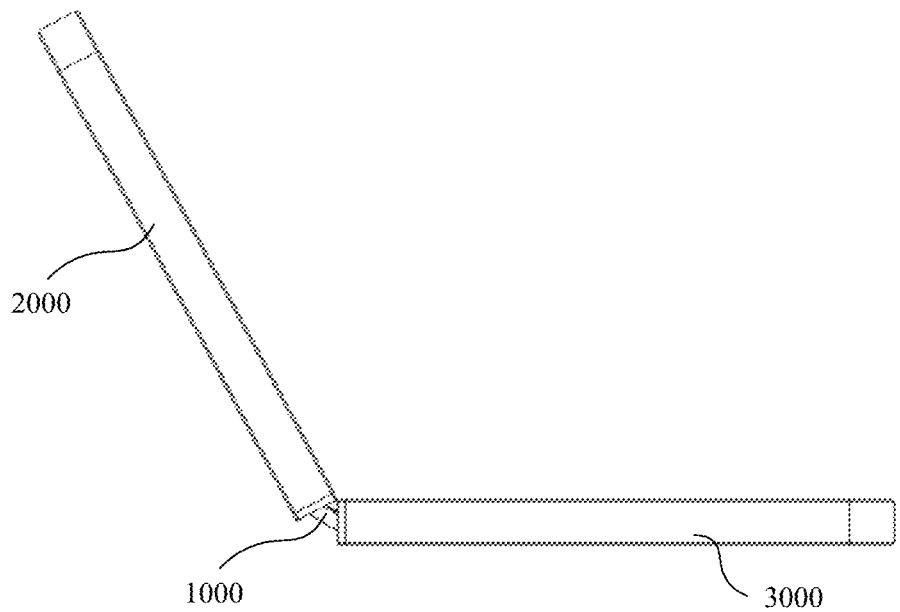

Refer to FIG. 3a and FIG. 3b. FIG. 3a shows a schematic diagram of a structure of an electronic device in which the first housing 2000 and the second housing 3000 rotate (unfolded or folded) relative to each other to an intermediate state. FIG. 3b shows a side view of an electronic device in which the first housing 2000 and the second housing 3000 rotate (unfolded or folded) relative to each other to an intermediate state. The flexible display 4000 is omitted in FIG. 3a, to display forms of the two housings in the intermediate state. In this case, the electronic device may be in any state between a flattened state and a closed state. For example, the included angle between the first surface 2001 of the first housing 2000 and the third surface 3001 of the second housing 3000 may range, for example, from 130° to 150°.

Figure 4:
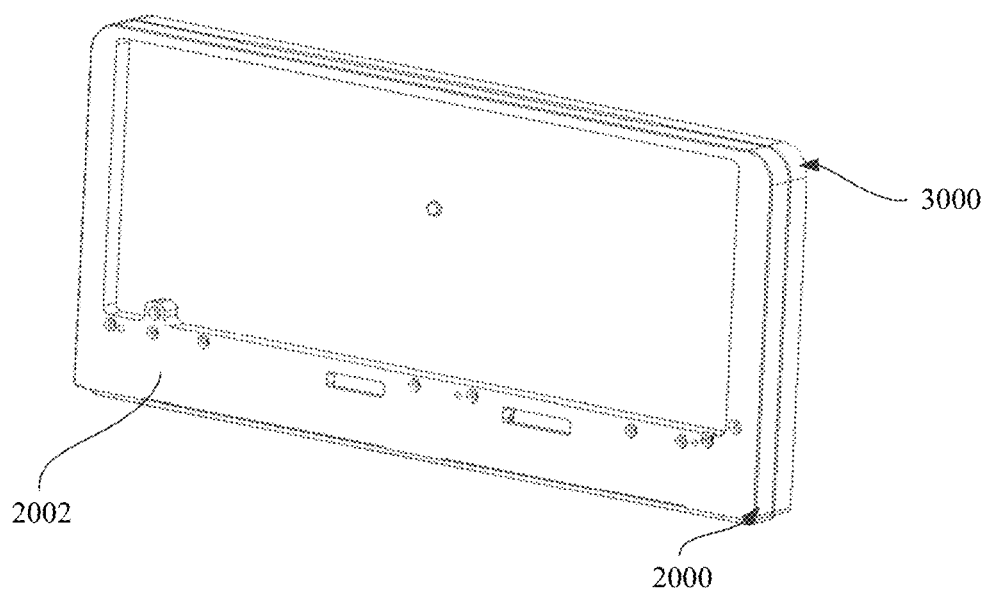
FIG. 4 is a schematic diagram of a structure of an electronic device in a closed state according to an embodiment of this application.

FIG. 4 is a schematic diagram of a structure of an electronic device in which the first housing 2000 and the second housing 3000 are folded toward each other to a closed state. As shown in FIG. 1a and FIG. 4, when the first housing 2000 and the second housing 3000 are in the closed state, the first surface 2001 of the first housing 2000 and the third surface 3001 of the second housing 3000 face toward or away from each other (specifically related to a folding type). In this case, the first surface 2001 of the first housing 2000 and the third surface 3001 of the second housing 3000 may form a small included angle or may be parallel to each other, so that the two housings can be completely folded (a tolerance of a specific angle is also allowed).

The flexible display 4000 may be configured to display information and provide an interaction interface for a user. In embodiments of this application, the flexible display 4000 may be but is not limited to an organic light-emitting diode (OLED) display, an active-matrix organic light-emitting diode (AMOLED) display, a mini light-emitting diode (mini organic light-emitting diode) display, a micro light-emitting diode (micro organic light-emitting diode) display, a micro organic light-emitting diode display, a quantum dot light-emitting diode (QLED) display, or the like.

Further as shown in FIG. 1a and FIG. 2, the flexible display 4000 continuously covers the first surface 2001 of the first housing 2000, the rotation shaft structure 1000, and the third surface 3001 of the second housing 3000 of the foldable electronic device. The flexible display 4000 may be divided into consecutive regions A, B, C, D, and E. The regions B, C, and D include bent portions when being folded. The region A corresponds to the first surface 2001 of the first housing 2000, and may be fastened to the first surface 2001 of the first housing 2000. The region E corresponds to the third surface 3001 of the second housing 3000, and may be fastened to the third surface 3001 of the second housing 3000. It should be noted that boundaries of the regions B, C, and D shown in the figure are merely examples, and the boundaries of the regions B, C, and D may be adjusted based on a specific design of the rotation shaft structure 1000.

Figure 5A:
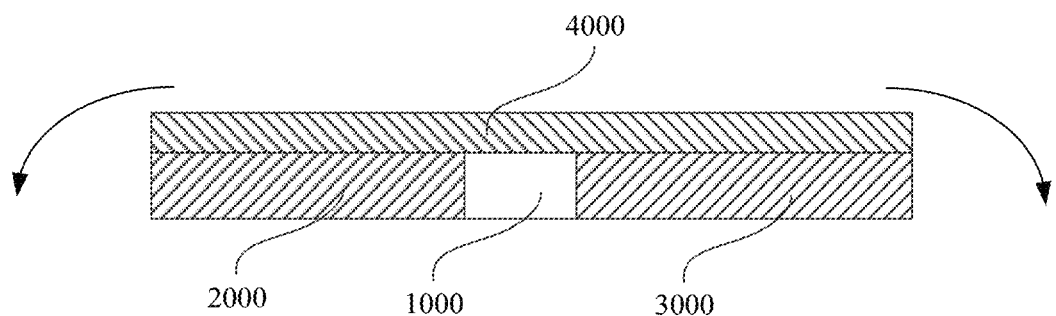
FIG. 5a is a schematic diagram of a structure of an outward folded type electronic device in a flattened state according to an embodiment of this application.
Figure 5B:
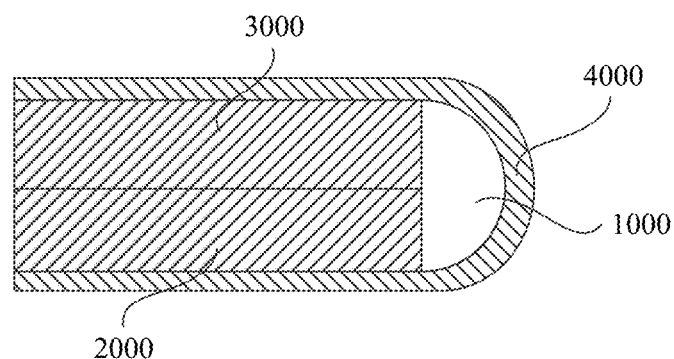
FIG. 5b is a schematic diagram of a structure of an outward folded type electronic device in a closed state according to an embodiment of this application.

As described above, the electronic device may be switched between the flattened state and the closed state through movements of the rotation shaft structure 1000, and the flexible display 4000 may be folded or unfolded along with the first housing 2000 and the second housing 3000. Generally, folding types of the foldable electronic device include an outward folding type and an inward folding type. The outward folding type means that when the electronic device is switched from the flattened state to the closed state and the electronic device is in the closed state, the flexible display 4000 is located on an outer side of the electronic device. In other words, the flexible display 4000 is still visible to the user in the folding process and in the closed state, and the user may further perform some operations on the flexible display 4000 in the closed state. As described above, the first surface 2001 of the first housing 2000 and the third surface 3001 of the second housing 3000 may move away from each other. When the first housing 2000 and the second housing 3000 are in the closed state, the first surface 2001 of the first housing 2000 and the third surface 3001 of the second housing 3000 are opposite to each other. Refer to FIG. 5a and FIG. 5b. FIG. 5a is a schematic diagram of a structure of an outward folding type electronic device in a flattened state. FIG. 5b is a schematic diagram of a structure of an outward folding type electronic device in a closed state. When the electronic device is in the closed state, the flexible display 4000 is located on an outer side of the electronic device. It may be understood that, if no adjustment is performed, in a folding process (namely a process from FIG. 5a to FIG. 5b) of the outward folding type electronic device, a rotation radius of the flexible display 4000 is greater than a rotation radius of the rotation shaft structure 1000, resulting in overstretching of the flexible display 4000. Therefore, in a design of the outward folding type rotation shaft structure 1000, such stretching needs to be avoided or minimized.

Figure 6A:
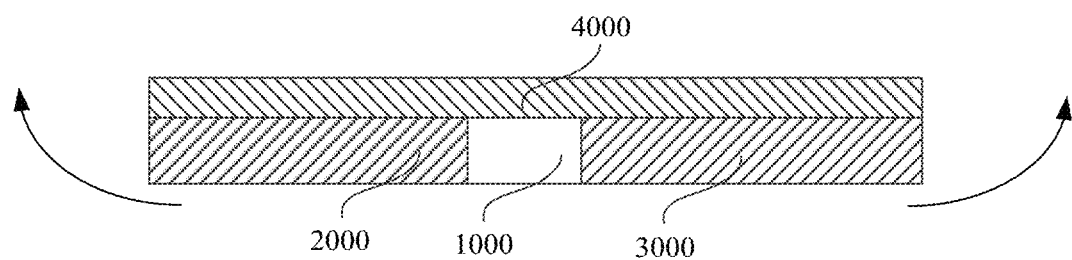
FIG. 6a is a schematic diagram of a structure of an inward folded type electronic device in a flattened state according to an embodiment of this application.
Figure 6B:
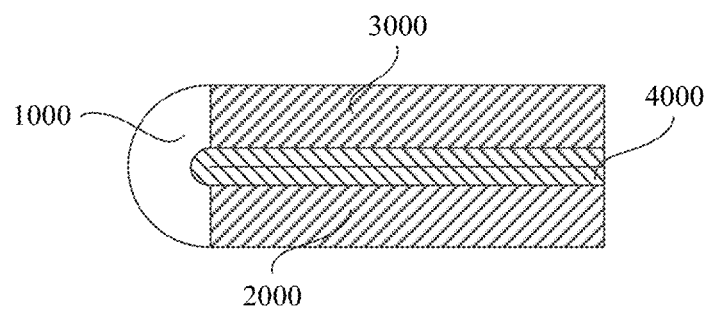
FIG. 6b is a schematic diagram of a structure of an inward folded type electronic device in a closed state according to an embodiment of this application.

Correspondingly, the inward folding type means that when the electronic device is switched from the flattened state to the closed state and the electronic device is in the closed state, the flexible display 4000 is located on an inner side of the electronic device. In other words, the flexible display 4000 is gradually invisible to the user in the folding process until the flexible display 4000 is accommodated between two housings to be completely hidden in the closed state. As described above, the first surface 2001 of the first housing 2000 and the third surface 3001 of the second housing 3000 may move toward each other. When the first housing 2000 and the second housing 3000 are in the closed state, the first surface 2001 of the first housing 2000 and the third surface 3001 of the second housing 3000 face toward each other. Refer to FIG. 6a and FIG. 6b. FIG. 6a is a schematic diagram of a structure of an inward folding type electronic device in a flattened state. FIG. 6b is a schematic diagram of a structure of an inward folding type electronic device in a closed state. When the electronic device is in the closed state, the flexible display 4000 is located on an inner side of the electronic device. It may be understood that, in a folding process (namely a process from FIG. 6a to FIG. 6b) of the inward folding type electronic device, the flexible display 4000 is folded in two. However, a maximum bending degree that the flexible display 4000 can bear is limited. Therefore, there is a corresponding critical curvature radius R (or a critical curvature radius range). Once a curvature radius of a bent position of the flexible display 4000 is less than the critical curvature radius R, the flexible display 4000 is very prone to be broken and can no longer be used. In addition, even if the curvature radius of the bent position is greater than the critical curvature radius, if a curvature radius of the rotation shaft structure 1000 of the electronic device is excessively small, problems such as wrinkles, creases, and internal layer dislocation of the flexible display are caused. Therefore, in a design of the rotation shaft structure 1000 of the inward folding type electronic device, the curvature radius of the bent position of the flexible display 4000 needs to be maximized, to reduce extrusion on the flexible display 4000.

It is easy to understand that an increase of a spacing between two housings in a folded state can increase the curvature radius, so that the flexible display 4000 is not directly folded in two. A larger spacing between the two housings indicates a larger curvature radius of the bent position of the flexible display 4000 and smaller extrusion on the flexible display 4000. A smaller spacing between the two housings indicates a smaller curvature radius of the bent position of the flexible display 4000, larger extrusion on the flexible display 4000 and more obvious creases. In addition, the larger spacing between the two housings indicates a larger thickness of the electronic device in a folded state, and this affects portability of the electronic device. In addition, dust, foreign matter, and the like may enter this spacing, to damage and abrade the flexible display, and this affects a service life of the flexible display, and also affects a service life of the rotation shaft structure.

Based on the foregoing problem of the inward folding type foldable electronic device, embodiments of this application provide a foldable electronic device and a rotation shaft structure applicable to the electronic device, to improve portability of the electronic device and also provide a large accommodation space for the flexible display 4000 in the folding process and in the folded state. This increases the curvature radius of the bent position of the flexible display 4000, and reduces a risk of extrusion damage to the flexible display 4000.

The following first briefly describes main components and related mechanisms that may be related to the rotation shaft structure 1000 provided in this application, and the following further describes a specific structure and an implementation principle of each part in detail.

Figure 7:
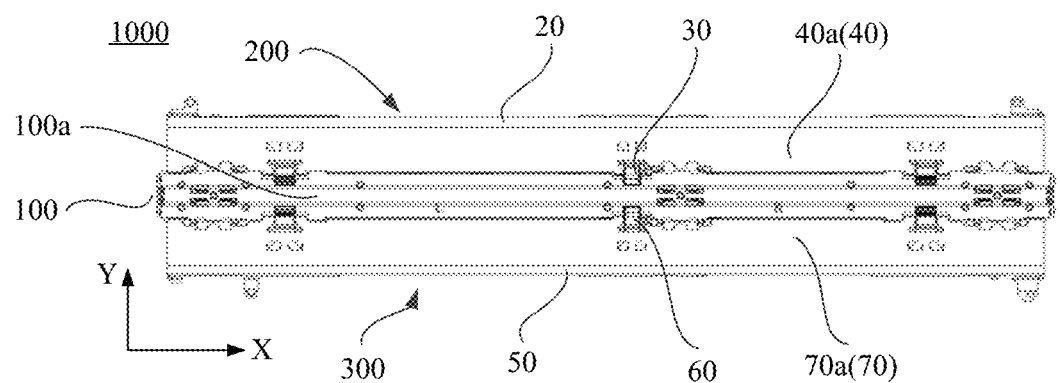
FIG. 7 is a schematic diagram of a structure of a rotation shaft structure in a flattened state according to an embodiment of this application.

As shown in FIG. 7, the rotation shaft structure 1000 (in some scenarios, the rotation shaft structure is also referred to as a hinge) provided in this application may include a main shaft assembly 100 (in some scenarios, the main shaft assembly is also referred to as a main shaft, a main body, or the like), a first folding assembly 200, and a second folding assembly 300. The first folding assembly 200 and the second folding assembly 300 are symmetrically disposed with respect to the main shaft assembly 100, and the first folding assembly 200 and the second folding assembly 300 can rotate toward or against the main shaft assembly 100, to implement folding and unfolding functions of the rotation shaft structure 1000. In addition, as shown in FIG. 1a and FIG. 7, the first housing 2000 may be rotationally connected to the main shaft assembly 100 through the first folding assembly 200, and the second housing 3000 may be rotationally connected to the main shaft assembly 100 through the second folding assembly 300. When the first housing 2000 and the second housing 3000 rotate toward or against each other, the first housing 2000 drives the first folding assembly 200 to rotate around the main shaft assembly 100 in a same direction, and the second housing 3000 drives the second folding assembly 300 to rotate around the main shaft assembly 100 in a same direction, to implement folding or unfolding of the electronic device.

In this application, still as shown in FIG. 7, the main shaft assembly 100, the first folding assembly 200, and the second folding assembly 300 are core assemblies for implementing a folding function of the electronic device, and are mainly configured to cooperate with the two housings to implement the following functions. In the flattened state shown in FIG. 1*a* and FIG. 2, the flexible display 4000 can be supported flat; in the intermediate state and in the unfolding or folding process shown in FIG. 3*a* and FIG. 3*b*, the bent portion of the flexible display 4000 can bear uniform force; and in the folded state shown in FIG. 4, the accommodation space can be provided for the flexible display 4000, and the accommodation space can ensure that the bent portion of the flexible display 4000 has a curvature to an extent to be not extruded. Further, a length of the flexible display 4000 can be substantially unchanged in an entire folding and unfolding process, to ensure reliability of the flexible display 4000.

In addition, to better implement unfolding and folding of the rotation shaft structure 1000, some embodiments of this application further provide more auxiliary mechanisms or modules, for example, a track control mechanism, a movement clearance elimination mechanism, a synchronization mechanism, and a damping mechanism.

The track control mechanism may be configured to control movement tracks of some or all parts in the first folding assembly 200 and the second folding assembly 300 in the folding and unfolding process. Therefore, the parts can move to a specified position in one or more of the foregoing states, to implement effect in a corresponding state. The bent portion of the flexible display 4000 bears uniform force in a movement process, to better prevent the flexible display 4000 from extrusion.

An anti-blocking mechanism may be configured to prevent some or all parts of the first folding assembly 200 and the second folding assembly 300 from being stuck with the main shaft assembly in the folding and unfolding process, and is namely a mechanism that prevents the parts from being interfered with by or blocked by other components on a folding path and from being folded or unfolded unsmoothly. This ensures movement smoothness of the first folding assembly 200 and the second folding assembly 300 and improves user experience.

The movement clearance elimination mechanism is configured to eliminate a movement clearance between each part of the first folding assembly 200 and the first housing 2000, and a movement clearance between the second folding assembly 300 and the second housing 3000. For example, the movement clearance elimination mechanism may eliminate a movement clearance between a housing on a corresponding side and a part that is of the first folding assembly 200 and the second folding assembly 300 and that provides an accommodation space for the flexible display 4000. In this way, the movement tracks of the first folding assembly 200 and the second folding assembly 300 in the folding or unfolding process are more accurate. The parts of the first folding assembly 200 and the second folding assembly 300 are controlled to reach respective corresponding specific positions in a closed state, to provide the accommodation space, meeting requirements, for the flexible display 4000 together with the main shaft assembly 100. This avoids a problem such as extrusion caused to the flexible display 4000 by a movement deviation.

The synchronization mechanism is configured to implement synchronous rotation of the first folding assembly 200 and the second folding assembly 300, so that either the first folding assembly 200 or the second folding assembly 300 moves, and the folding assembly on the other side is driven to move in an approaching direction or an opposite direction. This can prevent the flexible display from being stretched by movements of a folding assembly on only one side. In addition, this can further improve folding or unfolding efficiency of the two folding assemblies and improve user experience.

The damping mechanism is configured to provide specific resistance for the first folding assembly 200 and the second folding assembly 300 when the folding assemblies rotate relative to the main shaft assembly 100. Specifically, the resistance may be felt by hand as jerks of the first folding assembly 200 and the second folding assembly 300 during rotation, so that the user has an obvious feeling on the folding or unfolding process of the electronic device. In addition, the damping mechanism provides damping force for the two folding assemblies, and can further prevent the two folding assemblies from being unfolded or folded by mistake, so that the two folding assemblies can suspend at specified positions. For example, a damping assembly may be disposed in the main shaft assembly, or may be disposed in the two folding assemblies. This is not specifically limited in this application.

In some embodiments of this application, the damping mechanism and the synchronization mechanism may alternatively be designed in a cooperative manner, to reduce a size of the rotation shaft structure and reduce space occupied by the electronic device.

The following describes in detail specific structures, connection relationships, and the like of functional modules of the main shaft assembly of the rotation shaft structure, the first folding assembly and the second folding assembly with reference to the accompanying drawings and specific embodiments.

The terms used in the following embodiments are merely intended to describe specific embodiments, but are not intended to limit this application. Terms "one", "a", "the foregoing", "this", and "the one" of singular forms used in this specification and the appended claims of this application are also intended to include a form like "one or more", unless otherwise specified in the context clearly. It should be further understood that in the following embodiments of this application, "at least one" and "one or more" refer to one, two, or more. The term "and/or" is used to describe an association relationship between associated objects, and indicates that there may be three relationships. For example, A and/or B may represent the following cases: Only A exists, both A and B exist, and only B exists, where A and B may be singular or plural. The character "/" generally represents an "or" relationship between associated objects.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment, instead, they mean "one or more but not all of the embodiments", unless otherwise specifically emphasized. The terms "include", "contain", "have", and their variants all mean "include but are not limited to", unless otherwise specifically emphasized.

FIG. 7 is a schematic diagram of a structure of the rotation shaft structure 1000 according to another embodiment of this application. In a possible embodiment of this application, the first folding assembly 200 may include a first support plate 40 (in some scenarios, the support plate is also referred to as a door plate). The second folding assembly 300 may include a second support plate 70. As shown in FIG. 1a and FIG. 7, when the first housing 2000 and the second housing 3000 are folded toward each other to the closed state, the first housing 2000 rotates relative to the main shaft assembly 100, and drives the first support plate 40 to rotate around the first housing 2000. In this process, one end that is of the first support plate 40 and that is close to the main shaft assembly 100 moves in a direction away from the main shaft assembly 100. Specifically, still as shown in FIG. 7, when the first housing 2000 and the second housing 3000 are folded toward each other to the closed state, one end that is of the first support plate 40 and that is close to the main shaft assembly 100 may move in a Y direction away from the main shaft assembly 100, and also move in a Z direction (a direction perpendicular to an XY plane) away from the main shaft assembly 100. In addition, a rotation direction of the first support plate 40 around the first housing 2000 may be the same as a rotation direction of the first housing 2000. For example, when the first housing 2000 rotates clockwise, the first support plate 40 rotates clockwise around the first housing 2000; or when the first housing 2000 rotates counter-clockwise, the first support plate 40 rotates counter-clockwise around the first housing 2000.

Similarly, the second housing 3000 rotates relative to the main shaft assembly 100, and drives the second support plate 70 to rotate around the second housing 3000. In this process, one end that is of the second support plate 70 and that is close to the main shaft assembly 100 moves in the direction away from the main shaft assembly 100. Specifically, still as shown in FIG. 7, one end that is of the second support plate 70 and that is close to the main shaft assembly 100 may move in the Y direction away from the main shaft assembly 100, and also move in the Z direction (the direction perpendicular to the XY plane in FIG. 7) away from the main shaft assembly 100. In addition, a rotation direction of the second support plate 70 around the second housing 3000 may be the same as a rotation direction of the second housing 3000. For example, when the second housing 3000 rotates clockwise, the second support plate 70 rotates clockwise around the second housing 3000; or when the second housing 3000 rotates counter-clockwise, the second support plate 70 rotates counter-clockwise around the second housing 3000. It may be understood that when the first support plate 40 and the second support plate 70 are driven to rotate, there is no linkage relationship between the main shaft assembly 100 and another structure.

Correspondingly, when the first housing 2000 and the second housing 3000 are unfolded away from each other to the flattened state, the first housing 2000 rotates relative to the main shaft assembly 100, and drives the first support plate 40 to rotate around the first housing 2000. In this process, one end that is of the first support plate 40 and that is close to the main shaft assembly 100 moves in a direction approaching the main shaft assembly 100. Specifically, still as shown in FIG. 7, in this process, one end that is of the first support plate 40 and that is close to the main shaft assembly 100 may move in a Y direction approaching the main shaft assembly 100, and also move in a Z direction (a direction perpendicular to an XY plane in FIG. 7) approaching the main shaft assembly 100. Similarly, one end that is of the second support plate 70 and that is close to the main shaft assembly 100 may move in the Y direction approaching the main shaft assembly 100, and also move in the Z direction (the direction perpendicular to the XY plane in FIG. 7) approaching the main shaft assembly 100.

As shown in FIG. 1a, when the first housing 2000 and the second housing 3000 are in the flattened state, the flexible display 4000 is in a flattened state. As shown in FIG. 7, the first support plate 40 has a first surface 40a disposed toward the flexible display 4000 and a second surface (not shown in the figure) disposed opposite to the first surface 40a. Similarly, the second support plate 70 has a third surface 70a disposed toward the flexible display 4000, and a fourth surface (not shown in the figure) disposed opposite to the third surface 70a. In this case, as shown in FIG. 1a and FIG. 7, the first support plate 40 and the second support plate 70 rotate to a second position, and a support surface 100a that is of the main shaft assembly 100 and that faces toward the flexible display 4000 may be flush with the first surface 2001 of the first housing 2000, the first surface 40a of the first support plate 40, the third surface 70a of the second support plate 70, and the third surface 3001 of the second housing 3000. Alternatively, the support surface 100a that is of the main shaft assembly 100 and that faces toward the flexible display 4000 is not completely flush with the first surface 2001 of the first housing 2000, the first surface 40a of the first support plate 40, the third surface 70a of the second support plate 70, and the third surface 3001 of the second housing 3000. In this case, an uneven region may be filled with a filler such as glue or a steel sheet, so that a flat support surface is provided for the flexible display 4000, to avoid a partial collapse problem of the flexible display 4000, and improve flatness of the flexible display 4000.

Figure 8A:
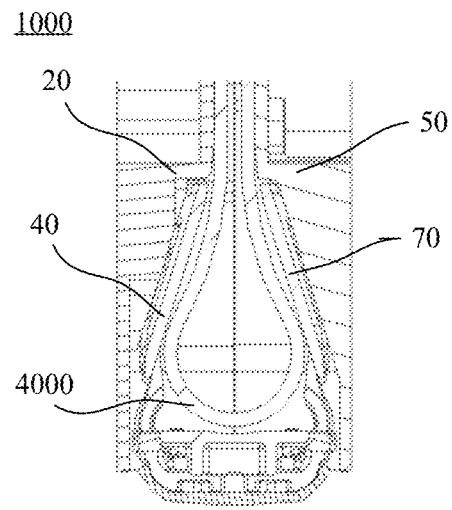
FIG. 8a and FIG. 8b are schematic cross-sectional views of an electronic device in a closed state according to an embodiment of this application.
Figure 8B:
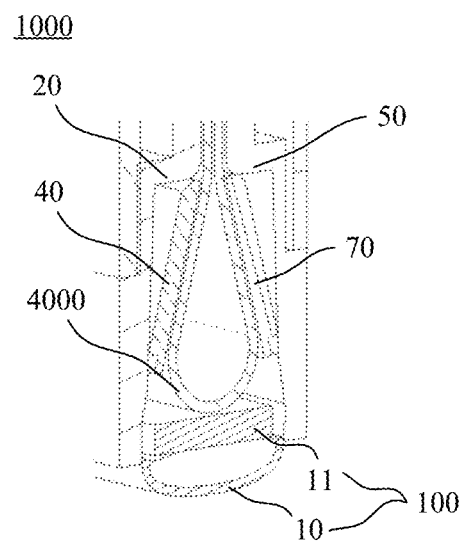

Refer to FIG. 4, FIG. 8a, and FIG. 8b. FIG. 8a and FIG. 8b are sectional views of a rotation shaft structure in a closed state according to an embodiment of this application. In this embodiment of this application, when the first housing 2000 and the second housing 3000 are in the closed state, the first support plate 40 and the second support plate 70 rotate to a first position to form a preset angle in between. In this case, a display accommodation space is formed among the first support plate 40, the second support plate 70, and the main shaft assembly 100. The display accommodation space herein is a space for accommodating the flexible display 4000 in the closed state, so that the flexible display 4000 cannot be extruded. Specifically, the display accommodation space formed among the first support plate 40, the second support plate 70, and the main shaft assembly 100 may be in a form similar to a triangle, but the display accommodation space is not a sealed space. In the closed state, one end that is of the first support plate 40 and that is close to the main shaft assembly 100 and one end that is of the second support plate 70 and that is close to the main shaft assembly 100 are not in contact with the main shaft assembly 100. Further, extension lines of the first support plate 40 and the second support plate 70 may or may not intersect with an edge of the main shaft assembly 100.

Further, a connection manner between the flexible display 4000 and the rotation shaft structure 1000 may affect a form of the flexible display 4000 in the closed state, force applied to the flexible display 4000, and stability in the folding and unfolding process.

In a possible embodiment, still as shown in FIG. 8a, the flexible display 4000 is bonded only to the first housing 2000 and the second housing 3000, and is not bonded to the first support plate 40, the second support plate 70, and the main shaft assembly 100. When the first housing 2000 and the second housing 3000 are in the closed state, a bent portion of the flexible display 4000 is accommodated in the display accommodation space formed among the first support plate 40, the second support plate 70, and the main shaft assembly 100, and may be in a shape of a water drop. It can be learned from FIG. 8a that, according to the rotation shaft structure in this embodiment of this application, when the first housing 2000 and the second housing 3000 are in the closed state, a curvature radius of the bent portion of the flexible display 4000 is large, and curvatures of the bent portion of the flexible display 4000 are uniform. This can reduce creases of the flexible display 4000, and reduce a risk of bending damage to the flexible display 4000.

In some other embodiments of this application, refer to FIG. 8b. FIG. 8b is a sectional view of a rotation shaft structure in a closed state according to another embodiment of this application. In this embodiment of this application, when the flexible display 4000 is fastened to the rotation shaft structure 1000, as shown in FIG. 2, FIG. 7, and FIG. 8b, all or a part of the region B of the flexible display may be fastened to the first surface 40a of the first support plate 40, all or a part of the region D may be fastened to the third surface 70a of the second support plate 70, and the region C of the flexible display 4000 is not fastened to the support surface 100a of the main shaft assembly 100. When a part of the region B and a part of the region D of the flexible display 4000 are fastened to the first support plate 40 and the second support plate 70, a part that is of the region B and that is close to the region A may be fastened to the first surface 40a of the first support plate 40, and a part that is of the region D and that is close to the region E may be fastened to the third surface 70a of the second support plate 70.

The region A of the flexible display 4000 is fastened to the first housing 2000, a part or all of the region B is fastened to the first support plate 40, a part or all of the region D is fastened to the second support plate 70, the region E is fastened to the second housing 3000, and the region C is not fastened to the main shaft assembly 100. In this way, when the first housing 2000 and the second housing 3000 rotate toward each other from the flattened state to be folded, the flexible display 4000 does not slide relative to the first housing 2000, the first support plate 40, the second support plate 70, and the second housing 3000. The part or all that is of the region B and that is fastened to the first support plate 40 may be driven by the first support plate 40 to rotate around the first housing 2000. The part or all that is of the region D and that is fastened to the second support plate 70 may be driven by the second support plate 70 to rotate around the second housing 3000. In this process, the region C of the flexible display 4000 is bent as the first housing 2000 and the second housing 3000 are folded. When the parts are fastened, a part that is of the region B and that is not fastened to the first support plate 40 and a part that is of the region D and that is not fastened to the second support plate 70 may be bent as the first housing 2000 and the second housing 3000 are folded.

When the first housing 2000 and the second housing 3000 are in the closed state, the bent portion of the flexible display 4000 is accommodated in the display accommodation space formed among the first support plate 40, the second support plate 70, and the main shaft assembly 100, and may be in a shape like a water drop. It can be learned from FIG. 8b that the bent portion of the flexible display 4000 includes two straight sides that form a specific included angle, and an arc-shaped side that is connected to the two straight sides and that is close to the main shaft assembly 100. The arc-shaped side has different radiuses, but curvatures change uniformly, to form a shape like a water drop. According to the rotation shaft structure 1000 in this application, when the first housing 2000 and the second housing 3000 are in the closed state, a curvature radius of the bent portion of the flexible display 4000 is large, and curvatures of the bent portion of the flexible display 4000 are more uniform. This can reduce creases of the flexible display 4000, and reduce a risk of bending damage to the flexible display 4000.

It should be noted that, when the regions of the flexible display 4000 mentioned in the foregoing embodiment are respectively fastened to the first surface 2001 of the first housing 2000, the third surface 3001 of the second housing 3000, the first surface 40a of the first support plate 40, and the third surface 70a of the second support plate 70, the flexible display 4000 may be fastened directly or indirectly (for example, fastened through a metal sheet). To be specific, the flexible display 4000 may be directly fastened to a corresponding surface, or may be first fastened to a structure such as the metal sheet, and then the metal sheet is fastened to the corresponding surface. In other words, the metal sheet is disposed as an intermediate layer between the flexible display 4000 and all of the first housing 2000, the second housing 3000, and the rotation shaft structure 1000, so that the flexible display 4000 is fastened to the corresponding surface.

Figure 8C:
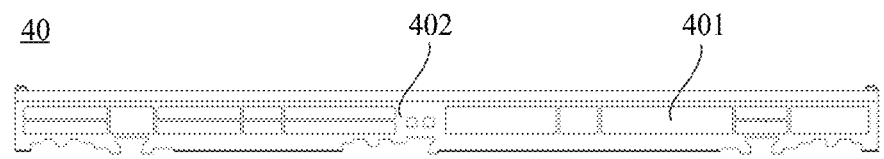
FIG. 8c is a schematic diagram of a structure of a first support plate according to an embodiment of this application.

It should be further noted that, regardless of the direct or indirect manner, the flexible display 4000 may be fastened through a binder (for example, dispensed glue or back glue), or may be fastened through another manner such as welding. This is not specifically limited in this application. In one embodiment, when fastening of the region B and the first support plate 40 and fastening of the region D and the second support plate 70 are implemented through the binder, refer to FIG. 8c. FIG. 8c shows a fastening relationship between the flexible display 4000 and the first support plate 40, and certainly may also indicate a fastening relationship between the flexible display 4000 and the second support plate 70. In a length direction and a width direction (namely, an X direction and the Y direction in FIG. 7) of the main shaft assembly 100, the region B and the region D may be continuously or discontinuously bonded to the corresponding first support plate 40 and the corresponding second support plate 70 respectively. In a case of discontinuous bonding, a part of the region B and a part of the region D are fastened to a surface that is of the corresponding first support plate 40 and that faces toward the flexible display 4000 and a surface that is of the corresponding second support plate 70 and that faces toward the flexible display 4000. In other words, some regions (hereinafter referred to as bonding regions 401, and regions shown by a plurality of blocks in FIG. 8c may represent the bonding regions 401) that are fastened to the corresponding first support plate 40 and the corresponding second support plate 70 and some regions (hereinafter referred to as non-bonding regions 402) that are not fastened to the corresponding first support plate 40 and the corresponding second support plate 70 exist in the region B and the region D. A binder may be disposed on the bonding regions 401, to fasten the flexible display 4000 to the corresponding first support plate 40 or the corresponding second support plate 70. Between the region B of the flexible display 4000 and the first support plate 40 and between the region D and the second support plate 70, the non-bonding regions 402 may be filled with a medium (not shown in the figure). The medium and the corresponding support plates are fastened or integrally molded, but the medium is not bonded to the flexible display 4000. Alternatively, the medium is bonded to the region B or the region D of the flexible display 4000, but is not bonded to the support plates. Therefore, the first support plate 40 and the second support plate 70 can smoothly support the region B and the region D of the flexible display 4000. It may be understood that the bonding regions 401 and the non-bonding regions 402 shown in FIG. 8c in this application are merely examples. During specific implementation, the bonding regions 401 and the non-bonding regions 402 may alternatively be distributed in a plurality of manners. Details are not described in this application.

The following describes each assembly of the rotation shaft structure 1000 in detail.

Figure 9:
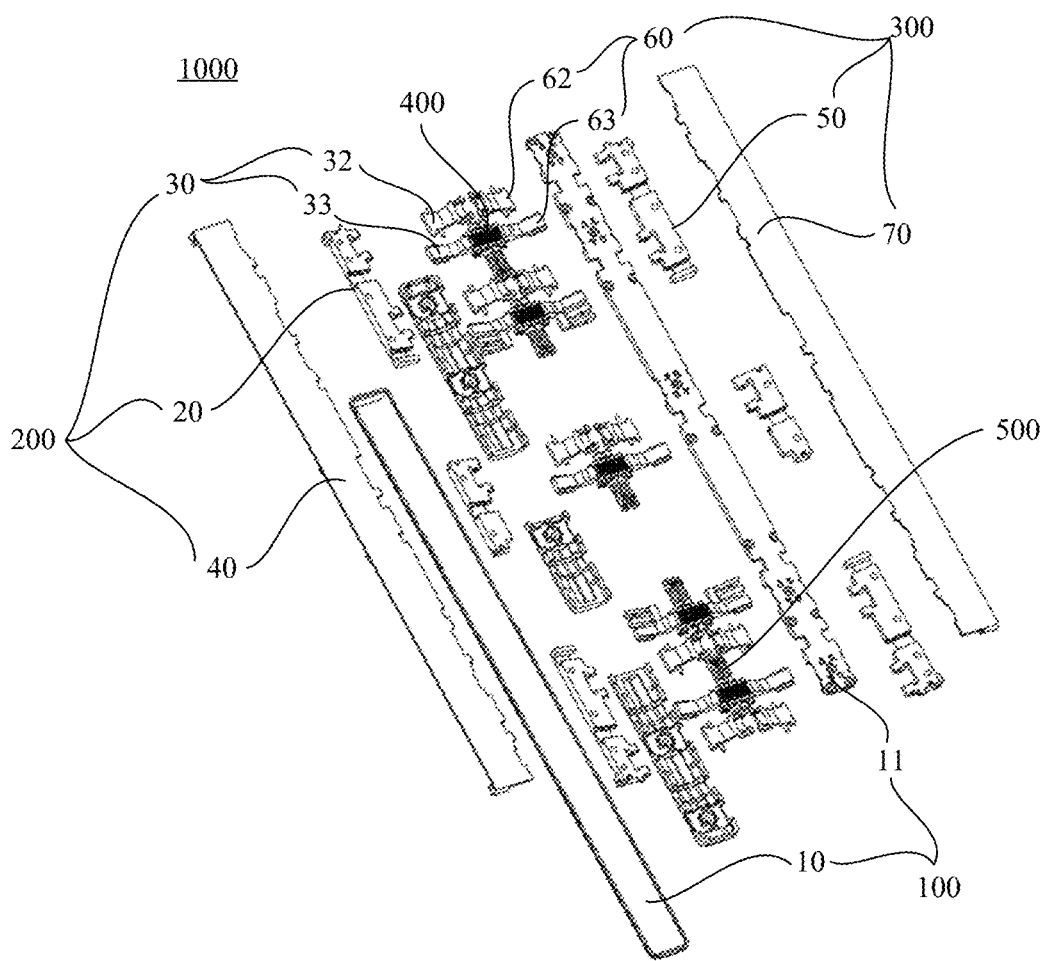
FIG. 9 is an exploded view of a rotation shaft structure according to an embodiment of this application.

In some embodiments of this application, the main shaft assembly 100 may be a solid integrated structure, and may be used as a base for supporting rotation of the first folding assembly 200 and the second folding assembly 300. In some other embodiments of this application, refer to FIG. 7 and FIG. 9. FIG. 9 is an exploded view of a rotation shaft structure 1000 according to an embodiment of this application. The main shaft assembly 100 may include an outer housing 10 and an inner housing 11. A receptacle may be formed between the outer housing 10 and the inner housing 11. The inner housing 11 may support the flexible display 4000, and the support surface 100a of the main shaft assembly 100 is a surface that is of the inner housing 11 and that faces toward the flexible display 4000. The outer housing 10 of the main shaft assembly 100 may protect parts in the receptacle. A surface that is of the outer housing 10 and that is away from the inner housing may be used as an appearance surface, to ensure a beautiful and neat appearance of the entire electronic device. In addition, in this embodiment of this application, the outer housing 10 and the inner housing 11 may be fastened through a screw, or may be connected through another manner such as clamping, welding, or bonding. For ease of description, the length direction of the main shaft assembly 100 may be defined in this application. As shown in FIG. 7 and FIG. 9, the length direction of the main shaft assembly 100 may be a rotation axis direction of the first folding assembly 200 and the second folding assembly 300.

Still as shown in FIG. 9, in some embodiments of this application, the first folding assembly 200 may further include a first housing mounting bracket 20 (in some scenarios, the housing mounting bracket is also referred to as a swing link, a mounting bracket, or the like) and a first rotation assembly 30. In a possible embodiment of this application, as shown in FIG. 1a and FIG. 9, the first housing mounting bracket 20 is an independent structure, and a plurality of fastening holes may be disposed in the first housing mounting bracket 20. In this way, the first housing mounting bracket 20 may be fastened to the first housing 2000 through a plurality of fasteners that are in a one-to-one correspondence to the plurality of fastening holes. In some other embodiments of this application, the first housing mounting bracket 20 and the first housing 2000 may alternatively be integrally molded. In other words, the first housing mounting bracket 20 is used as a part of the first housing 2000. Therefore, a structure of the rotation shaft structure 1000 is simplified.

The first rotation assembly 30 is rotationally connected to the main shaft assembly 100, so that the first housing 2000 rotates relative to the main shaft assembly 100 as described above. In addition, the first support plate 40 is rotationally connected to the first housing mounting bracket 20 and slidably connected to the first rotation assembly 30, so that the first support plate 40 rotates around the first housing 2000 and reaches a specified position in a folded state, to form the accommodation space.

Similarly, as shown in FIG. 9, the second folding assembly 300 may include a second housing mounting bracket 50 and a second rotation assembly 60. As shown in FIG. 1a and FIG. 9, the second housing mounting bracket 50 is an independent structure, and a plurality of fastening holes may be disposed in the second housing mounting bracket 50. In addition, the second housing mounting bracket 50 may be fastened to the second housing 3000 through a plurality of fasteners that are in a one-to-one correspondence to the plurality of fastening holes. In some other embodiments of this application, the second housing mounting bracket 50 and the second housing 3000 may alternatively be integrally molded. In other words, the second housing mounting bracket 50 is used as a part of the second housing 3000. Therefore, a structure of the rotation shaft structure is simplified.

The second rotation assembly 60 is rotationally connected to the main shaft assembly 100, so that the second housing 3000 rotates relative to the main shaft assembly 100 as described above. In addition, the second support plate 70 is rotationally connected to the second housing mounting bracket 50 and slidably connected to the second rotation assembly 60, so that the second support plate 70 rotates around the second housing 3000 and reaches a specified position in a folded state, to form the accommodation space.

It should be noted that the first rotation assembly 30 and the second rotation assembly 60 may be symmetrically disposed with respect to the main shaft assembly 100, or may be asymmetrically disposed. This is not limited in this application.

As shown in FIG. 1a, FIG. 7, and FIG. 9, because the first housing mounting bracket 20 is fastened to the first housing 2000 and the second housing mounting bracket 50 is fastened to the second housing 3000, when the first housing 2000 and the second housing 3000 rotate relative to each other, the first housing mounting bracket 20 and the second housing mounting bracket 50 rotate relative to each other, the first housing mounting bracket 20 drives the first rotation assembly 30 to rotate around the main shaft assembly 100, and the second housing mounting bracket 50 drives the second rotation assembly 60 to rotate around the main shaft assembly 100. In addition, the first rotation assembly 30 drives the first support plate 40 to rotate relative to the first housing mounting bracket 20, so that the first support plate 40 slides relative to the first rotation assembly 30 in a direction perpendicular to a rotation axis of the first rotation assembly 30, to drive one end that is of the first support plate 40 and that is close to the main shaft assembly 100 to move in a direction away from the main shaft assembly 100. The second rotation assembly 60 drives the second support plate 70 to rotate relative to the second housing mounting bracket 50, so that the second support plate 70 slides relative to the second rotation assembly 60 in a direction perpendicular to a rotation axis of the second rotation assembly 60, to drive one end that is of the second support plate 70 and that is close to the main shaft assembly 100 to move in the direction away from the main shaft assembly 100, so that the first support plate 40 and the second support plate 70 form a preset included angle when rotating to a first position, and enclose a display accommodation space together with the main shaft assembly.

In this embodiment of this application, a rotation direction of the first support plate 40 relative to the first housing mounting bracket 20 may be the same as a rotation direction of the first rotation assembly 30 around the main shaft assembly 100. For example, when the first rotation assembly 30 rotates clockwise around the main shaft assembly 100, the first support plate 40 rotates clockwise relative to the first housing mounting bracket 20. When the first rotation assembly 30 rotates counter-clockwise around the main shaft assembly 100, the first support plate 40 rotates counter-clockwise relative to the first housing mounting bracket 20. Similarly, a rotation direction of the second support plate 70 relative to the second housing mounting bracket 50 may be the same as a rotation direction of the second rotation assembly 60 around the main shaft assembly 100. For example, when the second rotation assembly 60 rotates clockwise around the main shaft assembly 100, the second support plate 70 rotates clockwise relative to the second housing mounting bracket 50. When the second rotation assembly 60 rotates counter-clockwise around the main shaft assembly 100, the second support plate 70 rotates counter-clockwise relative to the second housing mounting bracket 50.

When the first housing 2000 and the second housing 3000 rotate against each other, the first housing mounting bracket 20 and the second housing mounting bracket 50 rotate against each other, the first housing mounting bracket 20 drives the first rotation assembly 30 to rotate around the main shaft assembly 100, and the second housing mounting bracket 50 drives the second rotation assembly 60 to rotate around the main shaft assembly 100. In addition, the first rotation assembly 30 drives the first support plate 40 to rotate in a same direction relative to the first housing mounting bracket 20, so that the first support plate 40 slides relative to the first rotation assembly 30 in the direction perpendicular to the rotation axis of the first rotation assembly 30, to drive one end that is of the first support plate 40 and that is close to the main shaft assembly 100 to move in a direction approaching the main shaft assembly 100. The second rotation assembly 60 drives the second support plate 70 to rotate in a same direction relative to the second housing mounting bracket 50, so that the first support plate 40 slides relative to the first rotation assembly in the direction perpendicular to the rotation axis of the first rotation assembly, to drive one end that is of the second support plate 70 and that is close to the main shaft assembly 100 to move in the direction approaching the main shaft assembly 100, so that when the first support plate 40 and the second support plate 70 rotate to a second position, the first support plate 40, the second support plate 70, and the main shaft assembly 100 are unfolded flat to form a support surface. In addition, in this application, there may be a plurality of first rotation assemblies 30 and a plurality of second rotation assemblies 60 in pairs, and the plurality of first rotation assemblies 30 and the plurality of second rotation assemblies 60 are disposed at intervals in the length direction of the main shaft assembly 100. This can effectively improve rotation stability of the rotation shaft structure 1000.

It can be learned from the foregoing that the larger curvature radius of the bent position of the flexible display 4000 reduces the risk of bending damage to the flexible display 4000, and can effectively reduce the creases of the flexible display 4000. It can be learned from FIG. 8*a* and FIG. 8*b* that the included angle between the first support plate 40 and the second support plate 70 plays a decisive role in the curvature radius of the bent position of the flexible display 4000. However, in this application, the first support plate 40 may be driven by the first rotation assembly 30 to rotate around the first housing mounting bracket 20, and the second support plate 70 may be driven by the second rotation assembly 60 to rotate around the second housing mounting bracket 50. Therefore, the following describes structures and related connection relationships of the first rotation assembly 30 and the second rotation assembly 60. Because the first rotation assembly 30 and the second rotation assembly 60 are substantially the same in structure and connection relationship, the following mainly describes in detail the first rotation assembly 30 as an example.

Firstly, a specific structural design of the first rotation assembly 30 and the second rotation assembly 60 in some embodiments of this application is described.

Figure 10:
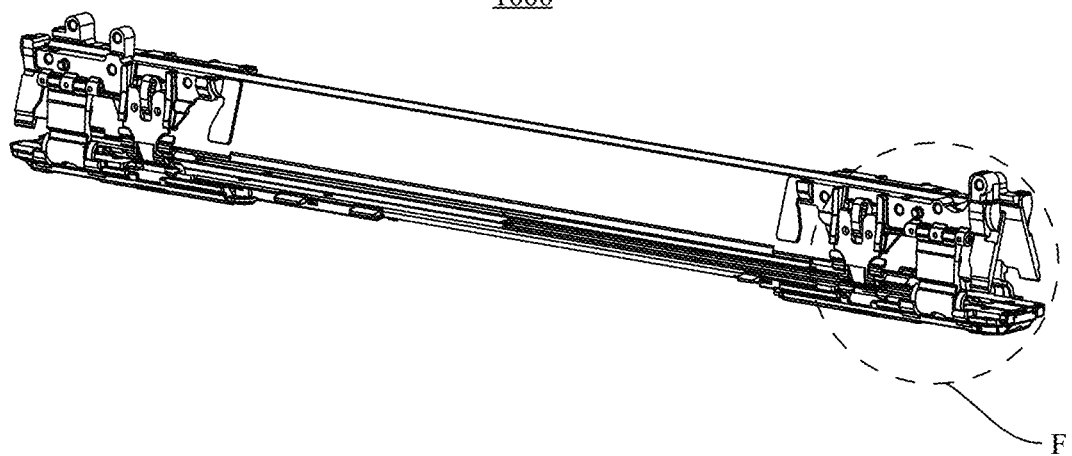
FIG. 10 is a schematic diagram of a structure of a rotation shaft structure in a closed state according to an embodiment of this application.

FIG. 10 is a schematic diagram of a structure of a rotation shaft structure in a closed state according to an embodiment of this application. In this application, the first rotation assembly 30 may include a first driven arm 33 and a first swing arm 32 (in some scenarios, the driven arm is also referred to as a transmission arm, and the swing arm is also referred to as a rotation arm, a sliding arm, or the like). One end of the first driven arm 33 is slidably connected to the first housing mounting bracket 20, and the other end is rotationally connected to the main shaft assembly 100. One end of the first swing arm 32 is rotationally connected to the first housing mounting bracket 20, and the other end is rotationally connected to the main shaft assembly 100.

Figure 11:
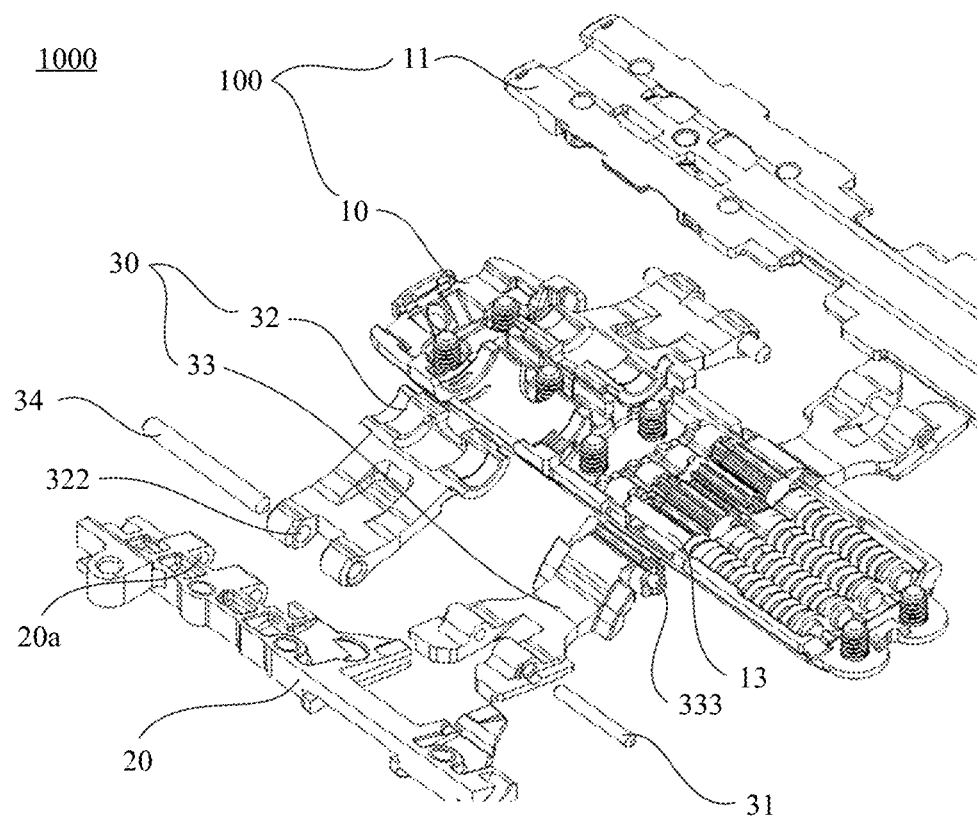
FIG. 11 is an exploded view of a rotation shaft structure according to another embodiment of this application.

In some embodiments of this application, as shown in FIG. 11, to implement a rotational connection between the first driven arm 33 and the main shaft assembly 100, the first driven arm 33 and the main shaft assembly 100 may be rotationally connected through a pin shaft. Specifically, a first shaft hole 333 is disposed in one end that is of the first driven arm 33 and that is connected to the main shaft assembly 100, and a structure such as a pin shaft 13 fastened in the main shaft assembly 100 penetrates the first shaft hole 333 of the first driven arm 33, to implement the rotational connection between the first driven arm 33 and the main shaft assembly 100. In some other embodiments of this application, an arc-shaped arm may alternatively be disposed at one end that is of the first driven arm 33 and that is close to the main shaft assembly 100, an arc-shaped groove is disposed in the main shaft assembly 100, and the arc-shaped arm is mounted in the arc-shaped groove. Therefore, the rotational connection between the first driven arm 33 and the main shaft assembly 100 is implemented through relative movements (for example, sliding) of the arc-shaped arm and the arc-shaped groove. In this case, the rotational connection between the first driven arm 33 and the main shaft assembly 100 is implemented by using a virtual axis.

It may be understood that the rotational connection between the first driven arm 33 and the main shaft assembly 100 is merely some example descriptions provided in this application. In some possible embodiments of this application, the first driven arm 33 and the main shaft assembly 100 may alternatively rotate relative to each other in another possible manner.

Figure 12:
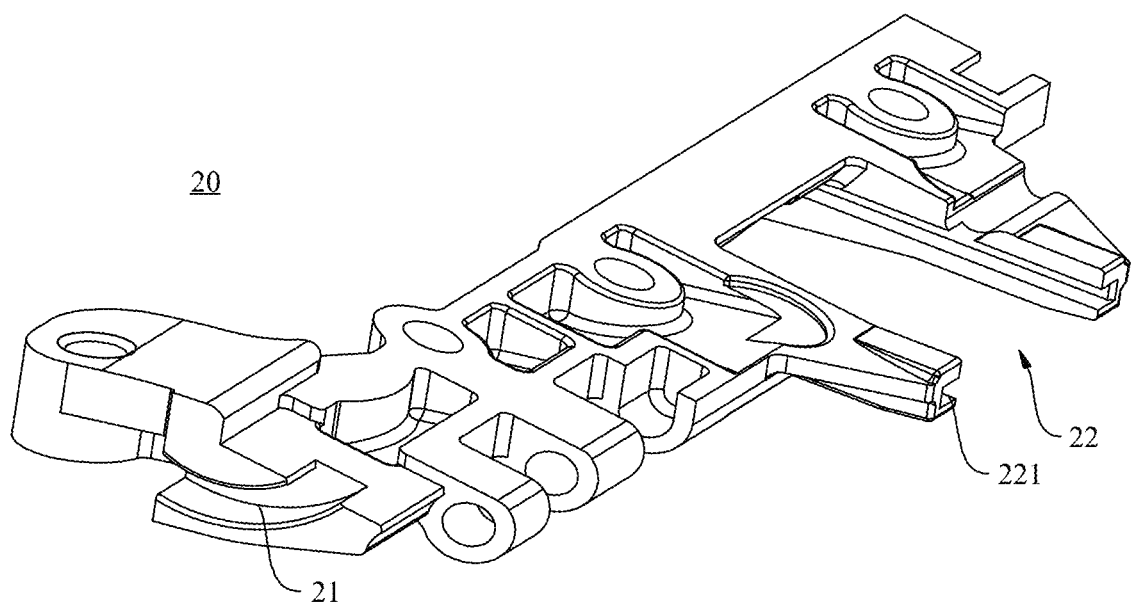
FIG. 12 is a schematic diagram of a structure of a first housing mounting bracket according to an embodiment of this application.

In an embodiment provided in this application, to implement a slidable connection between the first driven arm 33 and the first housing mounting bracket 20, refer to FIG. 11 and FIG. 12. FIG. 12 is a schematic diagram of a structure of the first housing mounting bracket 20 according to an embodiment of this application. A first sliding slot 22 may be disposed in the first housing mounting bracket 20. For example, the first sliding slot 22 may have two oppositely disposed side walls, and the two oppositely disposed side walls are respectively recessed to form first guide spaces 221 of the first sliding slot 22. A first sliding rail (not shown in the figure) may be disposed on the first driven arm 33, and the first sliding rail is slidably disposed in the first guide spaces 221. In this way, the first guide spaces 221 of the side walls of the first sliding slot 22 may be configured to guide a sliding direction of the first sliding rail on the first driven arm 33, to implement the slidable connection between the first driven arm 33 and the first housing mounting bracket 20. In this way, it is easier to implement relative sliding movements between the first housing mounting bracket 20 and the first driven arm 33, and control precision is higher. It may be understood that, in some other embodiments of this application, the first sliding slot 22 may alternatively be disposed in the first driven arm 33, and the first sliding rail may alternatively be disposed on the first housing mounting bracket 20.

In an embodiment provided in this application, for example, to implement a rotational connection between the first swing arm 32 and the main shaft assembly 100, the rotational connection between the first swing arm 32 and the main shaft assembly 100 may be specifically implemented by using a virtual axis.

Figure 13A:
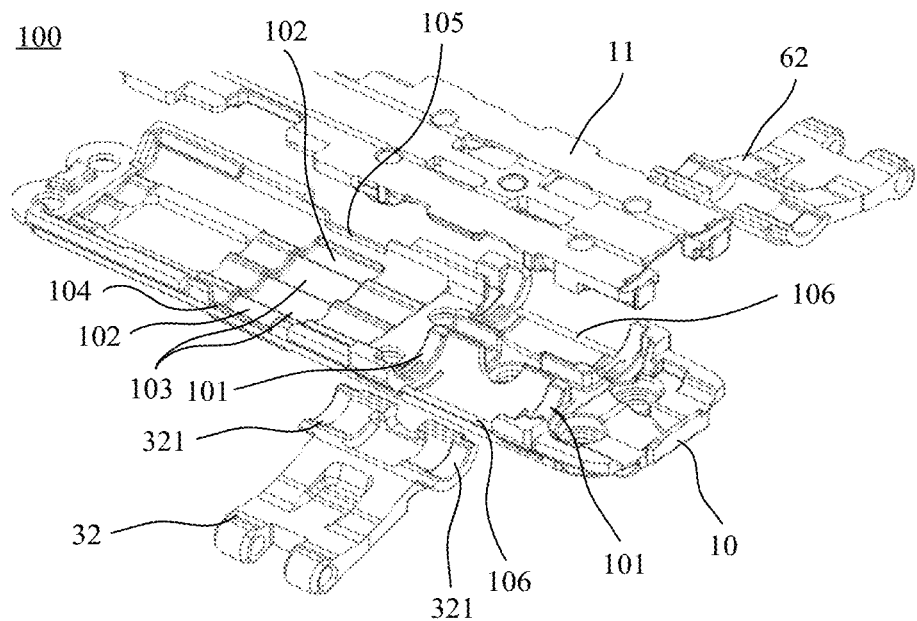
FIG. 13a is an exploded view of a rotation shaft structure according to an embodiment of this application.
Figure 13B:
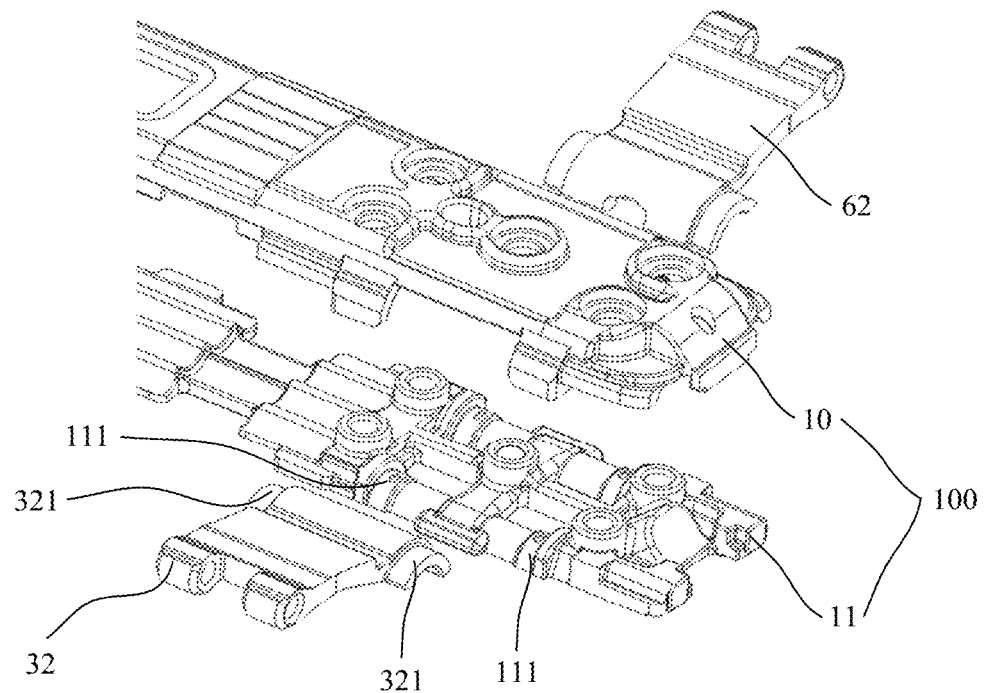
FIG. 13b is an exploded view of a rotation shaft structure according to another embodiment of this application.
Figure 13C:
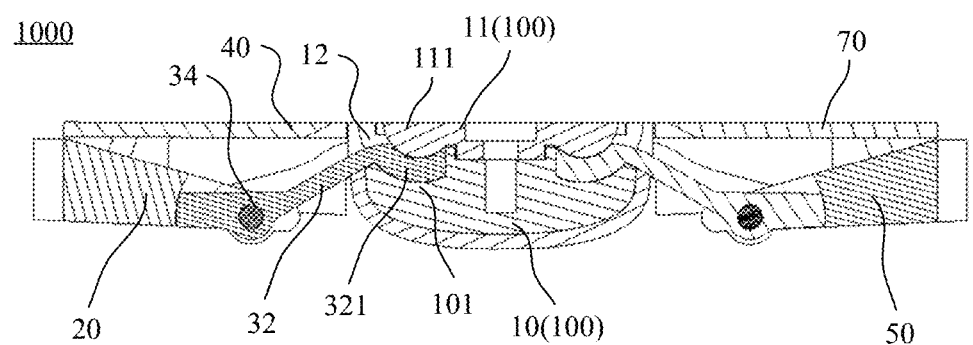
FIG. 13c is a schematic cross-sectional view of a rotation shaft structure in a flattened state according to an embodiment of this application.

Specifically, refer to FIG. 13a and FIG. 13b. FIG. 13a and FIG. 13b show schematic diagrams of a connection structure between the first swing arm 32 and the main shaft assembly 100 and a connection structure between a second swing arm 62 and the main shaft assembly 100 according to an embodiment. Recesses 101 may be disposed in the outer housing 10 of the main shaft assembly 100, and protrusions 111 may be disposed on the inner housing 11. The recesses 101 may be arc-shaped recesses, and the protrusions 111 may be arc-shaped protrusions. In this way, refer to FIG. 13a, FIG. 13b, and FIG. 13c. FIG. 13c is a sectional view of an assembly structure of the first swing arm 32, the second swing arm 62, and the main shaft assembly 100 according to an embodiment of this application. After the outer housing 10 and the inner housing 11 are snap-fitted and fastened, the recesses 101 and the protrusions 111 are snap-fitted to form arc-shaped circular arc grooves 12. In other words, arc-shaped gaps are formed between the recesses 101 and the protrusions 111. In some embodiments of this application, when the main shaft assembly 100 is a solid integrated structure, the circular arc grooves 12 may alternatively be grooves directly formed in the main shaft assembly 100, and have a specific structure form similar to that in the foregoing embodiment.

In addition, circular arc shafts 321 are disposed at one end of the first swing arm 32, and the circular arc shafts 321 are assembled in the circular arc grooves 12, to implement the rotational connection between the first swing arm 32 and the main shaft assembly 100. Through a connection manner of the virtual axes, the connection structure between the first swing arm 32 and the main shaft assembly 100 may be well hidden in the main shaft assembly 100. This helps improve integration and user experience of the rotation shaft structure 1000. In addition, the connection manner of the virtual axes further helps implement a thinner design of an entire machine. It may be understood that, in some embodiments of this application, the circular arc shafts 321 may alternatively be disposed on the main shaft assembly 100, and the circular arc grooves 12 may alternatively be disposed in the first swing arm 32. A specific disposing manner is similar to that in the foregoing embodiment in which the circular arc grooves 12 are disposed in the main shaft assembly 100 and the circular arc shafts 321 are disposed on the first swing arm 32. Details are not described herein again.

During specific implementation, the circular arc groove 12 may be a quarter circular arc groove, a one-third circular arc groove, or the like, and the circular arc shaft 321 may be a quarter circular arc shaft, a one-third circular arc shaft, or the like. A person skilled in the art may adaptively adjust specific parameters of the circular arc groove 12 and the circular arc shaft 321 based on an actual requirement. This is not specifically limited in this application.

In some other embodiments, the rotational connection between the first swing arm 32 and the main shaft assembly 100 may alternatively be implemented through a pin shaft or another manner. For example, in an embodiment provided in this application, the rotational connection between the first swing arm 32 and the main shaft assembly 100 may be specifically implemented through a pin shaft.

When the first swing arm 32 is rotationally connected to the first housing mounting bracket 20, refer to FIG. 11 and FIG. 13c. A shaft hole 322 may be disposed in one end of the first swing arm 32, and a shaft hole 20a may also be disposed in one end that is of the first housing mounting bracket 20 and that is close to the main shaft assembly 100. A pin shaft 34 penetrates through the shaft hole 322 and the shaft hole 20a, to implement a rotational connection between the first swing arm 32 and the first housing mounting bracket 20. The pin shaft 34 may be fastened to the first housing mounting bracket 20, or the pin shaft 34 is fastened to the first swing arm 32. This is not specifically limited in this application.

In some implementations, the rotational connection between the first swing arm 32 and the first housing mounting bracket 20 may alternatively be implemented by using a virtual axis or through another manner. This is not specifically limited in this application.

In some embodiments of this application, rotation axis centers of the first driven arm 33 and the first swing arm 32 on the main shaft assembly 100 are parallel to each other and do not coincide with each other, so that a length change can be generated when the first folding assembly rotates relative to the main shaft assembly 100.

Figure 14:
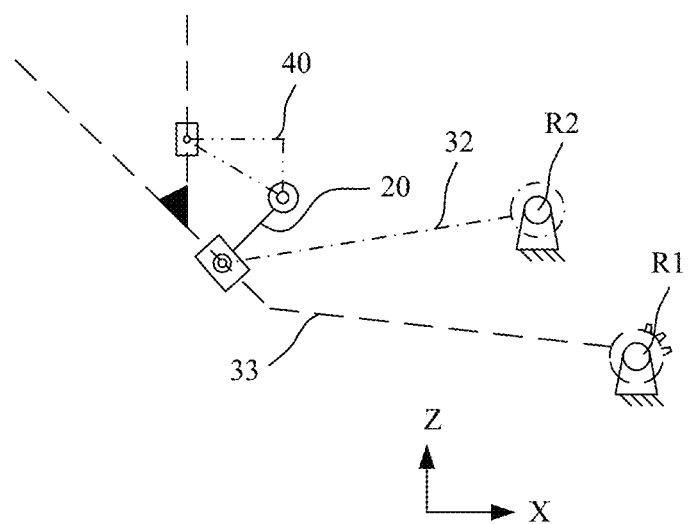
FIG. 14 is a structural diagram of a first folding assembly according to an embodiment of this application.

Specifically, still refer to FIG. 14. FIG. 14 is a structural diagram of a first folding assembly. In this embodiment of this application, the first housing mounting bracket 20 (represented by a solid line in the figure) is rotationally connected to the first swing arm 32 (represented by a dot-dash line in the figure), and the first housing mounting bracket 20 is slidably connected to the first driven arm 33 (represented by a dashed line in the figure), so that the first housing mounting bracket 20, the first swing arm 32, and the first driven arm 33 can form a crank and slider mechanism. As shown in FIG. 1B and FIG. 11, when external force acts on the first housing 2000 to rotate the first housing 2000, the first housing mounting bracket 20 rotates accordingly. Through a slidable connection between the first housing mounting bracket 20 and the first driven arm 33, the first housing mounting bracket 20 drives the first driven arm 33 to rotate synchronously. In addition, because the first housing mounting bracket 20 is rotationally connected to the first swing arm 32, the first housing mounting bracket 20 also drives the first swing arm 32 to rotate in a rotation process. In addition, a rotation axis center R1 of the first driven arm 33 on the main shaft assembly 100 does not coincide with a rotation axis center R2 of the first swing arm 32 on the main shaft assembly 100, so that in a rotation process of the first driven arm 33 and the first swing arm 32, the first driven arm 33 and the first housing mounting bracket 20 can slide relative to each other. During specific implementation, when the first housing 2000 and the second housing 3000 rotate toward each other to be folded, the first housing mounting bracket 20 slides relative to the first driven arm 33 in a direction away from the rotation axis center of the first driven arm 33, so that an included angle between the first housing mounting bracket 20 and the first swing arm 32 decreases, and finally a link mechanism formed by the first housing mounting bracket 20 and the first swing arm 32 stretches relative to the first driven arm 33, to increase an extension length of the first folding assembly 200 relative to the main shaft assembly 100, and increase a length of the rotation shaft structure. However, when the first housing 2000 and the second housing 3000 rotate against each other to be unfolded, the first housing mounting bracket 20 slides relative to the first driven arm 33 in a direction approaching the rotation axis center of the first driven arm 33, so that an included angle between the first housing mounting bracket 20 and the first swing arm 32 increases, and finally a link mechanism formed by the first housing mounting bracket 20 and the first swing arm 32 contracts relative to the first driven arm 33, to reduce an extension length of the first folding assembly 200 relative to the main shaft assembly 100, and reduce a length of the rotation shaft structure.

Still as shown in FIG. 9, in an embodiment provided in this application, the second rotation assembly 60 may include a second swing arm 62 and a second driven arm 63. One end of the second swing arm 62 is rotationally connected to the second housing mounting bracket 50, and the other end is rotationally connected to the main shaft assembly 100. One end of the second driven arm 63 is slidably connected to the second housing mounting bracket 50, and the other end is rotationally connected to the main shaft assembly 100. In some embodiments of this application, rotation axis centers of the second swing arm 62 and the second driven arm 63 on the main shaft assembly 100 are parallel to each other and do not coincide with each other, so that a length change can be generated when the second folding assembly rotates relative to the main shaft assembly 100.

It may be understood that, because the first folding assembly 200 and the second folding assembly 300 may be symmetrically disposed with respect to the main shaft assembly 100, for connections between the second driven arm 63 and the main shaft assembly 100 and between the second driven arm 63 and the second housing mounting bracket 50, refer to the foregoing descriptions of the connection manners between the first driven arm 33 and the main shaft assembly 100 and between the first driven arm 33 and the first housing mounting bracket 20. Details are not described herein again. Similarly, for connections between the second swing arm 62 and the main shaft assembly 100 and between the second swing arm 62 and the second housing mounting bracket 50, refer to the foregoing descriptions of the connection manners between the first swing arm 32 and the main shaft assembly 100 and between the first swing arm 32 and the first housing mounting bracket 20. Details are not described herein again. In addition, in this application, rotation axes of the first housing 2000, the first housing mounting bracket 20, the first driven arm 33, the first swing arm 32, the second driven arm 63, the second swing arm 62, the second housing mounting bracket 50, the second housing 3000, the first support plate 40, and the second support plate 70 are all parallel.

In some embodiments of this application, to implement reliable rotational connections between the first driven arm 33 and the main shaft assembly 100 and between the second driven arm 63 and the main shaft assembly 100, parts that are of the first driven arm 33 and the second driven arm 63 and that are connected to the main shaft assembly 100 may extend into the main shaft assembly 100. During specific implementation, as shown in FIG. 13a, first avoidance slots 102 and second avoidance slots 103 may be disposed in a side that is of the outer housing 10 of the main shaft assembly 100 and that faces toward the inner housing 11. There are two first avoidance slots 102. In a direction perpendicular to the length direction of the main shaft assembly 100, the second avoidance slots 103 are located between the two first avoidance slots 102.

In addition, a first clamping slot 104 and a second clamping slot 105 are further disposed in the outer housing 10. The first clamping slot 104 and the second clamping slot 105 are oppositely disposed on two sides of the outer housing 10. In addition, the first avoidance slots 102 and the second avoidance slots 103 are disposed between the first clamping slot 104 and the second clamping slot 105. The two first avoidance slots 102 are respectively close to the first clamping slot 104 and the second clamping slot 105.

In this way, a part that is of the first driven arm 33 and that is connected to the main shaft assembly 100 may be located in the first clamping slot 104 and extend into one first avoidance slot 102, and a part that is of the second driven arm 63 and that is connected to the main shaft assembly 100 is located in the second clamping slot 105 and extend into the other first avoidance slot 102, so that the inner housing 11 and the outer housing 10 may be snap-fitted and fastened, to press and limit the first driven arm 33 and the second driven arm 63 between the outer housing 10 and the inner housing 11. In other words, the first avoidance slots 102 are configured to avoid a part of the first driven arm 33 and a part of the second driven arm 63, so that the first driven arm 33 and the second driven arm 63 can flexibly rotate relative to each other. In addition, the second avoidance slots 103 may be configured to avoid other rotation components.

Still as shown in FIG. 13a, when the first swing arm 32 and the second swing arm 62 are connected to the main shaft assembly 100, a third avoidance slot 106 may be further disposed in each of positions that are of the outer housing 10 and that correspond to the two circular arc grooves 12. In this way, parts that are of the first swing arm 32 and the second swing arm 62 and that are connected to the main shaft assembly 100 can each extend into the outer housing 10 through one third avoidance slot 106, and circular arc shafts fit the circular arc grooves on corresponding sides. Therefore, the inner housing 11 and the outer housing 10 may be snap-fitted and fastened, to press and limit the first swing arm 32 and the second swing arm 62 between the outer housing 10 and the inner housing 11.

The following further describes how slidable connections between the first support plate 40 and the first rotation assembly 30 and between the second support plate 70 and the second rotation assembly 60 are implemented with reference to a specific disposing manner of the first rotation assembly and the second rotation assembly in the foregoing embodiment.

Figure 15A:
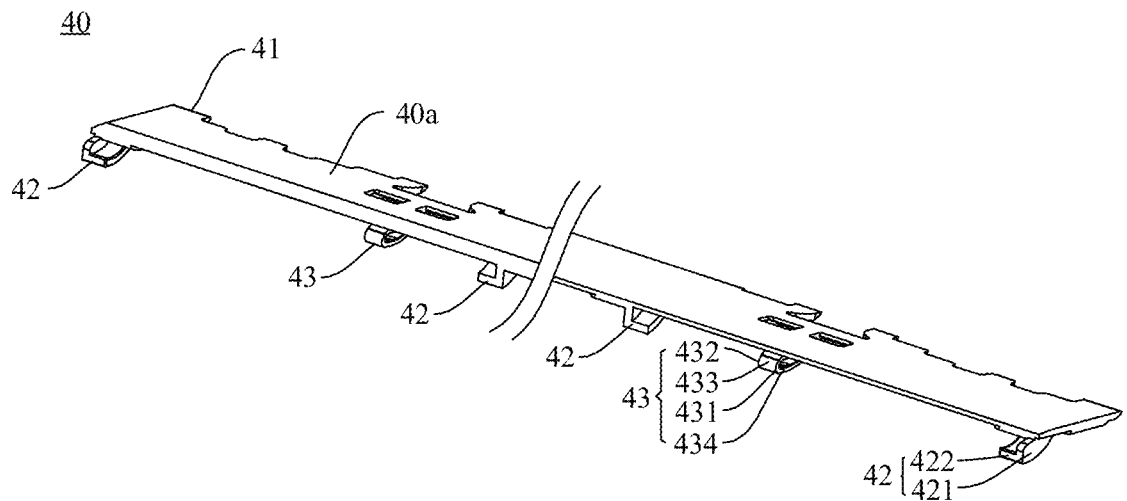
FIG. 15a and FIG. 15b are schematic diagrams of a structure of a first support plate according to an embodiment of this application.
Figure 15B:
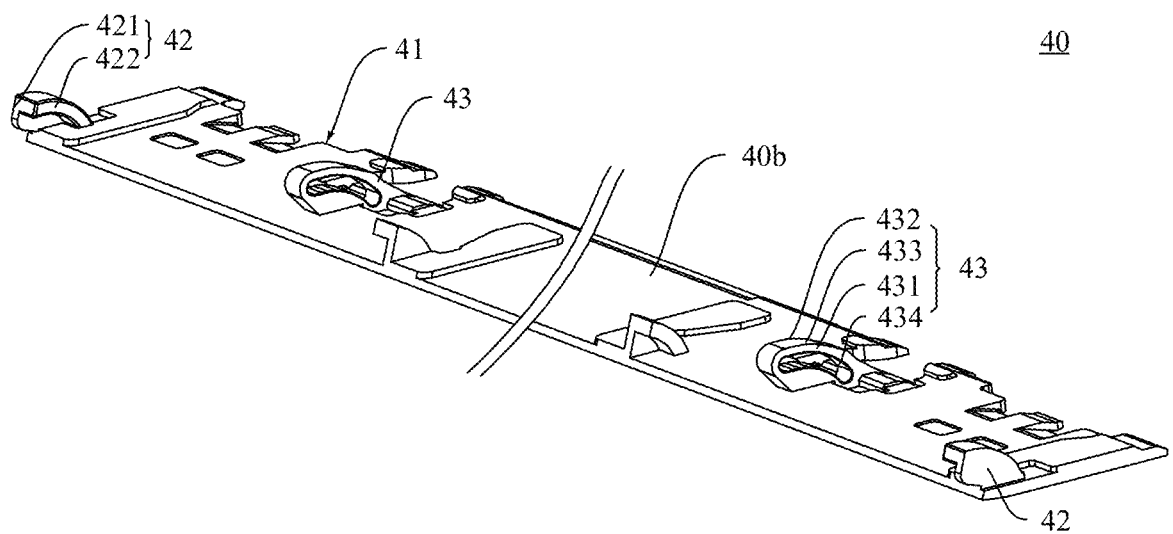

FIG. 15a is a schematic diagram of a structure of the first support plate 40 according to an embodiment of this application. In some embodiments of this application, the first support plate 40 includes a first plate body 41 and a first guide structure 43 disposed on the first plate body 41. Refer to FIG. 15a and FIG. 15b. FIG. 15b is a schematic diagram of a structure of the first support plate 40 according to another embodiment of this application. The first guide structure 43 may be specifically disposed on a second surface 40b of the first plate body 41. It may be understood that the first plate body 41 is used as a support body of the first support plate 40, and the second surface 40b of the first plate body 41 is the second surface 40*b* of the first support plate 40. When the first guide structure 43 is specifically disposed, the first guide structure 43 includes a first face 431, a second face 432, and a peripheral side face 433. In the length direction of the main shaft assembly 100, the first face 431 and the second face 432 are disposed opposite to each other. The peripheral side face 433 is configured to connect the first face 431 and the second face 432. The second surface 40*b* of the first guide structure 43 and the peripheral side face 433 are connected to each other to form an outer surface of the first guide structure 43. For example, as shown in FIG. 15*b*, the first guide structure 43 is crescent-shaped.

As shown in FIG. 15*a* and FIG. 15*b*, a first track slot 434 is disposed in the first guide structure 43, the first track slot 434 runs through the first face 431 and the second face 432 of the first guide structure 43, and the first track slot 434 does not run through the peripheral side face 433 of the first guide structure 43. In this way, the first track slot 434 can form a closed structure.

In some embodiments of this application, when the first track slot 434 is specifically disposed, a shape of an extension path of the first track slot 434 may be adjusted based on stress of the flexible display 4000 and a requirement for curvature radius uniformity, and/or an actual movement requirement of the first support plate 40, to reduce the stress of the flexible display 4000 and maintain the curvature radius uniformity. In other words, the extension path of the first track slot 434 is adjustable. In other words, a track of the first track slot 434 can be adjusted. In a possible embodiment of this application, as shown in FIG. 15*b*, the extension path of the first track slot 434 is arc-shaped, so that the first track slot 434 is arc-shaped.

In some other possible embodiments, the extension path of the first track slot 434 may alternatively be but is not limited to a straight line shape, an irregular curve shape, or the like, so that the first track slot 434 is in a straight line shape, an irregular curve shape, or the like.

Figure 16:
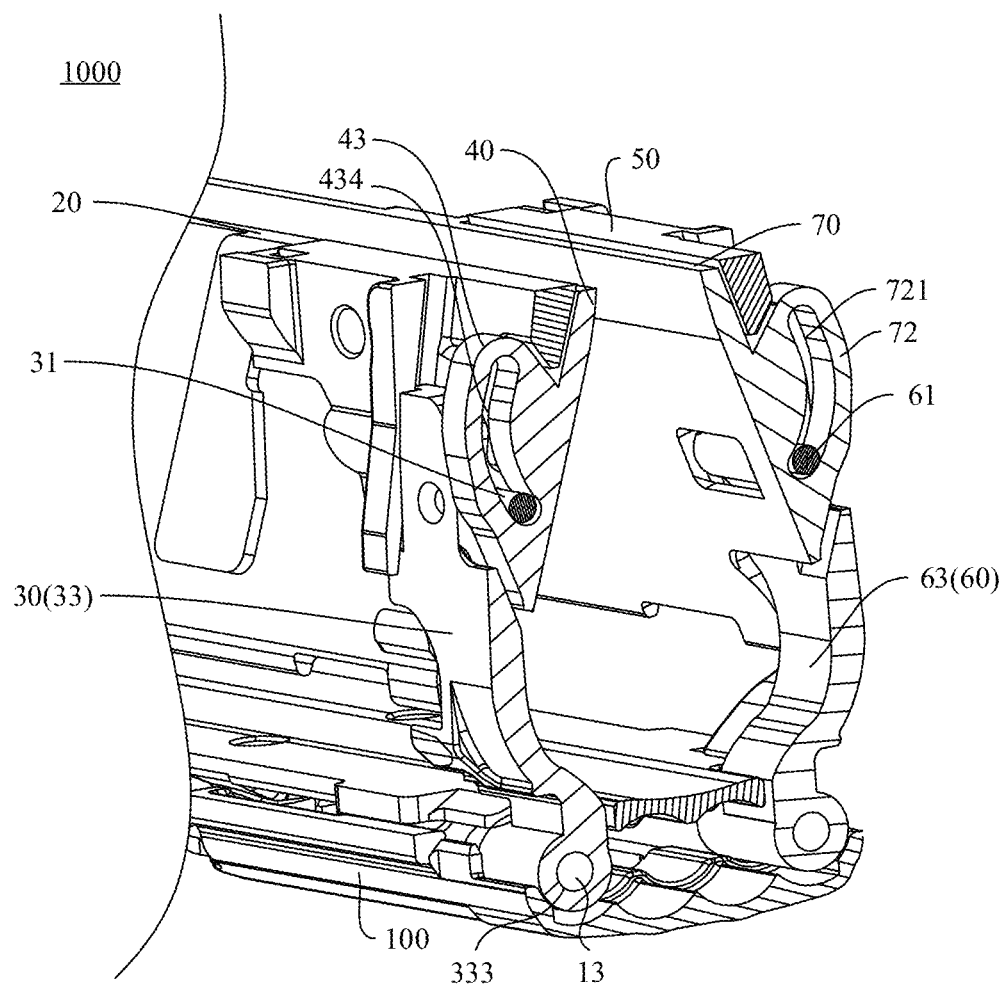
FIG. 16 is a schematic cross-sectional view of a rotation shaft structure in a closed state according to an embodiment of this application.

Similarly, the second support plate 70 may be specifically disposed with reference to the first support plate 40. Simply, refer to FIG. 16. FIG. 16 is a schematic diagram of a partial structure of a rotation shaft structure according to an embodiment of this application. The second support plate 70 includes a second guide structure 72. A second track slot 721 is disposed in the second guide structure 72. The second track slot 721 is in a straight line shape, an irregular curve shape, or the like.

In this embodiment of this application, extension paths of the first track slot 434 and the second track slot 721 can be designed, to adjust movement tracks of the first support plate 40 and the second support plate 70 when the first housing mounting bracket 20 and the second housing mounting bracket 50 are folded and unfolded relative to each other, so that a movement track of the flexible display in this process can be controlled. This avoids a problem of excessive local stress of the flexible display, and effectively reduces bending stress of the flexible display. It should be understood that the extension paths of the first track slot 434 and the second track slot 721 may not be limited to the foregoing arc shape or straight line shape, but may alternatively be a combination of one or more of a curve shape, the straight line shape, and a broken line shape. This is not strictly limited in this embodiment of this application.

In some embodiments of this application, when the slidable connection between the first support plate 40 and the first rotation assembly 30 is reflected as a slidable connection between the first support plate 40 and the first driven arm 33, refer to FIG. 16. In this case, the first guide shaft 31 is disposed on the first driven arm 33. When the first housing 2000 and the second housing 3000 are in the closed state, as shown in FIG. 4 and FIG. 16, the first guide shaft 31 is located at a first end of the first track slot 434. In this case, the first guide shaft 31 is farthest from the rotation axis center of the first support plate 40 around the first housing mounting bracket 20. When the first housing 2000 and the second housing 3000 are unfolded from the closed state to the flattened state, after the first driven arm 33 and the first housing mounting bracket 20 slide relative to each other, the first guide shaft 31 of the first driven arm 33 slides in a direction from the first end of the first track slot 434 to a second end, and drives the first support plate 40 to rotate relative to the first housing mounting bracket 20. When the first housing 2000 and the second housing 3000 are in the flattened state, the first guide shaft 31 is located at the second end of the first track slot 434. In this case, the first guide shaft 31 is closest to the rotation axis center of the first support plate 40 around the first housing mounting bracket 20.

Figure 17:
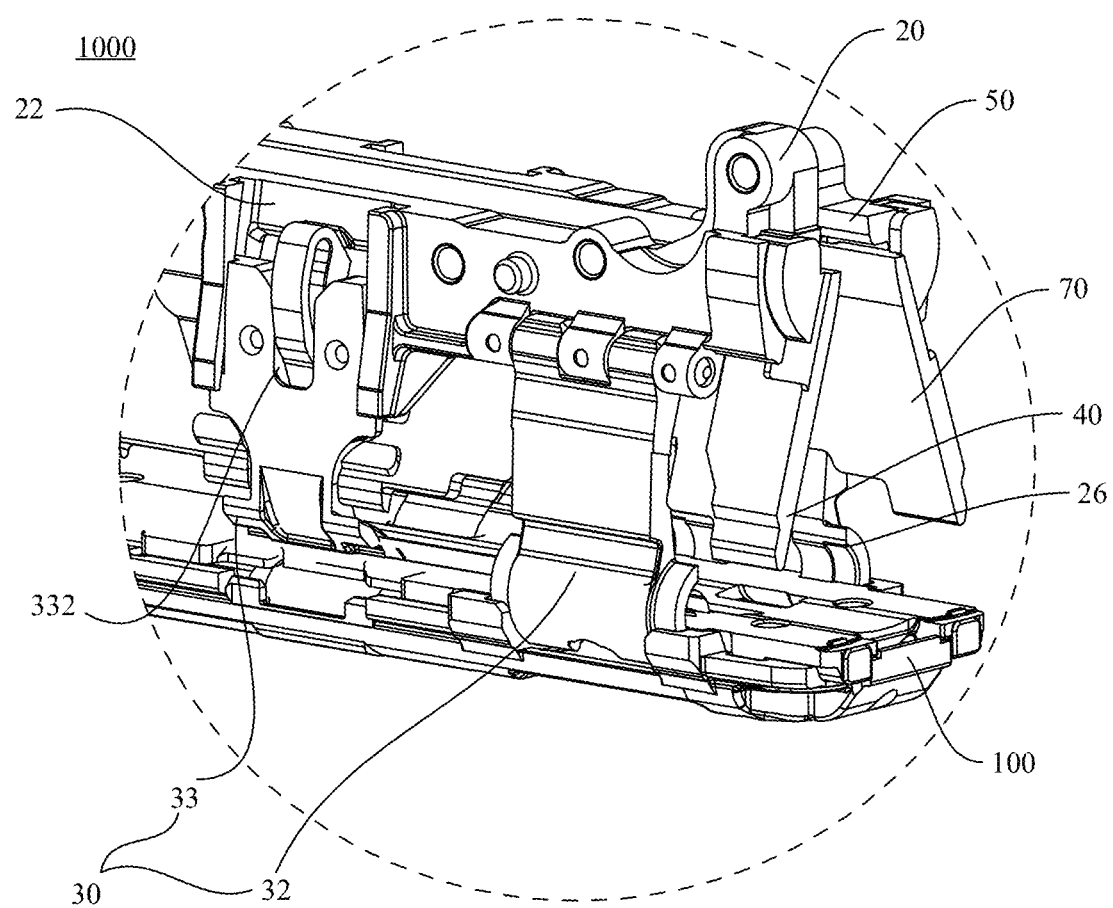
FIG. 17 is a schematic diagram of a partial structure of a position F in FIG. 10.

To implement the slidable connection between the first driven arm 33 and the first support plate 40, refer to FIG. 16 and FIG. 17. FIG. 17 is an enlarged view of a partial structure of a position F in FIG. 10. One end that is of the first driven arm 33 and that is slidably connected to the first support plate 40 is recessed to form a first concave region 332, so that the end that is of the first driven arm 33 and that is slidably connected to the first support plate 40 is in a "U" shape. In this embodiment, if the first driven arm 33 slides relative to the first support plate 40 and drives the first support plate 40 to rotate around the first housing mounting bracket 20, one end of the first guide shaft 31 may be connected to one side of the first concave region 332, and the other end of the first guide shaft 31 may be connected to the other side of the first concave region 332.

In addition, still as shown in FIG. 16 and FIG. 17, the first driven arm 33 may be slidably connected to the first support plate 40 through the first guide shaft 31. Therefore, the first concave region 332 can accommodate both the first guide shaft 31 and the first guide structure 43 of the first support plate 40, to facilitate a connection between the first guide shaft 31 and the first driven arm 33 and a connection between the first guide shaft 31 and the first support plate 40. This reduces space occupied by the rotation shaft structure 1000, and helps implement a lighter and thinner design of the rotation shaft structure 1000 and the electronic device with the rotation shaft structure 1000.

In some other embodiments of this application, when the slidable connection between the first support plate 40 and the first rotation assembly 30 is reflected as a slidable connection between the first support plate 40 and the first swing arm 32, a first guide shaft (not shown in the figure) may be disposed on the first swing arm 32 (as shown in FIG. 17). It may be understood with reference with FIG. 14, FIG. 16 and FIG. 17 that, after an included angle between the first swing arm 32 and the first housing mounting bracket 20 changes, the first swing arm 32 may drive, through sliding fit between the first guide shaft and the first track slot 434 of the first guide structure 43 of the first support plate 40, the first support plate 40 to rotate relative to the first housing mounting bracket 20. For a specific rotation process, refer to the foregoing description about that the first driven arm 33 drives the first support plate 40 to rotate. Details are not described herein again.

In this embodiment of this application, a radian of an arc of the first track slot 434 can be adjusted, to directly control a movement track of the first support plate 40, so that control precision of a movement process of the first support plate 40 is high. This avoids a problem that the flexible display is stretched or extruded when the first support plate 40 moves along to an angle, and effectively reduces bending stress of the flexible display. In addition, a movement track of the flexible display can be indirectly adjusted, so that the radian of the arc of the first track slot 434 can better adapt to the movement track of the flexible display, to implement an adjustable function of the movement track of the flexible display.

In addition, in the foregoing embodiment of this application, because the first track slot 434 has a closed feature, the first guide shaft 31 can slide back and forth only in a movement space limited by the first track slot 434, so that the first guide shaft 31 is limited, and the first guide shaft 31 can be effectively prevented from being accidentally disengaged from the first track slot 434. In this embodiment of this application, the first guide structure 43 and the first guide shaft 31 can slide relative to each other. In other words, the first support plate 40 and the first rotation assembly 30 can slide relative to each other. In this way, when rotating around the main shaft assembly 100, the first swing arm 32 or the first driven arm 33 can drive the first support plate 40 to move, so that the first support plate 40 can rotate relative to the first housing mounting bracket 20. In this process, the first support plate 40 is driven by the first swing arm 32 or the first driven arm 33 and always has enough driving force, and can have good movement smoothness in a movement process, so that the first support plate 40 can move in place when the first housing mounting bracket 20 and the second housing mounting bracket 50 are folded or unfolded relative to each other. This helps protect the flexible display.

It may be understood that, in this application, because the first folding assembly 200 and the second folding assembly 300 may be symmetrically disposed with respect to the main shaft assembly, for a slidable connection between the second support plate 70 and the second swing arm 62 or the second driven arm 63, refer to the foregoing descriptions of the slidable connection manner between the first support plate 40 and the first swing arm 32 or the first driven arm 33. Details are not described herein again. Simply, the second support plate 70 is rotationally connected to the second housing mounting bracket 50, and is slidably connected to the second swing arm 62 or the second driven arm 63. When the second folding assembly rotates relative to the main shaft assembly 100, the second support plate 70 can be driven by the second swing arm 62 or the second driven arm 63 to rotate relative to the second housing mounting bracket 50, to support the flexible display or enclose, together with the main shaft assembly 100, an accommodation space for accommodating the flexible display.

It may be understood that, in the foregoing embodiment, the first guide structure 43 are disposed on the first support plate 40, the first guide shaft 31 is disposed on the first swing arm 32 or the first driven arm 33, and the first guide shaft 31 slides in the first track slot 434 of the first guide structure 43, to implement the slidable connection between the first support plate 40 and the first rotation assembly 30. This is merely an example for describing how sliding fit between the first support plate 40 and the first rotation assembly 30 is implemented in this application. In another possible embodiment of this application, for example, the first guide shaft 31 may alternatively be disposed on another possible structure of the first rotation assembly 30, to implement the slidable connection between the first support plate 40 and the first rotation assembly 30. Similarly, to implement a slidable connection between the second support plate 70 and the second rotation assembly 60, the second guide shaft 61 may alternatively be disposed on another possible structure of the second rotation assembly except for the second swing arm 62 and the second driven arm 63.

In some embodiments of this application, the first rotation assembly 30 and the second rotation assembly 60 may use another possible structure in addition to the structure in the foregoing embodiment. Regardless of the disposing manner, the first rotation assembly 30 and the second rotation assembly 60 can both stably support the flexible display 4000 when the two housings are in the flattened state, and drive the first support plate 40 and the second support plate 70 to rotate around the housings on corresponding sides when the two housings rotate toward or against each other. In addition, folding angles of the two housings can be controlled.

In addition, the first rotation assembly 30 and the second rotation assembly 60 in any form are used. Provided that relative sliding occurs between the first rotation assembly 30 and the first support plate 40 and between the second rotation assembly 60 and the second support plate 70, guide shafts may be disposed on the rotation assemblies on corresponding sides, and track slots are disposed in the support plates. Therefore, the guide shafts slide in the track slots 434, to implement slidable connections between the support plates and the rotation assemblies.

After the disposing manner of the slidable connections between the first support plate 40 and the first rotation assembly 30 and between the second support plate 70 and the second rotation assembly is learned, the following describes a rotational connection relationship between the first support plate 40 and the first housing mounting bracket 20 and a rotational connection relationship between the second support plate 70 and the second housing mounting bracket 50.

Figure 18:
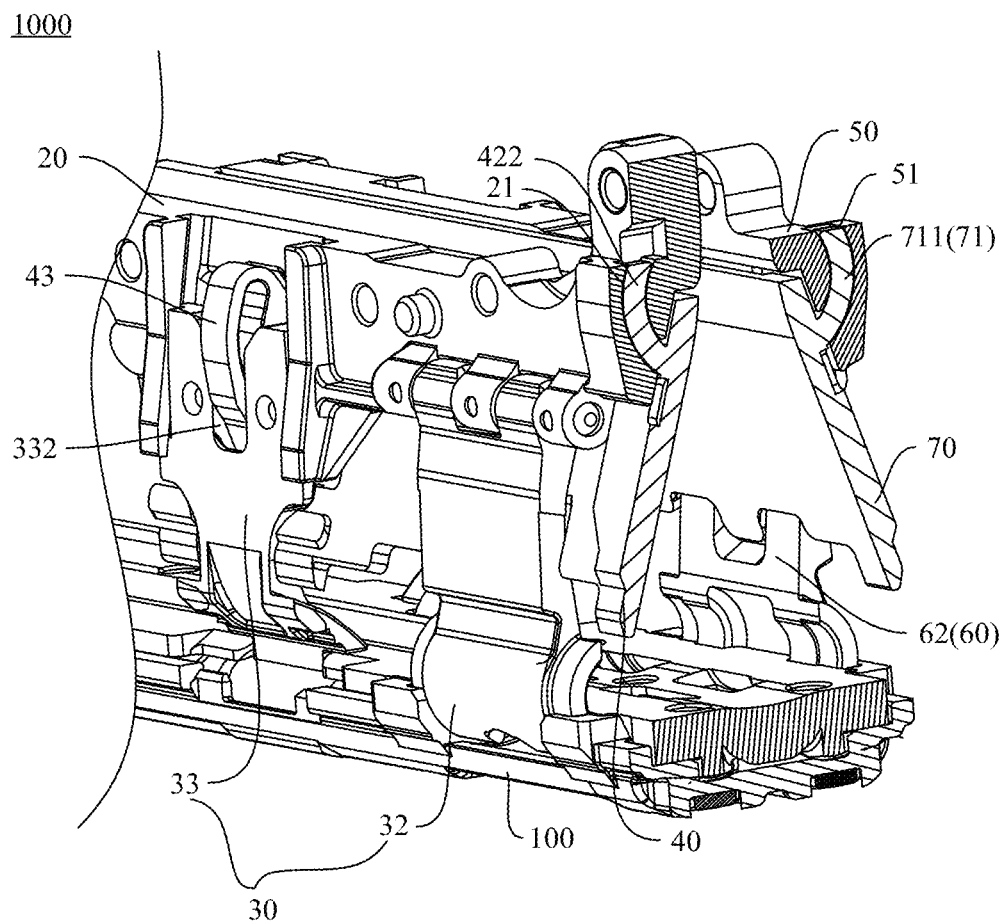
FIG. 18 is a schematic diagram of a partial structure of a rotation shaft structure according to an embodiment of this application.

Still refer to FIG. 17. It can be learned from FIG. 17 that the first support plate 40 may be connected to an edge that is of the first housing mounting bracket 20 and that is close to the main shaft assembly 100. Refer to FIG. 17 and FIG. 18. FIG. 18 is a schematic diagram of a partial structure of a main shaft assembly according to an embodiment of this application and shows a connection relationship between a support plate and a housing mounting bracket. To implement rotation of the first support plate 40 around the first housing mounting bracket 20, a circular arc groove 21 may be disposed in an edge that is of the first housing mounting bracket 20 and that is close to the main shaft assembly 100. In addition, refer to FIG. 15a and FIG. 15b that are schematic diagrams of a structure of a first support plate. When the first support plate 40 is specifically disposed, the first support plate 40 further includes a first rotation structure 42. The first rotation structure 42 and the first guide structure 43 are disposed on a same side of the first plate body 41. The first rotation structure 42 includes a circular arc shaft 422 protruding from the first plate body 41. A shape of the first circular arc shaft 422 is not limited. In a possible embodiment of this application, the circular arc shaft 422 may be crescent-shaped.

It may be understood that the circular arc shaft 422 of the first support plate 40 is slidably disposed in the circular arc groove 21 of the first housing mounting bracket 20 shown in FIG. 18.

In this embodiment of this application, the circular arc shaft 422 can rotate in the circular arc groove 21. That the circular arc shaft 422 can rotate in the circular arc groove 21 may be understood as that the circular arc shaft 422 slides back and forth in the circular arc groove 21. For example, when the first housing 2000 and the second housing 3000 are in the flattened state, the circular arc shafts 422 of the first support plate 40 are located at first ends of the circular arc grooves 21 of the first housing mounting bracket 20. In this case, an edge that is of the first support plate 40 and that is away from the first housing mounting bracket 20 is closest to the main shaft assembly 100. When the first housing 2000 and the second housing 3000 are unfolded from the flattened state to the closed state, the first support plate 40 is driven by the first rotation assembly 30 to rotate around the first housing mounting bracket 20, and the circular arc shafts 422 of the first support plate 40 slide from the first ends of the circular arc grooves 21 to second ends. When the first housing 2000 and the second housing 3000 are in the closed state, the circular arc shafts 422 of the first support plate 40 are located at the second ends of the circular arc grooves 21 of the first housing mounting bracket 20. In this case, the edge that is of the first support plate 40 and that is away from the first housing mounting bracket 20 is farthest from the main shaft assembly 100. In this way, the circular arc shafts 422 are rotationally connected to the circular arc grooves 21, so that a rotational connection between the first housing mounting bracket 20 and the first support plate 40 is implemented by using a virtual axis. In some possible embodiments of this application, the rotational connection between the first support plate 40 and the first housing mounting bracket 20 may be implemented by using the virtual axis, or the rotational connection between the first support plate 40 and the first housing mounting bracket 20 may be implemented by using a solid shaft. For example, the rotational connection between the first support plate 40 and the first housing mounting bracket 20 is implemented by using a pin shaft.

It may be understood that in some embodiments of this application, a plurality of circular arc grooves 21 may alternatively be disposed in the first housing mounting bracket 20, and the plurality of circular arc grooves 21 are disposed at intervals in an axial direction of the first housing mounting bracket 20. In addition, a plurality of circular arc shafts 422 are disposed on the first support plate 40, and the plurality of circular arc shafts 422 are rotationally connected to the plurality of circular arc grooves 21 in a one-to-one correspondence manner.

In a possible embodiment of this application, as shown in FIG. 15*a* and FIG. 15*b*, the first rotation structure 42 may further include a baffle plate 421. In an axial direction of the circular arc shaft 422, the circular arc shaft 422 is connected to one side of the baffle plate 421. The baffle plate 421 may limit the circular arc shaft 422, so that the circular arc shaft 422 is not disengaged when moving relative to the circular arc groove 21 in the axial direction of the circular arc shaft 422. In addition, the baffle plate 421 may further support the circular arc shaft 422, to increase strength of the first rotation structure 42, and avoid a problem that the rotation shaft structure fails because the circular arc shaft 422 breaks or is damaged in a rotation process. In one embodiment, the baffle plate 421 and the circular arc shaft 422 may be integrally molded. The integrally molded first rotation structure 42 has simplified assembly steps. This helps reduce production time and costs.

Because the first folding assembly 200 and the second folding assembly 300 are symmetrically disposed with respect to the main shaft assembly 100, when the second housing mounting bracket 50 and the second support plate 70 are specifically disposed, refer to the first housing mounting bracket 20 and the first support plate 40. Details are not described herein. Simply, refer to FIG. 18. A second rotation structure 71 of the second support plate 70 may also include an arc-shaped circular arc shaft 711. The circular arc shaft 711 may be mounted in a circular arc groove 51 of the second housing mounting bracket 50. A rotational connection between the second support plate 70 and the second housing mounting bracket 50 is implemented through fit between the circular arc shafts 711 and the circular arc grooves 51.

In this way, the rotational connection between the second support plate 70 and the second housing mounting bracket 50 is implemented by using a virtual axis through relative movements of the circular arc shafts 711 and the circular arc grooves 51. In this architecture, the rotation connection structure is simple, and space occupied by the rotation shaft structure is small. This helps reduce a thickness of the rotation shaft structure, and it is easier to implement a lighter and thinner design of the electronic device.

Figure 19:
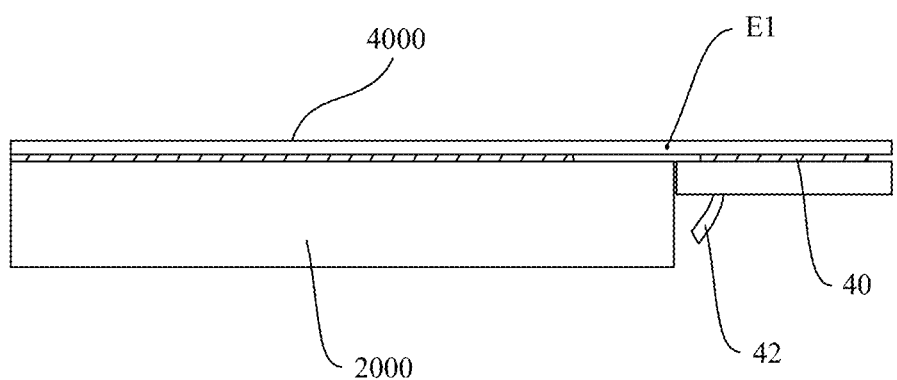
FIG. 19 is a schematic diagram of a rotation center of a first support plate according to an embodiment of this application.

Still as shown in FIG. 18, in a possible embodiment of this application, a rotation center (namely, an axis center of the first circular arc shaft 422) of the circular arc shaft 422 relative to the circular arc groove 21 may be disposed near the flexible display 4000 (as shown in FIG. 8*b*). In this case, the rotation center may be at a distance of a specific height from the flexible display 4000. The specific height may be a distance from the rotation center to a surface that is of the flexible display 4000 and that is bonded to the first support plate 40, a distance from the rotation center to a surface that is of the flexible display 4000 and that is farthest from the first support plate 40, or a distance from the rotation center to a surface of any layer structure in the middle of the flexible display 4000. For example, FIG. 19 shows a relative position relationship between the flexible display 4000 and a rotation center of the circular arc shaft 422 relative to the circular arc groove 21. When the flexible display 4000 is bonded to the first support plate 40, a rotation center E1 of the first rotation structure 42 may be located on the flexible display 4000. The rotation center may be understood as a straight line or an axis around which the first rotation structure 42 rotates.

The rotation center of the first support plate 40 (namely, the rotation center of the first rotation structure 42) is disposed on the flexible display 4000. In this way, the flexible display 4000 can maintain a constant length in a rotation process of the first support plate 40. Therefore, the flexible display 4000 is not stretched or extruded in a bending process, damage caused to the flexible display 4000 in the bending process can be minimized, and reliability is high.

For example, the rotation center E1 of the first rotation structure 42 may be located at a neutral layer (neutral layer) of the flexible display 4000, so that the flexible display 4000 can maintain a constant length. It should be understood that, in the bending process of the flexible display 4000, an outer layer of the flexible display 4000 bears stretching force, and an inner layer of the flexible display 4000 bears extrusion force. However, a cross section of the flexible display 4000 includes a transition layer that bears neither stretching force nor extrusion force. Stress at the transition layer is approximately zero. The transition layer is the neutral layer of the flexible display 4000. To be specific, the neutral layer of the flexible display 4000 is a layer formed by all positions whose internal tangential stress is zero when the flexible display 4000 is bent or deformed. The neutral layer of the flexible display 4000 maintains a length in the bending process substantially the same as that existing before the bending, and maintains an unchanged length.

It should be noted that FIG. 19 merely shows a position of the rotation center E1 of the first rotation structure 42, and does not specifically limit a connection position, a specific structure, or a quantity of components.

Similarly, the rotation center of the circular arc shaft 711 relative to the circular arc groove 51 may alternatively be disposed near the flexible display 4000. For example, the rotation center of the circular arc shaft 711 relative to the circular arc groove 51 may be disposed at the neutral layer of the flexible display 4000. Therefore, the rotation shaft structure 1000 can rotate by using the flexible display 4000 as a neutral surface, to reduce a risk of stretching or extruding the flexible display 4000, protect the flexible display, and improve reliability of the flexible display 4000, so that the flexible display 4000 and the electronic device have a long service life.

It may be understood that there is a possible assembly clearance between the parts of the structure. A shake occurs during movements. The shake may be understood as a movement clearance. As shown in FIG. 18, a movement clearance may exist at a joint of the parts that are of the rotation shaft structure 1000 and that cooperate with each other in movement, for example, a movement clearance between the first support plate 40 and the first housing mounting bracket 20, and a movement clearance between the second support plate 70 and the second housing mounting bracket 50. Due to the movement clearance, the first support plate 40 and the second support plate 70 generate an angle deviation when rotating relative to the main shaft assembly 100. As a result, when the electronic device is in the closed state, an included angle between the first support plate 40 and the second support plate 70 cannot meet design requirements. For example, the included angle between the first support plate 40 and the second support plate 70 may be less than an angle required by design. As a result, the flexible display 4000 is extruded, local stress of the flexible display 4000 increases, and the flexible display is more prone to damage.

Figure 20A:
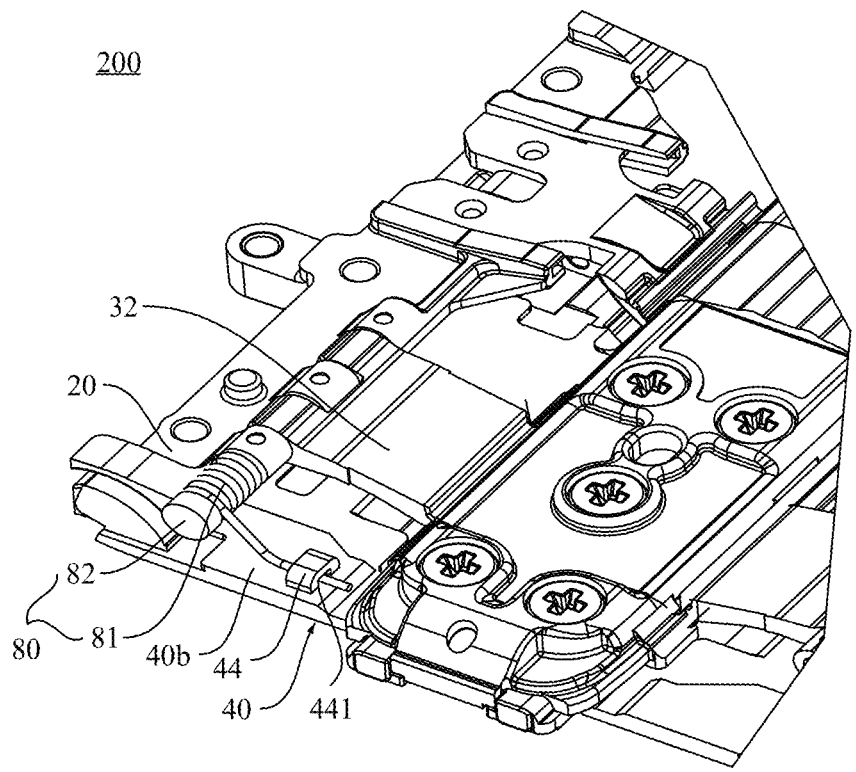
FIG. 20a and FIG. 20b are schematic diagrams of a partial structure of a first folding assembly according to an embodiment of this application.
Figure 20B:
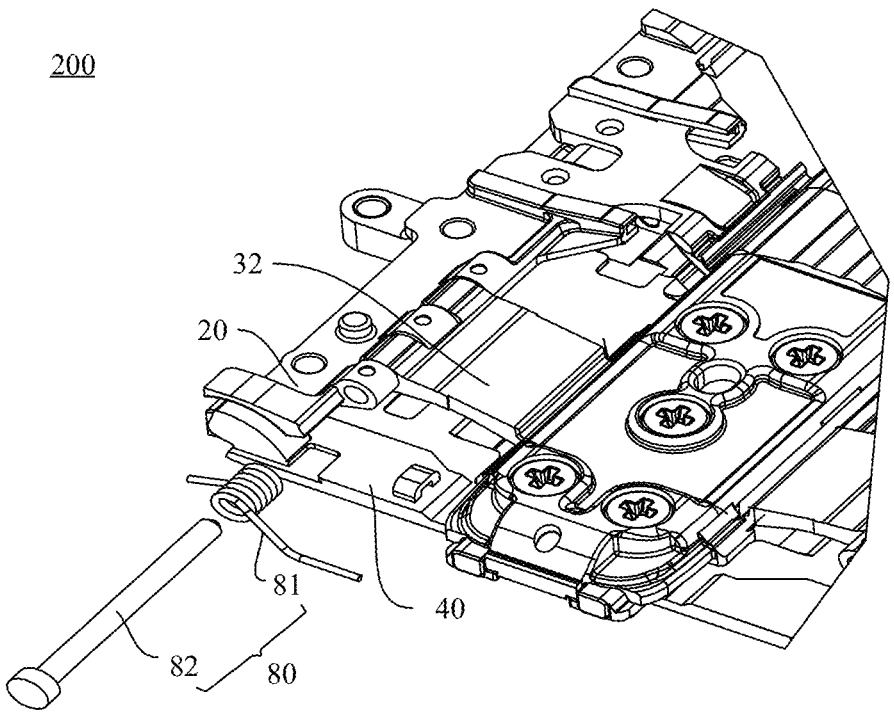

Therefore, refer to FIG. 20a and FIG. 20b. FIG. 20a and FIG. 20b are schematic diagrams of a partial structure of a connection position between the first housing mounting bracket 20 and the first rotation assembly 30. In a possible embodiment of this application, the first folding assembly 200 may further include a first rotation auxiliary assembly 80. The first rotation auxiliary assembly 80 may include an elastic member 81. One end of the elastic member 81 is fastened to the first housing mounting bracket 20. A fastening manner of the elastic member 81 and the first housing mounting bracket 20 may be but is not limited to welding, clamping, riveting, or the like. The other end of the elastic member 81 is slidably connected to the first support plate 40. During specific implementation, a stopper structure 44 may be disposed on the first support plate 40. The stopper structure 44 may be specifically disposed on the second surface 40b of the first support plate 40. A guide hole 441 is disposed in the stopper structure 44. The other end of the elastic member 81 may penetrate through the guide hole 441. When the first support plate 40 rotates relative to the first housing mounting bracket 20, the other end of the elastic member 81 may slide along the second surface 40b of the first support plate 40 under a guiding function of the guide hole 441. When the first housing 2000 and the second housing 3000 are in the flattened state, the elastic member 81 is in a compressed state, and applies, to the first support plate 40, elastic force in a direction toward the main shaft assembly 100, to press the first support plate 40 to the main shaft assembly 100, so that a position of the first support plate 40 is controlled in the flattened state. When the first housing 2000 and the second housing 3000 are in the closed state, the elastic member 81 is in a stretched state, and applies, to the first support plate 40, elastic force in a direction toward the first housing mounting bracket 20, to pull the first support plate 40 to one side of the first housing mounting bracket 20, so that the position of the first support plate 40 is controlled in the closed state.

In some other embodiments of this application, the first rotation auxiliary assembly 80 may further include a shaft body 82. The shaft body 82 may be fastened to the first housing mounting bracket 20. In this application, the elastic member 81 may be but is not limited to a torsion spring. The elastic member 81 may be sleeved on the shaft body 82. In this way, when the first support plate 40 rotates around the first housing mounting bracket 20, the elastic member 81 may rotate around the shaft body 82, to be compressed or stretched.

In a possible embodiment of this application, still as shown in FIG. 20a and FIG. 20b, because the first swing arm 32 of the first rotation assembly 30 may be rotationally connected to the first housing mounting bracket 20, the pin shaft 34 through which the first swing arm 32 and the first housing mounting bracket 20 are rotationally connected in FIG. 11 may be coaxially disposed with the shaft body 82. In other words, the pin shaft 34 and the shaft body 82 are coaxial. The shaft body 82 is rotationally connected to the first housing mounting bracket 20. In this way, parts of the rotation shaft structure can be effectively reduced. This helps reduce space occupied by the rotation shaft structure, and implement a thinner design of the rotation shaft structure.

In this embodiment of this application, as shown in FIG. 20a and FIG. 20b, as described above, the first rotation auxiliary assembly 80 is disposed, so that a possibility that the included angle between the first support plate 40 and the second support plate 70 cannot reach the angle required by design due to the movement clearance between the parts is minimized, and the included angle between the first support plate 40 and the second support plate 70 can reach the optimal angle required by design.

For example, the elastic member 81 may be a torsion spring. The torsion spring has two free ends. One free end of the torsion spring is fastened to the first housing mounting bracket 20 and keeps still relative to the first housing mounting bracket 20. The other free end of the torsion spring is connected to the first support plate 40, and can slide on a surface of the first support plate 40. For example, one free end of the torsion spring may be fastened to the first housing mounting bracket 20 through bonding, clamping, welding, or the like. The other free end of the torsion spring may be slidably connected to the first support plate 40 by penetrating into the guide hole 441 of the stopper structure 44 on the first support plate 40. However, it should be understood that a manner in which the torsion spring is fastened to the first housing mounting bracket 20 and the first support plate 40 may be designed based on an actual requirement. This is not strictly limited in this embodiment of this application.

It may be understood that, in some embodiments of this application, a torsion spring may also be disposed between the second housing mounting bracket 50 and the second support plate 70. For a specific disposition manner of the torsion spring, refer to the foregoing descriptions of a connection manner of the first housing mounting bracket 20, the first support plate 40, and the torsion spring. Details are not described herein again.

In this embodiment of this application, torsion force of the torsion spring can act on the first support plate 40, so that pulling force in a direction toward the first housing mounting bracket 20 is added to the first support plate 40. Similarly, torsion force of the torsion spring can act on the second support plate 70, so that pulling force in a direction toward the second housing mounting bracket 50 is added to the second support plate 70. When the rotation shaft structure is in the flattened state or the closed state, the pulling force can compensate for the angle deviation caused by the assembly clearance between the parts, so that the first support plate 40 and the second support plate 70 move to a specified position. For example, in the flattened state, the first support plate 40 and the second support plate 70 are unfolded to the specified position to reach approximate flatness, but there may be a specific small included angle in between. In the closed state, the first support plate 40 and the second support plate 70 may form a triangle-like shape, so that the included angle between the first support plate 40 and the second support plate 70 meets a design requirement, a structure is simple, and performance is excellent. In addition, it may be understood that the rotation auxiliary assembly in this embodiment of this application is the movement clearance elimination mechanism mentioned above, to eliminate a movement clearance between the first support plate 40 and the first housing 2000 and a movement clearance between the second support plate 70 and the second housing 3000.

In addition to the assembly clearance between the first support plate 40 and the first housing mounting bracket 20, and between the second support plate 70 and the second housing mounting bracket 50 as described in the foregoing embodiment, an assembly clearance may also exist between the first support plate 40 and the first rotation assembly 30 and between the second support plate 70 and the second rotation assembly 60. This may cause the two support plates to shake in a process of rotating along with the rotation assemblies. Consequently, stability of the movement track of the support plates cannot be ensured, and the included angle between the first support plate 40 and the second support plate 70 is affected when the rotation shaft structure 1000 is in the closed state.

Figure 21:
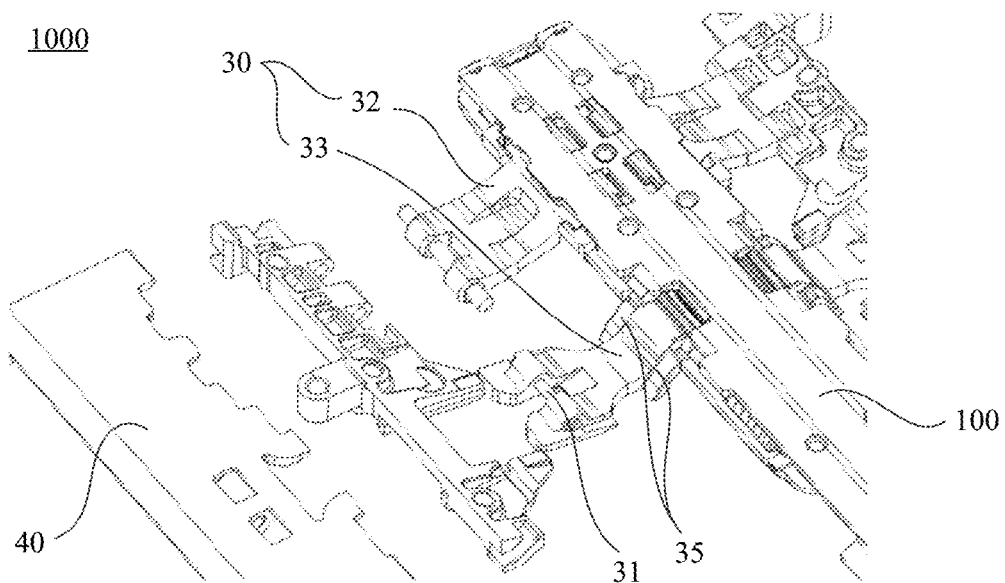
FIG. 21 is a schematic diagram of a partial structure of a rotation shaft structure according to another embodiment of this application.

In view of this, refer to FIG. 21. FIG. 21 is a schematic diagram of a structure of a rotation shaft structure according to an embodiment of this application. A lap joint part 35 may be disposed on the first rotation assembly 30, a lap joint part 46 may be disposed on the first support plate 40, and the lap joint part 35 and the lap joint part 46 are in contact with each other in an entire process or some process when the first housing 2000 rotates relative to the main shaft assembly 100. Therefore, an assembly clearance between the first support plate 40 and the first rotation assembly 30 can be compensated for, to improve movement stability of the first support plate 40.

When the lap joint part 35 is specifically disposed, the lap joint part 35 may extend in a direction away from the main shaft assembly 100 (a specific extension length may be adjusted based on the movement track of the first support plate 40 and a movement track of the first track slot 434). In addition, the lap joint part 35 may alternatively be disposed on both sides of the first driven arm 33 in the length direction of the main shaft assembly 100. It may be understood that, in another embodiment of this application, the lap joint part 35 may alternatively be disposed on the first swing arm 32, or the lap joint part 35 is disposed on both the first driven arm 33 and the first swing arm 32. In the following embodiment of this application, for example, the lap joint part 35 is disposed on the first driven arm 33.

Figure 22:
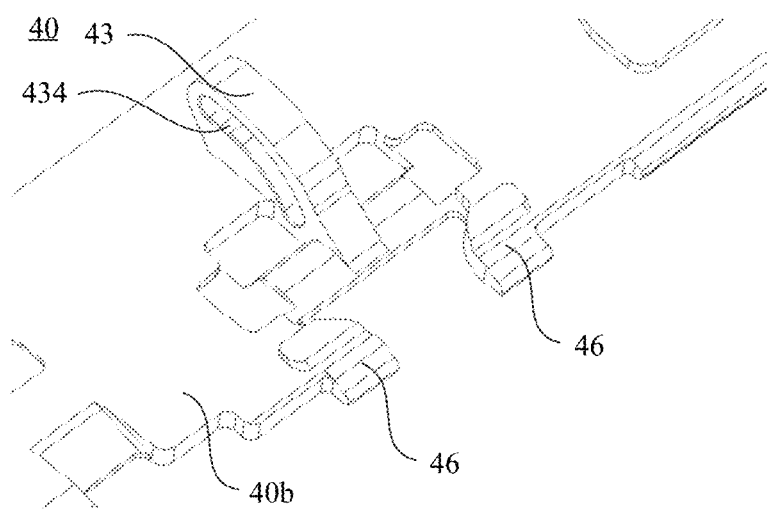
FIG. 22 is a schematic diagram of a partial structure of a support plate according to another embodiment of this application.

In some embodiments of this application, when the lap joint part 46 is specifically disposed, refer to FIG. 21 and FIG. 22. FIG. 22 is a schematic diagram of a structure of a rotation shaft structure according to an embodiment of this application. The lap joint part 46 is disposed on an edge that is of the first support plate 40 and that is close to the main shaft assembly 100. It may be understood that, in this embodiment of this application, to enable the lap joint part 35 of the first driven arm 33 to support the first support plate 40, the lap joint part 46 may be disposed on the second surface 40*b* of the first support plate 40.

Figure 23:
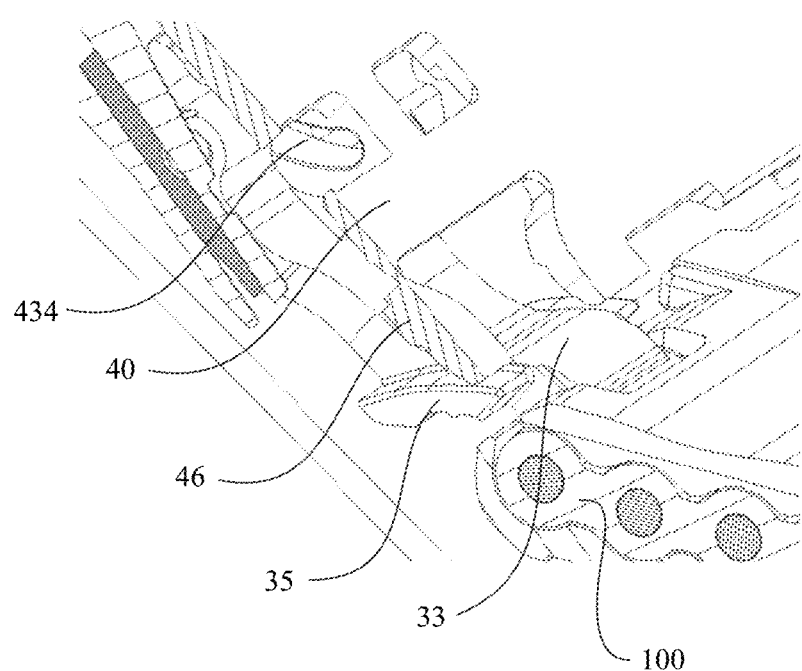
FIG. 23 is a schematic diagram of a partial structure of a rotation shaft structure according to another embodiment of this application.

When the rotation shaft structure 1000 is folded (namely, when the two housing mounting brackets are folded or unfolded relative to each other), refer to FIG. 23. FIG. 23 is a schematic diagram of a partial structure of a rotation shaft structure according to an embodiment of this application. The lap joint part 35 and the lap joint part 46 may overlap and make surface contact. In this way, the lap joint part 46 may slide along a surface of the lap joint part 35. In the folding process, a contact surface between the lap joint part 35 and the lap joint part 46 is disposed, so that the movement track of the first support plate 40 can be precisely controlled, to reduce a shake of the first support plate 40 in a movement process. In addition, in a conventional technology, to prevent the first support plate 40 from being stuck in an unfolded process, an avoidance clearance between the first support plate 40 and the main shaft assembly 100 is usually set to be large enough. However, in an unfolded process of the rotation shaft structure 1000 in this application, the first support plate 40 may be driven by the lap joint part 35 of the first driven arm 33 to be lifted along a predetermined track to be flush with a surface of the main shaft assembly 100. In this way, it can be avoided that the first support plate 40 is affected by an assembly clearance of other components or the like to change the movement track and be stuck and cannot be lifted to the flattened state.

It is easy to understand that, in the conventional technology, when the lap joint part 35 and the lap joint part 46 are not disposed, one side of the first support plate 40 is suspended, and an assembly clearance exists between the first guide shaft 31 and the first track slot 434 of the first support plate 40. Therefore, the first support plate 40 cannot be constrained in three directions. For example, when pressure in a vertical direction is applied to the first support plate 40, the first support plate 40 has a movement space of a specific angle. In the rotation shaft structure 1000 provided in this embodiment of this application, when the first support plate 40 is pressed, the lap joint part 46 on the first support plate 40 is in contact with the lap joint part 35 on the first driven arm 33. When the first support plate 40 rotates, the track of the first support plate 40 can be precisely controlled, and the first support plate 40 does not collapse in the folding process.

It should be noted that, in some embodiments of this application, the lap joint part 35 and the lap joint part 46 may be always in contact, to improve movement stability of the first support plate 40 in an entire process of folding or unfolding. In addition, the lap joint part 35 and the lap joint part 46 may alternatively be lap joined only in some process of folding or unfolding. For example, the lap joint part 35 and the lap joint part 46 may be in contact at an initial stage of the folding process of the rotation shaft structure or at an end stage of the unfolding process. In other words, the lap joint part 35 and the lap joint part 46 may be in sliding contact at an instant of closing from the flattened state, and correspondingly the lap joint part 35 and the lap joint part 46 may be in sliding contact at an end of unfolding from the closed state, to reduce design difficulty of the rotation shaft structure 1000. This may be specifically set based on different structural features, and is not specifically limited in this application.

It can be learned from the foregoing descriptions of the lap joint part 35 and the lap joint part 46 that, in this embodiment of this application, a sliding track of the lap joint part 46 on the lap joint part 35 may be designed, to control the movement track of the first support plate 40. A sliding track of the lap joint part 35 on the lap joint part 46 is mainly reflected in a design form of a contact surface between the lap joint part 35 and the lap joint part 46. For example, in some embodiments of this application, as shown in FIG. 21 and FIG. 22, a surface that is of the lap joint part 35 and that is in contact with the lap joint part 46 may be a cambered surface. A lap joint length of the two lap joint parts matches with a length of the lap joint part 46. The length of the lap joint part 46 may be slightly greater than the length of the lap joint part 35. A surface track line of the lap joint part 46 matches with a movement track of the lap joint part 35, to implement reliable contact between the two parts.

In addition, in this embodiment of this application, that a surface that is of the lap joint part 35 and that is in contact with the lap joint part 46 may be a cambered surface is understood as that a surface that is of the lap joint part 35 and that is in contact with the lap joint part 46 is a cambered surface, or a surface that is of the lap joint part 46 and that is in contact with the lap joint part 35 is a cambered surface, or both a surface that is of the lap joint part 35 and that is in contact with the lap joint part 46 and a surface that is of the lap joint part 46 and that is in contact with the lap joint part 35 are cambered surfaces. The surface that is of the lap joint part 35 and that is in contact with the lap joint part 46 is set as the cambered surface, so that the lap joint part 35 on the first rotation assembly 30 and the lap joint part 46 on the first support plate 40 can move more smoothly in a process of contact and relative sliding.

In another possible embodiment, when the surface that is of the lap joint part 35 and that is in contact with the lap joint part 46 is a cambered surface, the cambered surface may be formed by splicing at least two curved surfaces, and a preset included angle may be formed between two adjacent curved surfaces. For example, as shown in FIG. 23, the surface that is of the lap joint part 35 and that is in contact with the lap joint part 46 is a cambered surface formed by splicing at least four curved surfaces. Two adjacent curved surfaces are not parallel to each other. In other words, an included angle is formed between the two adjacent curved surfaces. The surface that is of the lap joint part 35 and that is in contact with the lap joint part 46 is set as the cambered surface formed by splicing the at least two curved surfaces, and the preset included angle is formed between the two adjacent curved surfaces, so that the cambered surface can be more adapted to a movement track along which the lap joint part 46 slides relative to the lap joint part 35, to more accurately control the sliding track of the first support plate 40.

It should be noted that, in this embodiment of this application, a value of the included angle formed between the two adjacent curved surfaces is not limited, and may be flexibly set based on a requirement in an actual application scenario, for example, an actual movement track.

In addition, in this embodiment of this application, as shown in FIG. 21 to FIG. 23, both the first guide structures 43 and the lap joint part 46 may be disposed on the first support plate 40, and the first guide shaft 31 and the lap joint part 35 may be disposed on the first driven arm 33, so that the first guide shaft 31 is in sliding fit with the first track slots 434 of the first guide structures 43, and the lap joint part 35 is in sliding fit with the lap joint part 46. In this way, stable relative movements between the first support plate 40 and the first rotation assembly 30 is implemented under effect of two groups of sliding pairs.

Because the first folding assembly 200 and the second folding assembly 300 may be symmetrically disposed with respect to the main shaft assembly 100, for a lap joint relationship between the second support plate 40 and the second driven arm 63, refer to the foregoing descriptions of a lap joint relationship between the first support plate 40 and the first driven arm 33. Details are not described herein again.

It may be understood that, in the foregoing embodiment, the lap joint part 35 is disposed on the first driven arm 33, the lap joint part 46 is disposed on the first support plate 40, and the lap joint part 35 supports the lap joint part 46, to control the movement track of the first support plate 40. This is merely an example for describing how to control the movement track of the first support plate 40 in this application. In another possible embodiment of this application, for example, the lap joint part 35 may alternatively be disposed on another possible structure of the first rotation assembly 30, to control the movement track of the first support plate 40. Similarly, to control a movement track of the second support plate 70, another possible structure of the second rotation assembly 60 except for the second swing arm 62 and the second driven arm 63 may be further used. Details are not described herein one by one.

Figure 24:
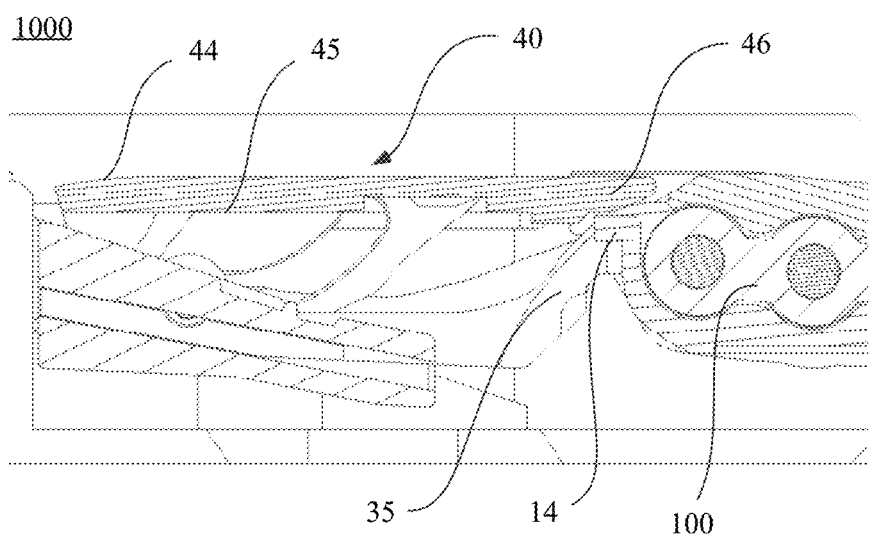
FIG. 24 is a schematic diagram of a partial structure of a rotation shaft structure according to another embodiment of this application.

FIG. 24 is a schematic diagram of a partial structure of the rotation shaft structure 1000 according to an embodiment of this application. In this embodiment of this application, a lap joint part 14 may be further disposed on a side that is of the main shaft assembly 100 and that is close to the first support plate 40. The lap joint part 14 may extend from the main shaft assembly 100 to the first support plate 40. The lap joint part 14 and the lap joint part 35 are located on a same side of the lap joint part 46. When the rotation shaft structure 1000 is in the flattened state, the lap joint part 46 is lap joined on the lap joint part 14. The lap joint part 14 may vertically support the lap joint part 46. The lap joint part 14 is disposed on the main shaft assembly 100. This can effectively improve control precision of the movement track of the first support plate 40, and further effectively reduce an avoidance clearance between the first support plate 40 and the main shaft assembly 100, so that the first support plate 40 can effectively support the flexible display 4000, to reduce a collapse area of the flexible display 4000. In addition, because an effective area of the rotation shaft structure 1000 for supporting the flexible display 4000 is significantly increased, the flexible display 4000 can bear extrusion force in a vertical direction. This reduces a risk of a problem such as a pressing failure in a use process of the flexible display 4000.

It may be understood that, when the first housing 2000 and the second housing 3000 are in the flattened state, a height of the lap joint part 14 of the main shaft assembly 100 is less than a height of the lap joint part 46 of the first support plate 40. In other words, a surface that is of the lap joint part 46 of the first support plate 40 and that is opposite to the first plate body 41 is lap joined on a surface of the lap joint part 14. In this application, a lap joint length between the lap joint part 46 and the lap joint part 14 is not specifically limited, and may be flexibly set based on an application requirement in an actual scenario, provided that the lap joint part 46 and the lap joint part 14 can be in reliable contact.

When the first housing 2000 and the second housing 3000 are folded from the flattened state, due to a design of the lap joint part 35, the lap joint part 46 slides along a surface of the lap joint part 35 in a direction away from the main shaft assembly 100, and is not stuck by the lap joint part 14. In addition, when the first housing 2000 and the second housing 3000 are unfolded from the closed state, the lap joint part 46 is driven by the lap joint part 35 to be lifted to a position higher than the lap joint part 14 based on a preset track, so that the first support plate 40 is not stuck with the main shaft assembly 100.

Therefore, in this application, through a linkage design of the lap joint part 35, the lap joint part 46, and the lap joint part 14, the first support plate 40 and the second support plate 70 can be folded and unfolded more smoothly and stably, so that the entire rotation shaft structure 1000 moves more stably and smoothly, and use effect is improved.

In addition, it may be understood that, in this embodiment of this application, a linkage mechanism formed by the lap joint part 35, the lap joint part 46, and the lap joint part 14 through cooperation is the anti-blocking mechanism described above, to prevent the first support plate 40 and the second support plate 70 from being stuck with the main shaft assembly 100 in a process of folding and unfolding. This improves movement smoothness of the first folding assembly 200 and the second folding assembly 300 and improves user experience.

To enable the first folding assembly 200 and the second folding assembly 300 to act synchronously in a process of folding and unfolding the rotation shaft structure, in an embodiment provided in this application, refer to FIG. 9. The rotation shaft structure 1000 may further include a synchronization assembly 400, to implement synchronous opposite rotation (synchronous rotation toward each other and synchronous rotation against each other) between the first folding assembly 200 and the second folding assembly 300. Specifically, for example, a user applies, to the first housing 2000, only clockwise rotation force relative to the main shaft assembly 100. The rotation force may be transferred to the second housing 3000 sequentially through the first folding assembly 200, the synchronization assembly 400, and the second folding assembly 300. In this case, the second housing 3000 synchronously rotates counter-clockwise around the main shaft assembly 100. In this application, the synchronization assembly 400 is disposed on the main shaft assembly 100, so that the first housing 2000 and the second housing 3000 can apply uniform force to the flexible display 4000 when rotating toward or against each other, to reduce stretching force on the flexible display 4000. In other words, the synchronization assembly 400 described in this embodiment of this application is the synchronization mechanism mentioned above, and has a same function in the rotation shaft structure.

Figures 25A, 25B:
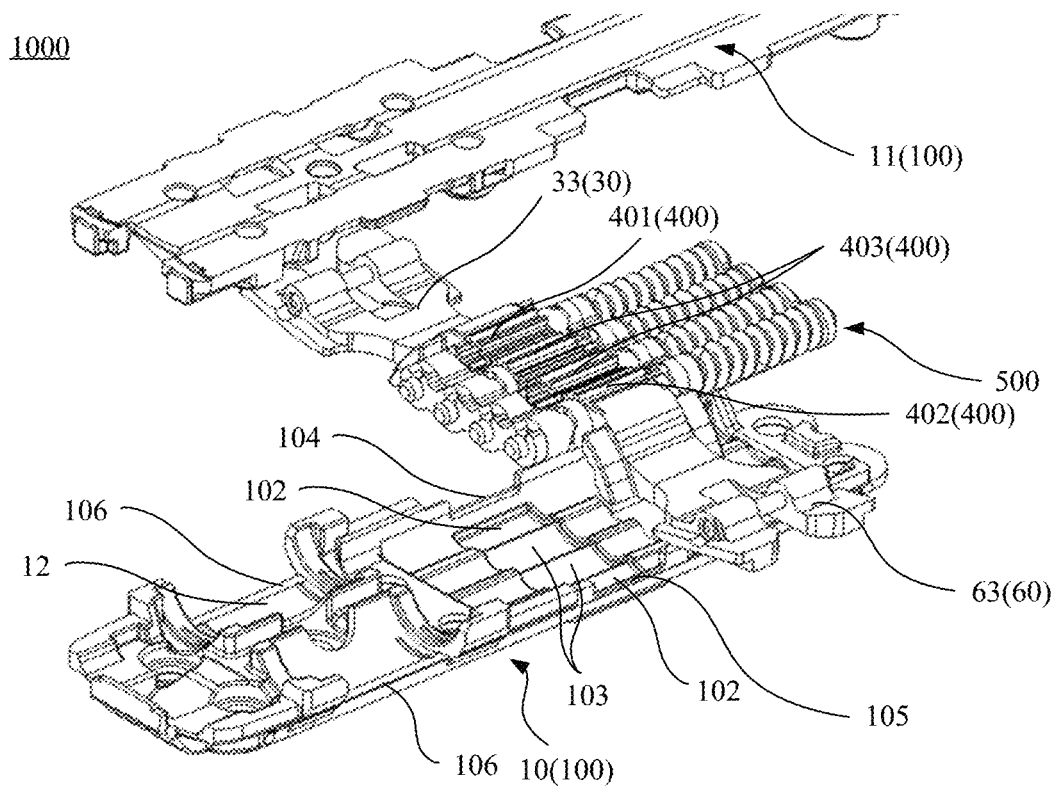
FIG. 25a is an exploded view of a rotation shaft structure according to another embodiment of this application.
FIG. 25b is a sectional view of an electronic device in a closed state according to an embodiment of this application.

During specific implementation, refer to FIG. 25a. FIG. 25a is a schematic diagram of a partial structure of a rotation shaft assembly according to an embodiment of this application. As described above, the second avoidance slots 103 in the outer housing 10 of the main shaft assembly 100 may accommodate another structure. Therefore, in this application, the synchronization assembly 400 may be disposed in the second avoidance slots 103 of the main shaft assembly 100. Certainly, the synchronization assembly 400 may alternatively be disposed at another position of the main shaft assembly 100, provided that a driving connection between the first folding assembly 200 and the second folding assembly 300 can be implemented. In addition, the synchronization assembly 400 may have a diversified structure and diversified connection relationships with the first folding assembly 200 and the second folding assembly 300. For example, refer to FIG. 25a and FIG. 25b. FIG. 25b is a sectional view of an electronic device in a closed state according to an embodiment of this application. In an embodiment provided in this application, the synchronization assembly 400 may include a gear structure. The synchronization assembly 400 may be drivingly connected to the first rotation assembly 30 and the second rotation assembly 60.

Specifically, the synchronization assembly 400 may include a first gear 401 and a second gear 402 that are engaged with each other. The first gear 401 is fastened to one end of the first rotation assembly 30 (in some implementations, a gear structure may alternatively be directly formed at an end of the first rotation assembly 30). The second gear 402 is fastened to one end of the second rotation assembly 60 (in some implementations, a gear structure may alternatively be directly formed at an end of the second rotation assembly 60). In a possible embodiment of this application, an axis center of the first gear 401 may coincide with a rotation axis of the first rotation assembly 30 on the main shaft assembly 100. An axis center of the second gear 402 may coincide with the rotation axis center of the second rotation assembly 60 on the main shaft assembly 100. Because the first gear 401 and the second gear 402 are engaged with each other, the first rotation assembly 30 drives the first gear 401 to rotate toward or against the first rotation assembly 30 when rotating around the main shaft assembly 100. Similarly, the second rotation assembly 60 also drives the second gear 402 to rotate toward or against the second rotation assembly 60 when rotating.

In another embodiment provided in this application, more gears may be further added between the first gear 401 and the second gear 402. For example, still as shown in FIG. 25a and FIG. 25b, driven gears 403 that are engaged with each other may be further disposed between the first gear 401 and the second gear 402. There are an even quantity of driven gears 403. A specific quantity of the driven gears 403 may be properly designed based on a volume of a receptacle of the main shaft assembly 100. In addition, the even quantity of driven gears 403 that are engaged with each other are respectively engaged with the first gear 401 and the second gear 402, so that the first rotation assembly 30 and the second rotation assembly 60 rotate synchronously by using the first gear 401, the second gear 402, and the driven gears 403. This can effectively improve stability of synchronous rotation of the first rotation assembly 30 and the second rotation assembly 60.

In some embodiments of this application, when the first rotation assembly 30 includes the first swing arm 32 and the first driven arm 33 in the foregoing embodiment and the second rotation assembly 60 includes the second swing arm 62 and the second driven arm 63, as shown in FIG. 25b, the first gear 401 may be fastened to the first driven arm 33, and the second gear 402 may be fastened to the second driven arm 63. In this case, the axis center of the first gear 401 coincides with the rotation axis center of the first driven arm 33 on the main shaft assembly 100. The axis center of the second gear 402 coincides with the rotation axis center of the second driven arm 63 on the main shaft assembly 100. In some other possible embodiments, the first gear 401 may be fastened to the first swing arm 32, and the second gear 402 may be fastened to the second swing arm 62. In this case, the axis center of the first gear 401 coincides with the rotation axis center of the first swing arm 32 on the main shaft assembly 100, and the axis center of the second gear 402 coincides with the rotation axis center of the second swing arm 62 on the main shaft assembly 100. Therefore, a structure of the rotation shaft structure 1000 can be effectively simplified. In addition, the first rotation assembly 30 and the second rotation assembly 60 may alternatively rotate synchronously by using a belt wheel mechanism or another transmission mechanism. It may be understood that, in this embodiment of this application, there may be one or more synchronization assemblies 400. The synchronization assemblies 400 may be selected based on a quantity of the first rotation assembly 30 and the second rotation assembly 60.

Figure 26A:
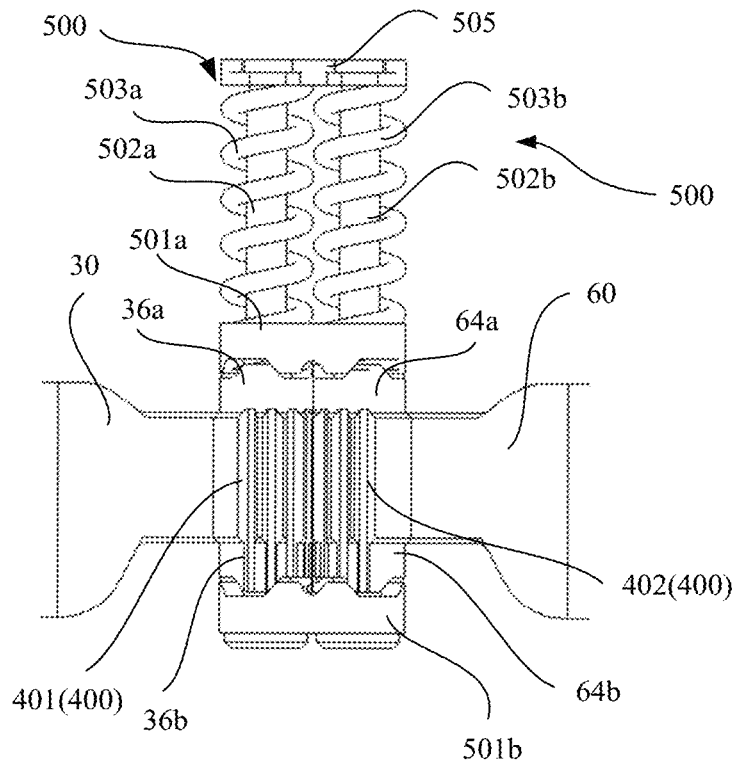
FIG. 26a is a schematic diagram of a partial structure of a rotation shaft structure according to an embodiment of this application.

In some embodiments of this application, refer to FIG. 26*a*. FIG. 26*a* is a schematic diagram of a partial structure of a rotation shaft structure according to an embodiment of this application. The rotation shaft structure 1000 may further include a damping assembly 500. The damping assembly 500 may be configured to provide specific damping force for the first folding assembly 200 and the second folding assembly 300 in a rotation process, so that the user has an obvious feeling on a folding or unfolding process of the electronic device. In other words, the damping assembly 500 mentioned in this embodiment of this application is the damping mechanism mentioned above, and has a same function in the rotation shaft structure.

In addition, resistance of the damping assembly to the first folding assembly 200 and the second folding assembly 300 may be reflected as follows: When the first folding assembly 200 and the second folding assembly 300 are in the flattened state and the closed state, under effect of the damping force of the damping assembly 500, the first folding assembly 200 and the second folding assembly 300 do not rotate relative to each other under no external force, so that the first folding assembly 200 and the second folding assembly 300 are stably kept in a corresponding folded state. It should be noted that the first housing 2000 is rotationally connected to the main shaft assembly 100 through the first folding assembly 200, and the second housing 3000 is rotationally connected to the main shaft assembly 100 through the second folding assembly 300, so that the first folding assembly 200 and the second folding assembly 300 are kept in a corresponding folded state, and the first housing 2000 and the second housing 3000 may be indirectly kept in a corresponding folded state. In this way, a specific included angle is kept between the first surface 2001 of the first housing 2000 and the second surface 3001 of the second housing 3000, to meet a use requirement of the user.

In addition, when the first folding assembly 200 and the second folding assembly 300 rotate to an intermediate state, under effect of the resistance of the damping assembly 500, the first folding assembly 200 and the second folding assembly 300 may automatically suspend in the intermediate state under no external force. Because the first folding assembly 200 and the second folding assembly 300 have an automatic suspending function, the first housing 2000 and the second housing 3000 may stay in the intermediate state between the closed state and the flattened state, to meet the use requirement of the user.

In another application scenario, when the first folding assembly 200 and the second folding assembly 300 almost rotate to the flattened state or the closed state, if the external force is removed, the first folding assembly 200 and the second folding assembly 300 may continue to move under the damping force of the damping assembly 500 until reaching the stable flattened state or closed state, to implement automatic unfolding and closing of the first folding assembly 200 and the second folding assembly 300. The first folding assembly 200 and the second folding assembly 300 have functions of automatic unfolding and closing, so that the electronic device can be in a stable structure state under no external force. This can help improve security of the electronic device.

Still as shown in FIG. 25*a*, as described above, the second avoidance slots 103 in the outer housing 10 of the main shaft assembly 100 may accommodate another structure. Therefore, in this application, the damping assembly 500 may be disposed in the second avoidance slots 103 of the main shaft assembly 100. Certainly, the damping assembly 500 may alternatively be disposed at another position of the main shaft assembly 100, provided that the damping force is provided for the first folding assembly 200 and the second folding assembly 300.

During specific implementation, for example, as shown in FIG. 26*a*, it can be learned from the foregoing that the first rotation assembly 30 and the second rotation assembly 60 may be drivingly connected through the synchronization assembly 400. In a possible embodiment of this application, in the length direction of the main shaft assembly 100, a cam structure 36*a* is disposed at one end of the first gear 401 of the synchronization assembly 400, and a cam structure 36*b* is disposed at the other end. Similarly, a cam structure 64*a* is disposed at one end of the second gear 402, and a cam structure 64*b* is disposed at the other end.

Still as shown in FIG. 26*a*, the damping assembly 500 includes a conjoined cam 501*a*, a conjoined cam 501*b*, an elastic structural member 503*a*, and an elastic structural member 503*b*. The conjoined cam 501*a* is disposed on a convex side of the cam structure 36*a* and the cam structure 64*a*. Two cam structures are disposed at an end that is of the conjoined cam 501*a* and that faces toward the cam structure 36*a* and the cam structure 64*a*. The two cam structures are engaged with the cam structure 36*a* and the cam structure 64*a* in a one-to-one correspondence manner. The conjoined cam 501*b* is disposed on a convex side of the cam structure 36*b* and the cam structure 64*b*. Two cam structures are disposed at an end that is of the conjoined cam 501*b* and that faces toward the cam structure 36*b* and the cam structure 64*b*. The two cam structures are engaged with the cam structure 36*b* and the cam structure 64*b* in a one-to-one correspondence manner. A convex portion and a concave portion are disposed on an end face that is of the conjoined cam 501*a* and that faces toward the cam structure 36*a* and the cam structure 36*b*. A convex portion and a concave portion are disposed on an end face that is of the conjoined cam 501*b* and that faces toward the cam structure 64*a* and the cam structure 64*b*.

It can be learned from the foregoing that when the first rotation assembly 30 and the second rotation assembly 60 are drivingly connected through the synchronization assembly 400, the first driven arm 33 of the first rotation assembly 30 may be fastened to the first gear 401 of the synchronization assembly 400, and the second driven arm 63 of the second rotation assembly 60 may be fastened to the second gear 402 of the synchronization assembly 400. Certainly, other structures of the first rotation assembly 30 and the second rotation assembly 60 may alternatively be respectively fastened to the two gears of the synchronization assembly 400. In addition, a rotation axis center, on the main shaft assembly 100, of a part that is fastened to the first gear 401 and that is of the first rotation assembly 30 coincides with an axis center of a rotation shaft of the first gear 401. A rotation axis center, on the main shaft assembly 100, of a part that is fastened to the second gear 402 and that is of the second rotation assembly 60 coincides with an axis center of a rotation shaft of the second gear 402. Therefore, for ease of description, in the following embodiments, the rotation shaft of the first gear 401 is denoted as a rotation shaft 502a, and the rotation shaft of the first gear 401 is denoted as a rotation shaft 502b. It may be understood that the rotation shaft 502a may be simultaneously used as a rotation axis, on the main shaft assembly 100, of the part that is fastened to the first gear 401 and that is of the first rotation assembly 30. The rotation shaft 502b may be simultaneously used as a rotation axis, on the main shaft assembly 100, of the part that is fastened to the second gear 402 and that is of the second rotation assembly 60.

In this embodiment of this application, as shown in FIG. 26a, correspondingly, a first via hole and a second via hole are disposed in the conjoined cam 501a, and a third via hole and a fourth via hole are disposed in the conjoined cam 501b. The first via hole and the third via hole are coaxially disposed, and the rotation shaft 502a penetrates the first via hole and the third via hole. The second via hole and the fourth via hole are coaxially disposed, and the rotation shaft 502b penetrates the second via hole and the fourth via hole.

In this embodiment of this application, the conjoined cam 501a can slide along the rotation shaft 502a and the rotation shaft 502b in a direction approaching or away from the cam structure 36a and the cam structure 64a. The conjoined cam 501b can slide along the rotation shaft 502a and the rotation shaft 502b in a direction approaching or away from the cam structure 36b and the cam structure 64b.

Still as shown in FIG. 26a, in this embodiment of this application, in the length direction of the main shaft assembly, the elastic structural member 503a and the elastic structural member 503b are disposed on a side that is of the conjoined cam 501a and that is away from the conjoined cam 501b. One end that is of the elastic structural member 503a and that is away from the conjoined cam 501a is limited to the rotation shaft 502a by using an arrestor structure 505, and the other end presses against the conjoined cam 501a, and presses the conjoined cam 501a to the cam structure 36a and the cam structure 64a, so that the conjoined cam 501a is engaged with the cam structure 36a and the cam structure 64a, or convex portions of the cam structures of the conjoined cam 501a press against the convex portions of the cam structure 36a and the cam structure 64a. One end of the elastic structural member 503b is limited to the rotation shaft 502b by using the arrestor structure 505, and the other end presses against the conjoined cam 501b, and presses the conjoined cam 501b to the cam structure 36b and the cam structure 64b, so that the conjoined cam 501b is engaged with the cam structure 36b and the cam structure 64b, or the convex portions of the cam structures of the conjoined cam 501a press against the convex portions of the cam structure 36a and the cam structure 64a. In this embodiment of this application, the arrestor structure 505 may be limited to one end that is of the rotation shaft 502a and that is away from the conjoined cam 501a and one end of the rotation shaft 502b and that is away from the conjoined cam 501a. In other words, the arrestor structure 505 is not disengaged from the end that is of the rotation shaft 502a and that is away from the conjoined cam 501a and the end that is of the rotation shaft 502b and that is away from the conjoined cam 501a.

The arrestor structure 505 may be disposed in several manners. In one embodiment, the arrestor structure 505 may move along the rotation shaft 502a and the rotation shaft 502b toward or away from the conjoined cam 501a. In other words, the arrestor structure 505 may be fastened to the elastic structural member 503b, and get close to or away from the conjoined cam 501a as elastic deformation of the elastic structural member 503b occurs. In another embodiment, the arrestor structure 505 may be fastened to one end that is of the rotation shaft 502a and that is away from the conjoined cam 501a and one end that is of the rotation shaft 502b and that is away from the conjoined cam 501a. The arrestor structure 505 may alternatively be fastened to the housings of the main shaft assembly 100. In some embodiments, the arrestor structure 505 may alternatively be directly formed on inner walls of the housings of the main shaft assembly 100 to limit the elastic structural member 503a and the elastic structural member 503b.

In addition, for example, the elastic structural member 503a may be a spring, and the elastic structural member 503b may also be a spring. In this way, the elastic structural member 503a may be sleeved on the rotation shaft 502a, and the elastic structural member 503b may be sleeved on the rotation shaft 502b. The elastic structural member 503a and the elastic structural member 503b are limited to the corresponding rotation shafts by using the arrestor structure 505, so that the elastic structural member 503a and the elastic structural member 503b can be effectively prevented from being disengaged from the corresponding rotation shafts. It may be understood that, in the embodiment shown in FIG. 26a, the elastic structural member 503a and the elastic structural member 503b are limited to the corresponding rotation shafts by using the same arrestor structure 505. The arrestor structure 505 is provided with two arrestor parts. The two arrestor parts are in a one-to-one correspondence to the rotation shaft 502a and the rotation shaft 502b. The two arrestor parts are connected to each other. In some other embodiments of this application, the two arrestor parts may alternatively be independent of each other.

Still as shown in FIG. 26a, in some embodiments of this application, quantities of the convex portions and the concave portions of the cam structures of the conjoined cam 501a are the same as quantities of the convex portions and the concave portions of the cam structure 36a and the cam structure 64a. Quantities of the convex portions and the concave portions of the cam structures of the conjoined cam 501b are the same as quantities of the convex portions and the concave portions of the cam structure 36b and the cam structure 64b. When rotation force is applied to the first housing 2000 and the second housing 3000 of the electronic device, the first rotation assembly 30 and the second rotation assembly 60 rotate accordingly. In this case, the cam structure 36a and the cam structure 64a rotate relative to the conjoined cam 501a, and the cam structure 36b and the cam structure 64b rotate relative to the conjoined cam 501b. When the convex portions of the cam structure 36a and the cam structure 64a tend to slide out of the concave portions of the conjoined cam 501a and the convex portions of the cam structure 36b and the cam structure 64b tend to slide out of the concave portions of the conjoined cam 501b, the elastic structural member 503a and the elastic structural member 503b are compressed, to provide specific damping force and keep the convex portions of the cam structure 36a and the cam structure 64a in the concave portions of the conjoined cam 501a and the convex portions of the cam structure 36b and the cam structure 64b in the concave portions of the conjoined cam 501b to an extent, so that the rotation shaft structure 1000 is kept in a stable folded state.

For example, when the first housing 2000 and the second housing 3000 are in the flattened state or the closed state, the convex portions of the cam structure 36a and the cam structure 64a may be exactly located in the concave portions of the conjoined cam 501a, and the convex portions of the cam structure 36b and the cam structure 64b may be exactly located in the concave portions of the conjoined cam 501b, so that the rotation shaft structure 1000 can be kept in the flattened state or the closed state. When the user operates the electronic device (for example, touches or presses the flexible display), the electronic device is not prone to be easily folded. This improves user experience. In addition, in some embodiments, when the rotation shaft structure 1000 is in the flattened state or the closed state, the convex portions of the cam structure 36a and the cam structure 64a are not completely located in the concave portions of the conjoined cam 501a, and the convex portions of the cam structure 36b and the cam structure 64b are not completely located in the concave portions of the conjoined cam 501b either. In this case, the convex portions and the concave portions may make slope contact to generate damping force, so that the rotation shaft structure 1000 is kept in the flattened state or the closed state.

For another example, when the first housing 2000 and the second housing 3000 are folded from the intermediate state to the flattened state or the closed state (namely when the convex portions slide from top surface contact to slope contact), the convex portions of the cam structure 36a and the cam structure 64a tend to slide into the concave portions of the conjoined cam 501a, and the convex portions of the cam structure 36b and the cam structure 64b tend to slide into the concave portions of the conjoined cam 501b. In this case, under an external force, the convex portions and the concave portions make slope contact to generate small damping force. The convex portions of the cam structure 36a and the cam structure 64a continue to slide into the concave portions of the conjoined cam 501a, and the convex portions of the cam structure 36b and the cam structure 64b continue to slide into the concave portions of the conjoined cam 501b until a stable flattened state or closed state is reached, to implement automatic unfolding or closing of the rotation shaft structure 1000 and further implement automatic unfolding or closing of the electronic device.

For another example, when the first housing 2000 and the second housing 3000 are folded to the intermediate state, the rotation shaft structure 1000 is folded to the intermediate state. In this case, top surfaces of the convex portions of the cam structure 36a and the cam structure 64a may exactly press against top surfaces of the convex portions of the conjoined cam 501a, and top surfaces of the convex portions of the cam structure 36b and the cam structure 64b may exactly press against top surfaces of the convex portions of the conjoined cam 501b. In this case, the elastic structural member 503a and the elastic structural member 503b are compressed to a largest extent and generate largest damping force, so that the rotation shaft assembly can suspend in the intermediate state of a specific angle, to prevent the electronic device with the rotation shaft structure from being randomly unfolded under external force. This can improve security of the electronic device. In addition, the quantity of the convex portions of each cam structure may be adjusted based on a requirement for a suspending angle and a position of the intermediate state. For example, there may be two, three, or four convex portions on each of the cam structures of the conjoined cam 501a, the cam structure 36a, and the cam structure 64a, and there may be two, three, or four convex portions on each of the cam structures of the conjoined cam 501b, the cam structure 36b, and the cam structure 64b.

In some other embodiments of this application, when the quantities of the convex portions and the concave portions of the cam structures of the conjoined cam 501a are different from the quantities of the convex portions and the concave portions of the cam structure 36a and the cam structure 64a and the quantities of the convex portions and the concave portions of the cam structures of the conjoined cam 501b are different from the quantities of the convex portions and the concave portions of the cam structure 36b and the cam structure 64b, the rotation shaft structure 1000 is in the intermediate state, and a fitting relationship between the cam structure 36a and the cam structure 64a with the conjoined cam 501a and a fitting relationship between the cam structure 36b and the cam structure 64b with the conjoined cam 501b may be the same as or different from those in the foregoing embodiment. The difference mainly lies in that the convex portions of the cam structure 36a and the cam structure 64a may also be exactly located in the concave portions of the conjoined cam 501a, and the convex portions of the cam structure 36b and the cam structure 64b may also be exactly located in the concave portions of the conjoined cam 501b. In addition, in this embodiment, when the rotation shaft structure 1000 is in another state, the fitting relationship between the cam structure 36a and the cam structure 64a with the conjoined cam 501a is similar to the fitting relationship between the cam structure 36b and the cam structure 64b with the conjoined cam 501b. Details are not described herein again.

Figure 26B:
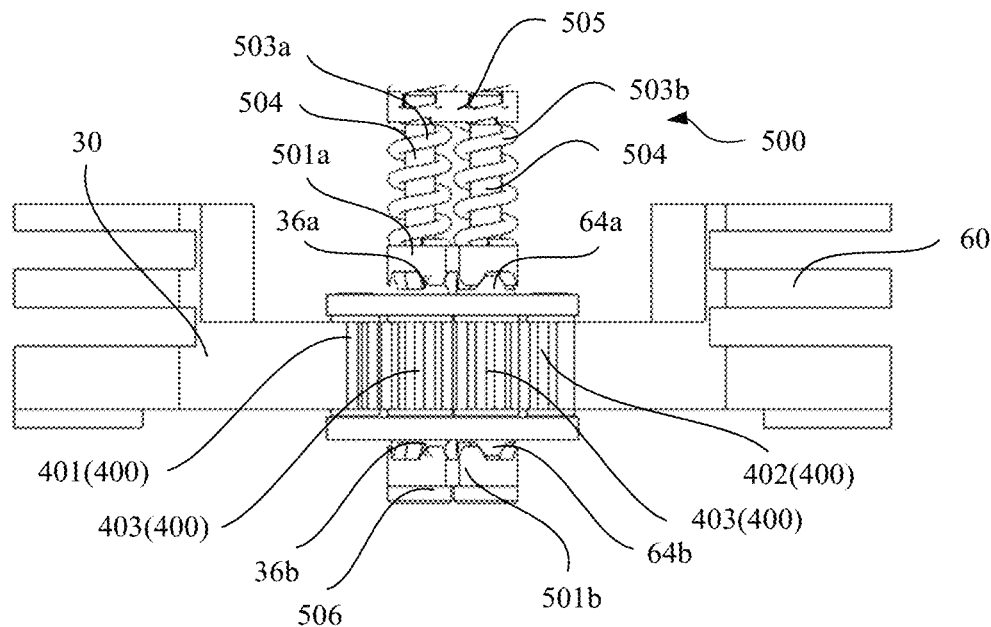
FIG. 26b is a schematic diagram of a partial structure of a rotation shaft structure according to an embodiment of this application.

In some other embodiments of this application, refer to FIG. 26b. FIG. 26b is a schematic diagram of a partial structure of a rotation shaft structure according to an embodiment of this application. When the synchronization assembly 400 includes the driven gears 403 disposed between the first gear 401 and the second gear 402, the driven gears 403 may rotate around middle shafts 504. Fifth via holes may be further disposed in the conjoined cam 501a. Sixth via holes may be further disposed in the conjoined cam 501b. The fifth via hole and the sixth via hole are coaxially disposed. The middle shaft 504 penetrates through both the fifth via hole and the sixth via hole. The middle shaft 504 is located between the rotation shaft 502a and the rotation shaft 502b. The middle shaft 504 is disposed parallel to the rotation shaft 502a and the rotation shaft 502b. In addition, it may be understood that, to rotate the first rotation assembly 30 and the second rotation assembly 60 in opposite directions and quickly fold or unfold the first rotation assembly 30 and the second rotation assembly 60, there are an even quantity of driven gears 403, an even quantity of middle shafts 504, an even quantity of fifth via holes, and an even quantity of sixth via holes, and the driven gears 403, the middle shafts 504, the fifth via holes, and the sixth via holes are disposed in a one-to-one correspondence manner.

In the embodiment shown in FIG. 26b, there are two driven gears 403. In the length direction of the main shaft assembly 100, the cam structure 36a is disposed at one end that is of the driven gear 403 and that is engaged with the first gear 401, and the cam structure 36b is disposed at the other end. Similarly, the cam structure 64a is disposed at one end that is of the driven gear 403 and that is engaged with the second gear 402, and the cam structure 64b is disposed at the other end. In addition, in this embodiment, no cam structure is disposed on end faces of the first gear 401 and the second gear 402. The conjoined cam 501a is disposed on a convex side of the cam structure 36a and the cam structure 64a. Two cam structures are disposed at an end that is of the conjoined cam 501a and that faces toward the cam structure 36a and the cam structure 64a. The two cam structures are engaged with the cam structure 36a and the cam structure 64a in a one-to-one correspondence manner. The conjoined cam 501b is disposed on a convex side of the cam structure 36b and the cam structure 64b. Two cam structures are disposed at an end that is of the conjoined cam 501b and that faces toward the cam structure 36b and the cam structure 64b. The two cam structures are engaged with the cam structure 36b and the cam structure 64b in a one-to-one correspondence manner.

Still as shown in FIG. 26b, an elastic structural member 503c is further sleeved on the middle shaft 504. The elastic structural member 503c is disposed on a side that is of the conjoined cam 501a and that is away from the conjoined cam 501b. One end that is of the elastic structural member 503c and that is away from the conjoined cam 501a is limited to the middle shaft 504 by using the arrestor structure 505, and the other end presses against the conjoined cam 501a, and presses the conjoined cam 501a to the cam structure 36a and the cam structure 64a, so that the conjoined cam 501a is engaged with the cam structure 36a and the cam structure 64a. This increases damping force between the first rotation assembly 30 and the second rotation assembly 60, and improves rotation reliability of the rotation shaft structure.

Figure 27:
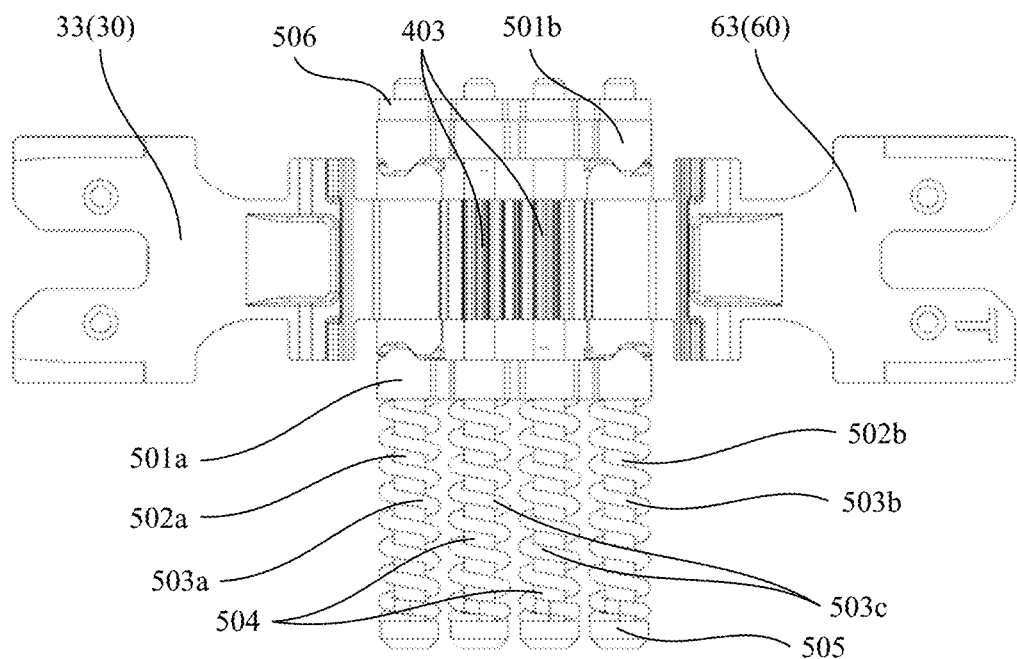
FIG. 27 is a schematic diagram of a partial structure of a rotation shaft structure according to another embodiment of this application.

In some other embodiments of this application, as shown in FIG. 27, when the synchronization assembly 400 includes the driven gears 403 disposed between the first gear 401 and the second gear 402, the driven gears 403 may rotate around middle shafts 504. Fifth via holes may be further disposed in the conjoined cam 501a. Sixth via holes may be further disposed in the conjoined cam 501b. The fifth via hole and the sixth via hole are coaxially disposed. The middle shaft 504 penetrates through both the fifth via hole and the sixth via hole. The middle shaft 504 is located between the rotation shaft 502a and the rotation shaft 502b. The middle shaft 504 is disposed parallel to the rotation shaft 502a and the rotation shaft 502b. In addition, it may be understood that, to rotate the first rotation assembly 30 and the second rotation assembly 60 in opposite directions and quickly fold or unfold the first rotation assembly 30 and the second rotation group 60, there are an even quantity of driven gears 403, an even quantity of middle shafts 504, an even quantity of fifth via holes, and an even quantity of sixth via holes, and the driven gears 403, the middle shafts 504, the fifth via holes, and the sixth via holes are disposed in a one-to-one correspondence manner.

In the embodiment shown in FIG. 27, in the length direction of the main shaft assembly 100, no cam structure is disposed on two end faces of the driven gear 403. Correspondingly, no cam structure is disposed on end faces that are of the conjoined cam 501a and the conjoined cam 501b and that face toward the driven gears 403. In this case, the conjoined cam 501a and the conjoined cam 501b are not engaged with the driven gears 403. In addition, it should be noted that, in this embodiment, the middle shaft 504, the rotation shaft 502a, and the rotation shaft 502b may have an equal length. An elastic structural member 503c is sleeved on the middle shaft 504. The elastic structural member 503c is disposed on a side that is of the conjoined cam 501a and that is away from the conjoined cam 501b. One end that is of the elastic structural member 503c and that is away from the conjoined cam 501a is limited to the rotation shaft 502a by using the arrestor structure 505, and the other end presses against the conjoined cam 501a, and presses the conjoined cam 501a to the cam structure 36a and the cam structure 64a, so that the conjoined cam 501a is engaged with the cam structure 36a and the cam structure 64a. This increases damping force between the first rotation assembly 30 and the second rotation assembly 60, and improves rotation reliability of the rotation shaft structure.

Figure 28:
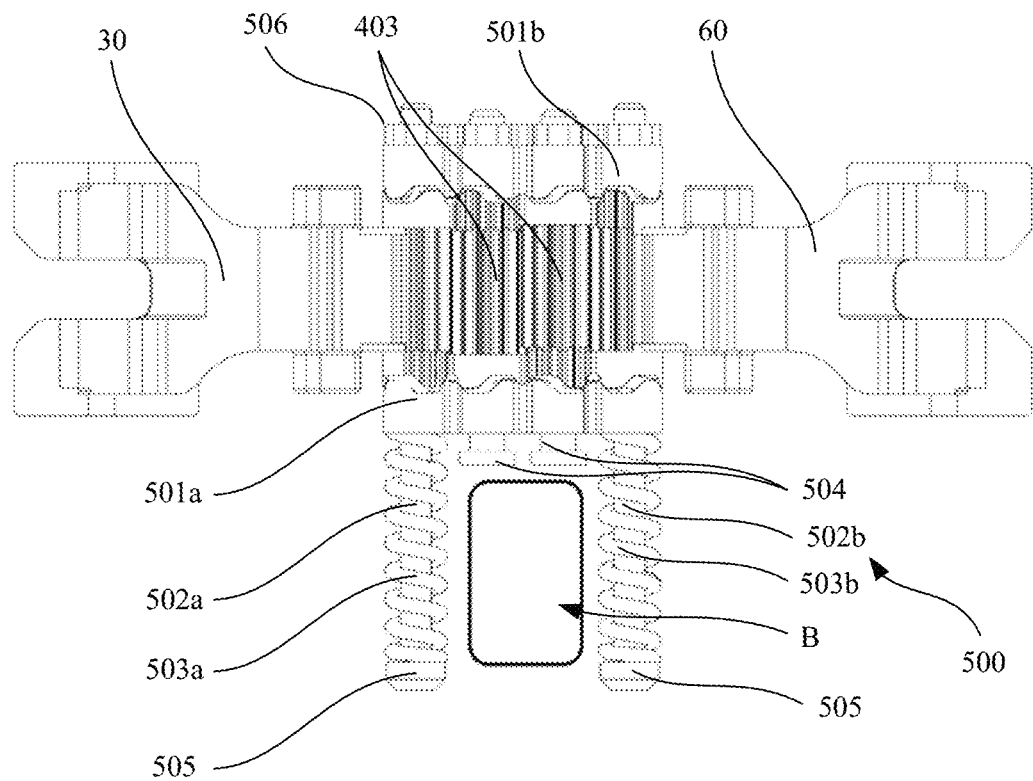
FIG. 28 is a schematic diagram of a partial structure of a rotation shaft structure according to another embodiment of this application.

In some other embodiments of this application, refer to FIG. 28. FIG. 28 shows a schematic diagram of a partial structure of a rotation shaft structure according to an embodiment of this application. In this embodiment, in the length direction of the main shaft assembly 100, cam structures may alternatively be disposed on two end faces of the driven gear 403, cam structures are disposed at corresponding positions of the conjoined cam 501a and the conjoined cam 501b, and the cam structures of the conjoined cam 501a and the conjoined cam 501b are engaged with the cam structures of the driven gears 403. In other words, the conjoined cam 501a and the conjoined cam 501b are engaged with the first gear 401, the second gear 402, and the driven gears 403 through the cam structures. This can effectively improve damping force between the first rotation assembly 30 and the second rotation assembly 60.

In addition, in this embodiment, a length of the middle shaft 504 may be less than that of the rotation shaft 502a and the rotation shaft 502b, so that the rotation shaft 502a and the rotation shaft 502b on a side that is of the conjoined cam 501a and that is away from the conjoined cam 501b enclose a mounting space B. During specific implementation, one end that is of the middle shaft 504 and that is away from the conjoined cam 501a may be flush with one end that is of the rotation shaft 502a and that is away from the conjoined cam 501a and one end that is of the rotation shaft 502b and that is away from the conjoined cam 501a. Through this setting, the mounting space B may provide space for mounting a fastening member such as a screw and other devices, to improve space utilization.

Figure 29:
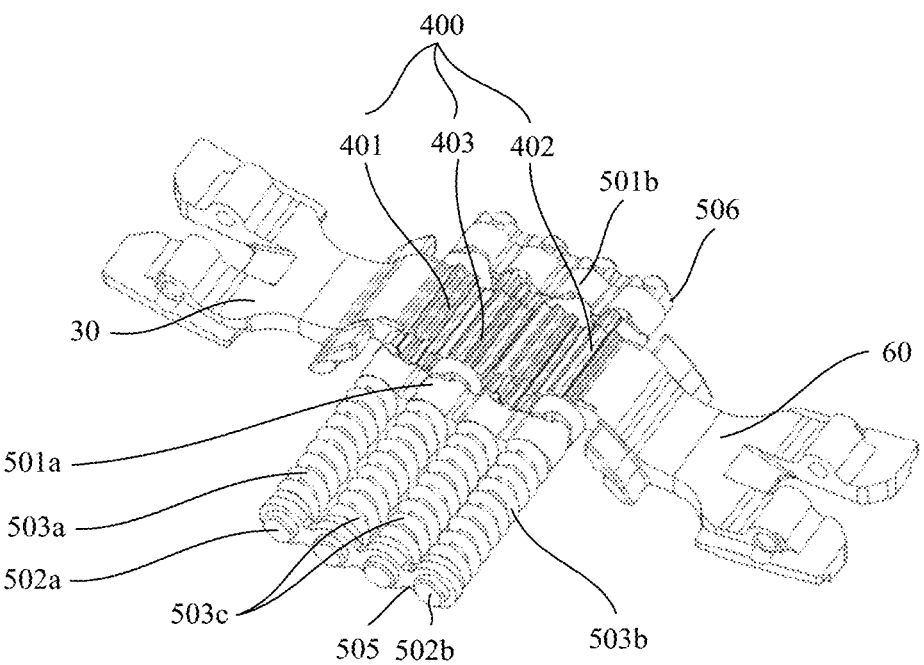
FIG. 29 is a schematic diagram of a partial structure of a rotation shaft structure according to another embodiment of this application.

In some other embodiments, refer to FIG. 29. FIG. 29 shows a schematic diagram of a partial structure of a rotation shaft structure according to another embodiment of this application. In this embodiment, the conjoined cam 501a and the conjoined cam 501b have cam structures engaged with the driven gears 403. A specific setting manner is the same as that in the embodiment shown in FIG. 28. Details are not described herein again. In addition, in this embodiment, a length of the middle shaft 504 may be the same as that of the rotation shaft 502a and the rotation shaft 502b. In this case, an elastic structural member 503c may be further disposed on the middle shaft 504. For example, the elastic structural member 503c may be a spring, and is sleeved on the middle shaft 504. One end that is of the elastic structural member 503c and that is away from the conjoined cam 501a presses against the arrestor structure 505, and the other end presses against the conjoined cam 501a, and presses the conjoined cam 501a to the cam structure 36a and the cam structure 64a. In this embodiment, the elastic structural member 503a, the elastic structural member 503b, and the elastic structural members 503c press against the same arrestor structure 505. The arrestor structure 505 is provided with a plurality of arrestor parts. The plurality of arrestor parts are in a one-to-one correspondence to the rotation shaft 502a, the rotation shaft 502b, and the middle shafts 504. The plurality of arrestor parts are connected to each other. In some other embodiments of this application, the plurality of arrestor parts may alternatively be independent of each other. The elastic structural members 503c are added between the elastic structural member 503a and the elastic structural member 503b, so that driving force for convex portions of cam structures of the first gear 401, the second gear 402, and the driven gears 403 to slide into concave portions of corresponding cam structures of the conjoined cam 501a and driving force for the convex portions of the cam structures of the first gear 401, the second gear 402, and the driven gears 403 slide into concave portions of the conjoined cam 501*b* can be effectively increased, to improve driving force for driving rotation of the first rotation assembly 30 and the second rotation assembly 60.

Figure 30:
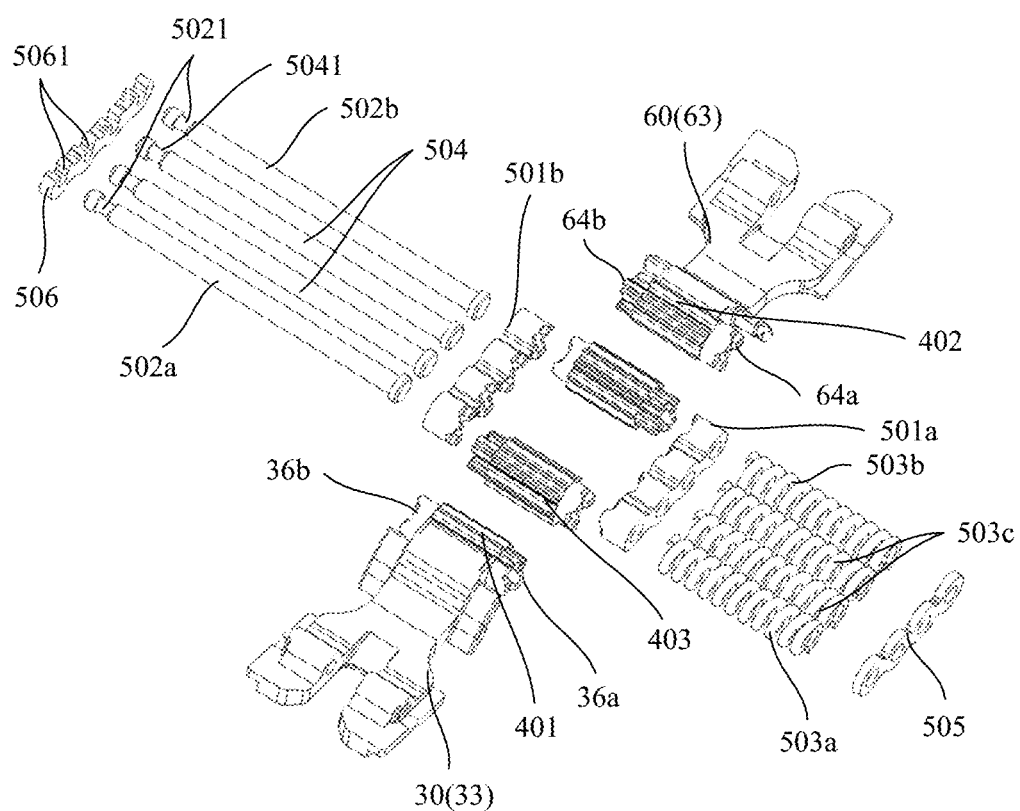
FIG. 30 is a schematic diagram of a partial structure of a rotation shaft structure according to another embodiment of this application.

Refer to FIG. 29 and FIG. 30. FIG. 30 shows an exploded view of a damping assembly, a synchronization assembly, a first rotation assembly, and a second rotation assembly according to an embodiment. In some embodiments of this application, to prevent the conjoined cam 501*b* from being disengaged from the rotation shaft 502*a*, the rotation shaft 502*b*, and the middle shafts 504, the damping assembly may further include an arrestor structure 506 disposed on a side that is of the conjoined cam 501*b* and that is away from the conjoined cam 501*a*. For example, the arrestor structure 506 may be a clamp spring. During specific implementation, as shown in FIG. 30, the arrestor structure 506 may include clamping slots 5061. An annular groove 5021 is disposed in an end of the rotation shaft 502*a* and an end of the rotation shaft 502*b*. An annular groove 5041 may be disposed in an end of the middle shaft 504. The annular grooves 5021 of the rotation shaft 502*a* and the rotation shaft 502*b* and the annular grooves 5041 of the middle shafts 504 are clamped in the clamping slots 5061 of the arrestor structure 506 in a one-to-one correspondence manner. In this embodiment, for a specific disposing manner of another structure of the damping assembly, refer to the foregoing embodiment. Details are not described herein again.

It may be understood that, similar to the arrestor structure 505, the arrestor structure 506 may also be disposed in several manners. In one embodiment, the arrestor structure 506 may move along the rotation shaft 502*a* and the rotation shaft 502*b* toward or away from the conjoined cam 501*b*. In other words, the arrestor structure 506 may be fastened to the conjoined cam 501*b*, and get close to or away from the conjoined cam 501*b* as the conjoined cam 501*b* moves. In another embodiment, the arrestor structure 506 may be fastened to one end that is of the rotation shaft 502*a* and that is away from the conjoined cam 501*b* and one end that is of the rotation shaft 502*b* and that is away from the conjoined cam 501*b*. The arrestor structure 506 may alternatively be fastened to the housings of the main shaft assembly 100. In some embodiments, the arrestor structure 506 may alternatively be directly formed on inner walls of the housings of the main shaft assembly 100 to limit the conjoined cam 501*b*.

In some embodiments, as shown in FIG. 30, when the first rotation assembly 30 includes the first swing arm 32 and the first driven arm 33, as shown in FIG. 29 and FIG. 30, the cam structure 36*a*, the cam structure 36*b*, the first gear 401, and the first driven arm 33 may be an integrated structure, or may certainly be structural members independent of each other. Similarly, as shown in FIG. 30, when the second rotation assembly 60 includes the second swing arm 62 and the second driven arm 63, the cam structure 64*a*, the cam structure 64*b*, the second gear 402, and the second driven arm 63 may be an integrated structure, or may be structural members independent of each other.

In some other embodiments of this application, when no synchronization assembly 400 is disposed between the first rotation assembly 30 and the second rotation assembly 60, in the length direction of the main shaft assembly 100, the cam structure 36*a* may be disposed at one end of the first rotation assembly 30, and the cam structure 36*b* may be disposed at the other end. Similarly, the cam structure 64*a* is disposed at one end of the second rotation assembly 60, and the cam structure 64*b* is disposed at the other end. In this embodiment, for a connection manner between the conjoined cam 501*a* and both of the cam structure 36*a* and the cam structure 64*a*, and a connection manner between the conjoined cam 501*a* and both of the cam structure 36*a* and the cam structure 64*a*, refer to the foregoing embodiment. Details are not described herein again.

It may be understood that the damping assembly 500 in this embodiment of this application may be used for an end face of the synchronization assembly 400 when the rotation assemblies on two sides are respectively rotationally connected to the main shaft assembly 100 in this embodiment of this application, and may also be used for another rotation shaft structure, provided that the rotation assemblies (for example, the housings and the rotation structural members) on the two sides rotate relative to a middle structure (for example, the main shaft assembly, the mounting brackets, or a base) in this embodiment of this application. Further, in addition to the foldable electronic device, the damping assembly 500 in this embodiment of this application may alternatively be used in any other scenario including two rotation shafts that are disposed in parallel and that rotate relative to each other, to meet a requirement of the rotation assemblies connected to the two rotation shafts for damping force in a rotation process.

Figure 31:
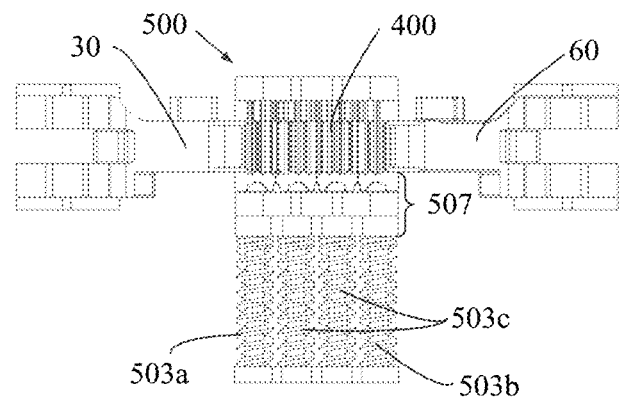
FIG. 31 is a schematic diagram of a partial structure of a rotation shaft structure according to another embodiment of this application.
Figure 32:
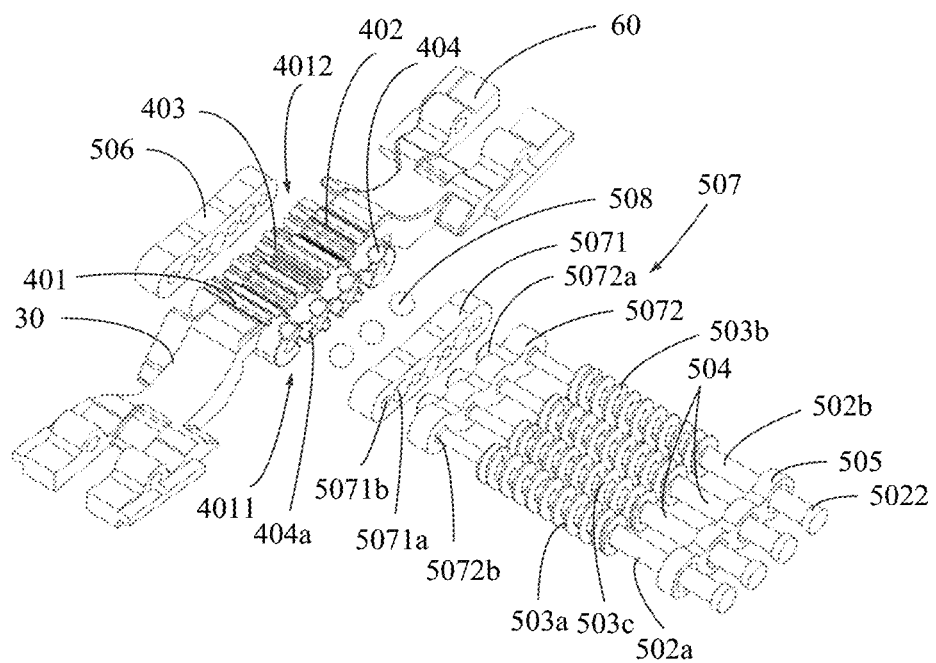
FIG. 32 is a schematic diagram of a partial structure of a rotation shaft structure according to another embodiment of this application.

In some implementations, the damping assembly 500 is not merely limited to the structure forms disclosed in the foregoing embodiments. For example, refer to FIG. 31. FIG. 31 shows a disposing manner of a damping assembly according to another embodiment. In this embodiment, the damping assembly 500 may include a guide part 507 and the elastic structural member 503*a* and the elastic structural member 503*b* in the foregoing embodiment. FIG. 32 is an exploded view of a structure of the damping assembly 500 according to an embodiment of this application.

Still as shown in FIG. 31, in this embodiment, a specific structure of the damping assembly 500 and a transmission relationship between the damping assembly 500 and the first rotation assembly 30 and the second rotation assembly 60 are described by using an example in which the first rotation assembly 30 and the second rotation assembly 60 are drivingly connected through the synchronization assembly 400. As shown in FIG. 31 and FIG. 32, for a specific disposing manner of the synchronization assembly 400, refer to the foregoing embodiment. Details are not described herein again. Simply, in this embodiment, the synchronization assembly 400 includes a first gear 401 and a second gear 402. The first gear 401 is fastened to the first rotation assembly 30. The second gear 402 is fastened to the second rotation assembly 60. When the first gear 401 is specifically disposed, the first gear 401 may include a first end face 4011 and a second end face 4012 that are perpendicular to an axis of the first gear 401. In the synchronization assembly 400, first end faces 4011 of different gears are all located on a same side, and second end faces 4012 of different gears are also all located on a same side.

As shown in FIG. 32, in a possible embodiment of this application, the damping assembly 500 may further include balls 508. Correspondingly, ball slots 404 may be disposed in the first gear 401 and the second gear 402 of the synchronization assembly 400.

Figure 33:
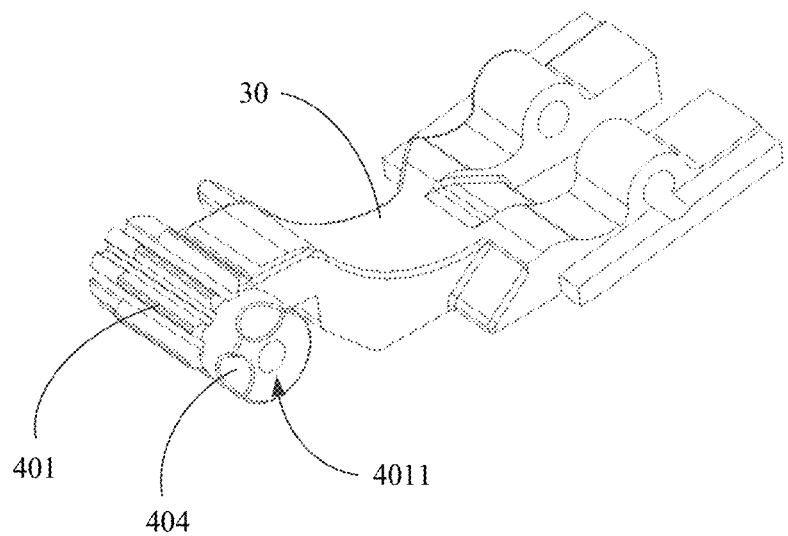
FIG. 33 is a schematic diagram of a connection structure between a first gear and a first rotation assembly according to an embodiment of this application.

When the ball slots 404 are specifically disposed, in an example of the first gear 401, there may be at least two ball slots 404 in the first gear 401. For example, refer to FIG. 33. FIG. 33 is a schematic diagram of a structure formed by fastening the first rotation assembly 30 and the first gear 401 according to an embodiment of this application. Two ball slots 404 are disposed in a peripheral side that is of the first gear 401 and that is close to the first end face 4011.

Figure 34:
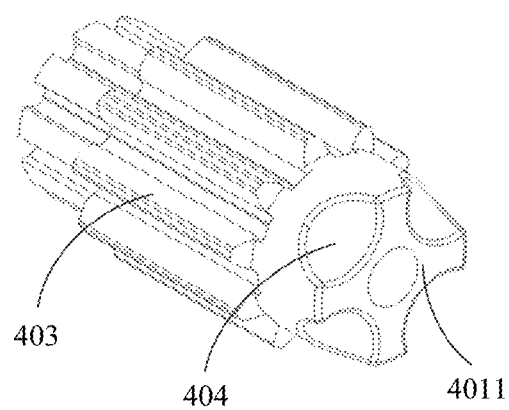
FIG. 34 is a schematic diagram of a structure of a driven gear according to an embodiment of this application.

In some other embodiments, still as shown in FIG. 32, the synchronization assembly 400 may further include the driven gears 403 disposed between the first gear 401 and the second gear 402. There are an even quantity of driven gears 403. For a structure of the driven gear 403, refer to FIG. 34. FIG. 34 is a schematic diagram of a structure of the driven gear 403 according to an embodiment of this application. Four ball slots 404 may be disposed in a peripheral side that is of the driven gear 403 and that is close to the first end face 4011. The four ball slots 404 are evenly disposed in a peripheral direction of the first end face 4011 of the driven gear 403. This disposing manner may facilitate alignment and connection between the first rotation assembly 30 and the driven gear 403. In addition, in some embodiments of this application, the ball slots 404 of the driven gear 403 may alternatively be symmetrically disposed, so that direction selectivity can be reduced, and quick alignment can be implemented when the synchronization assembly 400 is mounted.

In addition to the foregoing disposing manner, there may alternatively be a same quantity of ball slots 404 in the first gear 401, the second gear 402, and the driven gears 403. In an embodiment, there may be three, four, five, or six ball slots 404 in the first gear 401, the second gear 402, and the driven gears 403. It may be understood that the quantity of the ball slots 404 may be selected, to implement position maintaining of the damping assembly 500 at different angles.

For example, as shown in FIG. 32, when there are three ball slots 404 in each of the first gear 401, the second gear 402, and the driven gears 403 and the three ball slots 404 are all evenly distributed along the peripheral side close to the first end face 4011, as shown in FIG. 1a and FIG. 32, the first surface 2001 of the first housing 2000 and the third surface 3001 of the second housing 3000 may be stopped at an included angle of 0° (the closed state), 120° (the intermediate state), or 180° (the flattened state). For another example, when there are four ball slots 404 in each of the first gear 401, the second gear 402, and the driven gears 403 and the four ball slots 404 are all evenly distributed along the peripheral side close to the first end face 4011, the first surface 2001 of the first housing 2000 and the third surface 3001 of the second housing 3000 may be stopped at an included angle of 0°, 90°, or 180°. For another example, when there are six ball slots 404 in each of the first gear 401, the second gear 402, and the driven gears 403 and the six ball slots 404 are all evenly distributed along the peripheral side close to the first end face 4011, the first surface 2001 of the first housing 2000 and the third surface 3001 of the second housing 3000 may be stopped at an included angle of 0°, 60°, 120°, or 180°.

Figure 35:
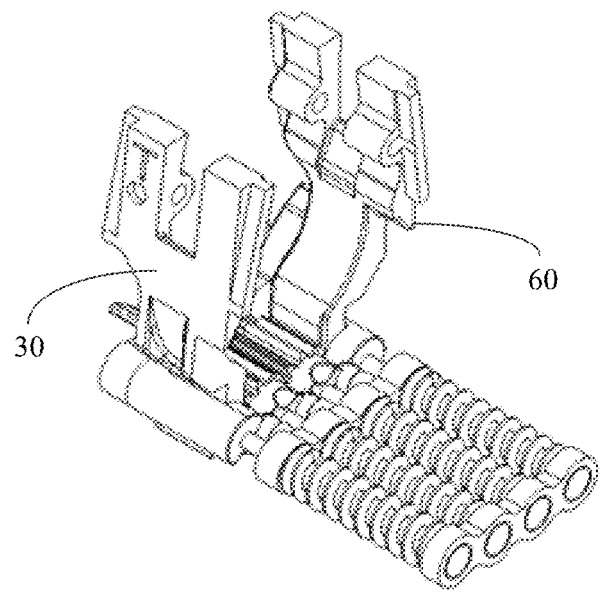
FIG. 35 is a schematic diagram of a partial structure of a rotation shaft structure according to another embodiment of this application.
Figure 36:
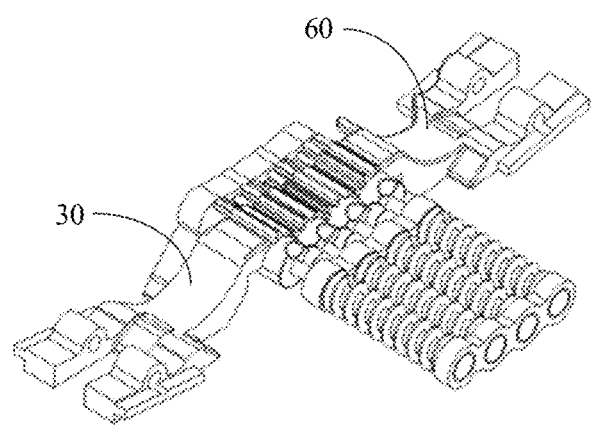
FIG. 36 is a schematic diagram of a partial structure of a rotation shaft structure according to another embodiment of this application.

Refer to FIG. 35 and FIG. 36. FIG. 35 is a schematic diagram of states of the first rotation assembly 30 and the second rotation assembly 60 when the first housing 2000 and the second housing 3000 are in the closed state. FIG. 36 is a schematic diagram of states of the first rotation assembly 30 and the second rotation assembly 60 when the first housing 2000 and the second housing 3000 are in the flattened state. It can be learned that the damping assembly 500 in this technical solution may implement multi-angle stopping in a rotation process of the first rotation assembly 30 and the second rotation assembly 60.

In an embodiment of this application, for the first gear 401, the second gear 402, and the driven gears 403 in the synchronization assembly 400, a sphere center of the ball slot 404 may be located on a circumferential line of the first end face 4011 of the corresponding gear. When the ball slot 404 is specifically disposed, for example, the ball slot 404 may be a ¼ ball slot. In this case, a spherical surface of the ball slot 404 may be a ¼ spherical surface.

Still as shown in FIG. 32, when the synchronization assembly 400 is in a positioning work station, the included angle between the first rotation assembly 30 and the second rotation assembly 60 may remain unchanged under no external force. In the positioning work station, the ball slots 404 of any two adjacent gears are paired to form an accommodation slot 404a. The ball 508 is located in the accommodation slot 404a. An opening of the accommodation slot 404a is perpendicular to the first end face 4011 of each gear.

In an embodiment of this application, as shown in FIG. 31 and FIG. 32, the guide part 507 is disposed close to the accommodation slot 404a, and positioning slots 5071a are disposed on a side that is of the guide part 507 and that faces toward the synchronization assembly 400. When the synchronization assembly 400 is in the positioning work station, the positioning slots 5071a are in a one-to-one correspondence to the accommodation slots 404a, and one ball 508 is disposed between each pair of the positioning slot 5071a and the accommodation slot 404a. It may be understood that, in this embodiment of this application, an opening diameter of the positioning slot 5071a may be less than a diameter of the ball 508, and a spherical surface of the ball 508 presses against an opening that is of the positioning slot 5071a and that faces toward the synchronization assembly 400, so that the ball 508 is kept between the synchronization assembly 400 and the guide part 507.

When the synchronization assembly 400 is in the positioning work station, a part of the ball 508 is located in the accommodation slot 404a, and a part of the ball is located in the positioning slot 5071a. When the synchronization assembly 400 is in a rotation work station, the accommodation slot 404a is separated into two ball slots 404, and the ball 508 is extruded out of the ball slots 404 by the rotating synchronization assembly 400. However, a part of the ball 508 is always located in the positioning slot 5071a, so that the ball 508 is not disengaged from the damping assembly 500.

In an embodiment of this application, there may be at least two balls 508. In a rotation process of the synchronization assembly 400, the at least two balls 508 may provide support points for the guide part 507, to improve movement stability of the guide part 507 in a rotation process of the balls 508.

For example, as shown in FIG. 31 and FIG. 32, the synchronization assembly 400 includes the first gear 401, the second gear 402, and the two driven gears 403 disposed between the first gear 401 and the second gear 402. In this case, there may be three balls 508. In this way, one ball 508 may be respectively disposed between the first gear 401 and the driven gear 403 that are adjacent to each other, between the two driven gears 403 that are adjacent to each other, and between the driven gear 403 and the second gear 402 that are adjacent to each other, to effectively improve movement stability and force balance of the guide part 507.

In an embodiment of this application, when the guide part 507 is specifically disposed, the guide part 507 may include a guide sleeve 5071. The positioning slots 5071a are disposed in a side that is of the guide sleeve 5071 and that faces toward the synchronization assembly 400.

Still as shown in FIG. 31 and FIG. 32, in another embodiment of this application, the guide part 507 further includes a pressing block 5072. The pressing block 5072 is disposed on a side that is of the guide sleeve 5071 and that is away from the synchronization assembly 400.

In an embodiment of this application, as shown in FIG. 32, the positioning slots 5071a disposed in the guide sleeve 5071 are through slots. Correspondingly, a columnar protrusion 5072a is disposed at a position that is of the pressing block 5072 and that corresponds to each positioning slot 5071a. An outline size of the columnar protrusion 5072a is less than an inner diameter of the positioning slot 5071a. The columnar protrusions 5072a can be inserted into the positioning slots 5071a. In this embodiment, the inner diameter of the positioning slot 5071a is greater than the diameter of the ball 508. In this case, an end of the columnar protrusion 5072a presses against a spherical surface that is of the ball 508 and that faces toward the pressing block 202. In this way, regardless of whether the damping assembly 500 is in the positioning work station or a sliding work station, the ball 508 may always be stably located in the positioning slot 5071a, and the ball 508 is always in contact with the first end face 4011 of the synchronization assembly under effect of the pressing block 5072.

For example, the columnar protrusion 5072a may be, for example, a cylindrical protrusion or a square protrusion. An end surface that is of the columnar protrusion 5072a and that is in contact with the ball 508 may be, for example, a spherical surface. The spherical surface may have a curvature radius the same as a radius of the ball 508, to increase a contact area with the ball 508 and improve stability.

In an embodiment of this application, the guide sleeve 5071 may keep still, and the pressing block 5072 can move in a direction of pressing the guide sleeve 201, and can move in a direction away from the synchronization assembly 400 under effect of extrusion force of the ball 508.

In an embodiment of this application, first mounting holes 5071b are further disposed in the guide sleeve 5071. Second mounting holes 5072b are disposed in the pressing block 5072. Still as shown in FIG. 32, in this embodiment of this application, as described above, the first gear 401 of the synchronization assembly may rotate around the rotation shaft 502a. The second gear 402 may rotate around the rotation shaft 502b. The driven gear 403 rotates around the middle shaft 504. One end of the rotation shaft 502a penetrates through the first gear 401 in an axial direction of the first gear 401, and the other end sequentially penetrates through the first mounting hole 5071b of the guide sleeve 5071 and the second mounting hole 5072b of the pressing block 5072. One end of the rotation shaft 502b penetrates through the second gear 402 in an axial direction of the second gear 402, and the other end sequentially penetrates through the first mounting hole 5071b of the guide sleeve 5071 and the second mounting hole 5072b of the pressing block 5072. One end of the middle shaft 504 penetrates through the driven gear 403 in an axial direction of the driven gear 403, and the other end sequentially penetrates through the first mounting hole 5071b of the guide sleeve 5071 and the second mounting hole 5072b of the pressing block 5072. Therefore, the guide sleeve 5071 is mounted on the rotation shaft 502a, the rotation shaft 502b, and the middle shafts 504 through the first mounting holes 5071b. In addition, the pressing block 5072 is mounted on the rotation shaft 502a, the rotation shaft 502b, and the middle shafts 504 through the second mounting holes 5072b.

In addition, still as shown in FIG. 32, the arrestor structure 506 is further disposed on the second end surfaces 4012 of the gears. The rotation shaft 502a, the rotation shaft 502b, and the middle shafts 504 are fastened to the arrestor structure 506 after penetrating through the corresponding gears. In embodiments of this application, the rotation shaft 502a and the first gear 401 may be fastened or rotationally connected to each other. The rotation shaft 502b and the second gear 402 may be fastened or rotationally connected to each other. The middle shaft 504 and the driven gear 403 may be fastened or rotationally connected to each other. This is not specifically limited herein. In addition, for example, the rotation shaft 502a, the rotation shaft 502b, and the middle shafts 504 may be fastened or rotationally connected to the arrestor structure 506, provided that the first gear 401, the second gear 402, and the driven gears 403 may keep still in rotation axial position. In a possible embodiment of this application, the rotation shaft 502a, the rotation shaft 502b, and the middle shafts 504 are fastened to the arrestor structure 506. The rotation shaft 502a is rotationally connected to the first gear 401, the rotation shaft 502b is rotationally connected to the second gear 402, and the middle shaft 504 is rotationally connected to the driven gear 403.

In this embodiment of this application, still as shown in FIG. 32, one end that is of the rotation shaft 502a and that is away from the synchronization assembly, one end that is of the rotation shaft 502b and that is away from the synchronization assembly, and one end that is of the middle shaft 504 and that is away from the synchronization assembly are each provided with an annular protrusion 5022 and an arrestor structure 505, where the arrestor parts 505 are sleeved on the rotation shaft 502a, the rotation shaft 502b, and the middle shafts 504 and disposed close to the annular protrusions 5022. It may be understood that, in this embodiment of this application, the arrestor structure 505 may be a split structure. In this case, the rotation shaft 502a, the rotation shaft 502b, and the middle shafts 504 may each be provided with one arrestor structure 505. In some other embodiments of this application, the arrestor structure 505 may alternatively be an integrated structure. In this case, holes need to be drilled at positions that are of the arrestor structure 505 and that correspond to the rotation shaft 502a, the rotation shaft 502b, and the middle shafts 504, so that the arrestor structure 505 is sleeved on the rotation shaft 502a, the rotation shaft 502b, and the middle shafts 504. In the embodiment of this application shown in FIG. 32, the arrestor structure 505 of the integrated structure is used, to improve overall linkage of the damping assembly.

As shown in FIG. 32, in this embodiment of this application, the elastic structural member 503a and the elastic structural member 503b are disposed between the guide part 507 and the arrestor structure 505. The elastic structural member 503a and the elastic structural member 503b apply elastic force to the pressing block 5072, to press the pressing block 5072 to the guide sleeve 5071.

When the elastic structural member 503a and the elastic structural member 503b are specifically disposed, the elastic structural member 503a may be disposed on the rotation shaft 502a, and the elastic structural member 503b may be disposed on the rotation shaft 502b. In addition, the elastic structural member 503a and the elastic structural member 503b may be but are not limited to springs. In this way, when the damping assembly 500 is in the positioning work station, the spring is in a compressed state, so that the ball 508 is located between the accommodation slot 404a and the positioning slot 5071a. In an embodiment of this application, the spring may be replaced with a dome. For example, the dome may be a V-shaped dome or a W-shaped dome. When the damping assembly is in the positioning work station, the dome is also in a compressed state, so that the ball 508 is located between the accommodation slot 404a and the positioning slot 5071a.

Still as shown in FIG. 32, when the synchronization assembly includes the driven gears 403 and the damping assembly includes the middle shafts 504, the damping assembly may further include elastic structural members 503c disposed on the middle shafts 504. The elastic structural members 503c are disposed between the guide part 507 and the arrestor structure 505, and elastically press against the pressing block 5072, to press the pressing block 5072 to the guide sleeve 5071. Therefore, greater damping force can be provided for relative rotation of the first rotation assembly 30 and the second rotation assembly 60, so that the first rotation assembly 30 and the second rotation assembly 60 have higher movement stability and keep stability in place.

The following describes in detail a movement process of the damping mechanism in embodiments of this application with reference to FIG. 31 and FIG. 32.

When the synchronization assembly 400 is in the positioning work station, the first housing 2000 and the second housing 3000 are kept in the flattened state, the closed state, or the intermediate state. In this case, the ¼ ball slots of the adjacent gears of the synchronization assembly 400 form the accommodation slot 404a. The radius of the ball slot 404 is the same as the radius of the ball 508. The formed accommodation slots 404a are in a one-to-one correspondence to the positioning slots 5071a disposed in the guide sleeve 5071. The inner diameter of the positioning slot 5071a is greater than the diameter of the ball 508. In this case, half of the ball 508 between each pair of the accommodation slot 404a and the positioning slot 5071a is located in the accommodation slot 404a, and the other half is located in the positioning slot 5071a. Under action force of the elastic structural member 503a, the elastic structural member 503b, and the elastic structural members 503c, the columnar protrusions 5072a that are of the pressing block 5072 and that extend into the positioning slots 5071a enable the balls 508 to closely fit the accommodation slots 404a. When a relative folding position between the first housing 2000 and the second housing 3000 needs to be changed, specific torsion force needs to be applied to the first housing 2000 and the second housing 3000. If the applied torsion force is excessively small, the synchronization assembly 400 is in a stable stopping state.

When the torsion force is applied to the first housing 2000 and the second housing 3000, the first rotation assembly 30 and the second rotation assembly 60 rotate, so that the synchronization assembly 400 starts to rotate. The first gear 401, the second gear 402, and the driven gears 403 rotate, to separate the two ball slots 404 that form the accommodation slot 404a, to push the ball 508 to gradually move out of the accommodation slot 404a, and to enable the ball 508 to gradually enter the positioning slot 5071a. In this case, the balls 508 apply action force to the columnar protrusions 5072a, to push the pressing block 5072 to compress the elastic structural member 503a, the elastic structural member 503b, and the elastic structural members 503c. When the synchronization assembly 400 rotates until the two ball slots 404 of the adjacent gears form the accommodation slot 404a again, the balls 508 enter the accommodation slots 404a again under effect of resilience force of the elastic structural member 503a, the elastic structural member 503b, and the elastic structural members 503c, and are limited in the accommodation slots 404a by using the columnar protrusions 5072a. In this case, the first housing 2000 and the second housing 3000 are kept in the folded state again.

It may be understood that when the ball 508 is located at a position that is on the first end face 4011 of the synchronization assembly 400 and that is outside the ball slot 404, the ball 508 is in an unstable state. In this case, under action force of the elastic structural member 503a, the elastic structural member 503b, and the elastic structural members 503c, the balls 508 are pushed to move toward the ball slots 404 and drive the synchronization assembly 400 to rotate, to implement automatic unfolding and closing functions of the first rotation assembly 30 and the second rotation assembly 60 and further implement automatic unfolding and closing functions of the first housing 2000 and the second housing 3000.

According to the damping mechanism provided in this embodiment of this application, both the ball 508 and the ball slot 404 that fits the ball 508 have regular spherical surfaces, which means small friction force and little abrasion to the ball 508 and the ball slot 404. This can effectively prolong a service life of the damping assembly. In addition, because both the ball 508 and the ball slot 404 have regular curved surfaces, processing and inspection are easy.

In addition, in the foregoing embodiment, when the first rotation assembly 30 may include the first swing arm 32 and the first driven arm 33 and the second rotation assembly 60 includes the second swing arm 62 and the second driven arm 63, the first swing arm 32 may be fastened to the first gear 401, and the second swing arm 62 may be fastened to the second gear 402. Alternatively, the first driven arm 33 is fastened to the first gear 401, and the second driven arm 63 is fastened to the second gear 402. Certainly, the first gear 401 may alternatively be fastened to another possible structure of the first rotation assembly 30, and the second gear 402 may alternatively be fastened to another possible structure of the second rotation assembly 60. This is not specifically limited herein.

It may be understood that the damping assembly 500 in this embodiment of this application may be used for an end face of the synchronization assembly 400 when the rotation assemblies on two sides are respectively rotationally connected to the main shaft assembly 100 in this embodiment of this application, and may also be used for another rotation shaft structure, provided that the rotation assemblies (for example, the housings and the rotation structural members) on the two sides rotate relative to a middle structure (for example, the main shaft assembly, the mounting brackets, or a base) in this embodiment of this application. Further, in addition to the foldable electronic device, the damping assembly 500 in this embodiment of this application may alternatively be used in any other scenario including two rotation assemblies that rotate relative to each other, to meet a requirement of the two rotation assemblies for damping force in a rotation process.

Figure 37:
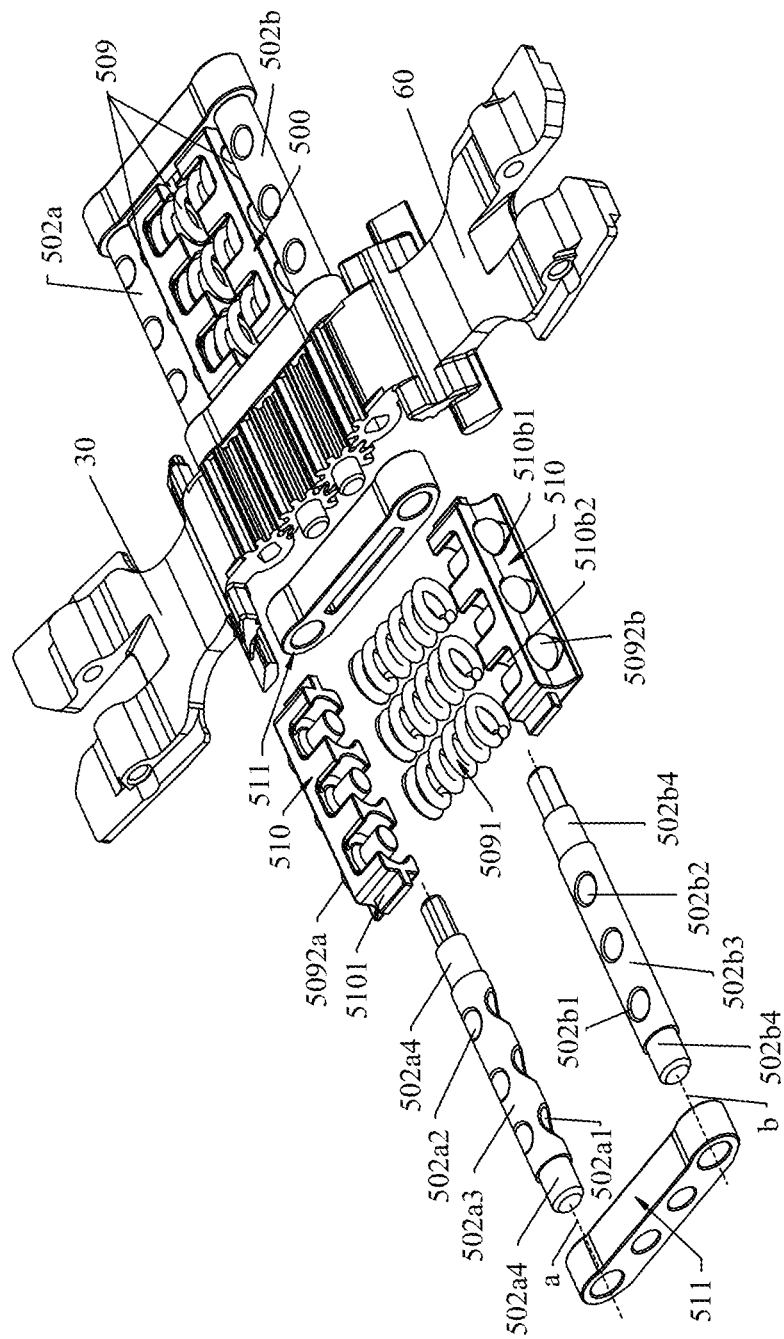
FIG. 37 is a schematic diagram of a partial structure of a rotation shaft structure according to another embodiment of this application.

FIG. 37 shows a schematic diagram of a structure of a damping assembly according to another embodiment. As mentioned in the foregoing description of the structure of the damping assembly, the first rotation assembly 30 may rotate around the rotation shaft 502a, and the second rotation assembly 60 may rotate around the rotation shaft 502b. In some embodiments of this application, the rotation shaft 502a includes a peripheral surface. The peripheral surface of the rotation shaft 502a is a surface that is of the rotation shaft 502a and that encircles an axis a of the rotation shaft 502a. The rotation shaft 502b includes a peripheral surface. The peripheral surface of the rotation shaft 502b is a surface that is of the rotation shaft 502b and that encircles an axis b of the rotation shaft 502b. In the embodiment shown in FIG. 36, the peripheral surface of the rotation shaft 502a and the peripheral surface of the rotation shaft 502b are arc surfaces. In other embodiments, the peripheral surface of the rotation shaft 502a and the peripheral surface of the rotation shaft 502b may alternatively be non-arc surfaces.

In addition, in this embodiment, the rotation shaft 502a may be fastened to the first rotation assembly 30. The rotation shaft 502b may be fastened to the second rotation assembly 60. The rotation shaft 502a and the rotation shaft 502b are spaced opposite to each other and may respectively rotate along with the first rotation assembly 30 and the second rotation assembly 60. A first stopper slot 502a1 is disposed in the peripheral surface of the rotation shaft 502a. A first stopper slot 502b1 is disposed in the peripheral surface of the rotation shaft 502b. When the first rotation assembly 30 includes the first driven arm 33 and the first swing arm 32, the second rotation assembly 60 includes the second driven arm 63 and the second swing arm 62, the first gear 401 is fastened to one end of the first driven arm 33, and the second gear 402 is fastened to one end of the second driven arm 63, the rotation shaft 502a may be fastened to the first gear 401, and the rotation shaft 502a may be fastened to the second gear 402.

In this embodiment, a disposing manner of the damping assembly 500 is different from that in the foregoing embodiment. Specifically, as shown in FIG. 36, the damping assembly 500 is disposed between the rotation shaft 502a and the rotation shaft 502b. The damping assembly 500 may include at least one damping group 509. In a possible embodiment, as shown in FIG. 37, each damping group 509 may include an elastic structural member 5091, a ball 5092a, and a ball 5092b. The ball 5092a is located at a first end 2111 of the elastic structural member 5091. The ball 5092a presses against the peripheral surface of the rotation shaft 502a under elastic force of the elastic structural member 5091. In addition, a second end 2112 that is of the elastic structural member 5091 and that is opposite to the first end 2111 is elastically connected to the peripheral surface of the rotation shaft 502b through the ball 5092b. In other words, the ball 5092b is located at the second end 2112 of the elastic structural member 5091. The ball 5092b presses against the peripheral surface of the rotation shaft 502b under elastic force of the elastic structural member 5091.

FIG. 37 shows a position relationship between the damping group 509 and both of the rotation shaft 502a and the rotation shaft 502b when the rotation shaft structure is in the flattened state. In a rotation process of the rotation shaft 502a and the rotation shaft 502b, the ball 5092a rolls relative to the peripheral surface of the rotation shaft 502a and can be positioned in the first stopper slot 502a1, and the ball 5092b rolls relative to the peripheral surface of the rotation shaft 502b and can be positioned in the second stopper slot 502b1, so that the first rotation assembly 30 and the second rotation assembly 60 are in the flattened state.

In another possible embodiment, the damping group 509 may include an elastic structural member 5091 and a ball 5092a. In this embodiment, the rotation shaft 502b may rotate along with the second rotation assembly 60. A principle In this embodiment is the same as the principle that the damping group 509 includes the elastic structural member 5091, the ball 5092a, and the ball 5092b. Specifically, the ball 5092a is located at the first end 2111 of the elastic structural member 5091. The ball 5092a presses against the peripheral surface of the rotation shaft 502a under elastic force of the elastic structural member 5091. The second end 2112 of the elastic structural member 5091 directly presses against the rotation shaft 502b. When the rotation shaft 502a and the rotation shaft 502b rotate, the ball 5092a rolls relative to the peripheral surface of the rotation shaft 502a and can be positioned in the first stopper slot 502a1, and the second end 2112 may slide relative to the peripheral surface of the rotation shaft 502b.

In another possible embodiment, the rotation shaft 502b may not rotate along with the second rotation assembly 60. A principle In this embodiment is different from the principle in an implementation scenario that the damping group 509 includes the elastic structural member 5091, the ball 5092a, and the ball 5092b. Specifically, the second end 2112 of the elastic structural member 5091 may be directly fastened to the rotation shaft 502b. When the rotation shaft 502a rotates, the rotation shaft 502b does not rotate, and the ball 5092a rolls relative to the peripheral surface of the rotation shaft 502a and can be positioned in the first stopper slot 502a1. When the rotation shaft 502b does not rotate, the rotation shaft 502b may be understood as a part of the housing, and an end that is of the elastic structural member 5091 and that is opposite to the ball 5092a is fastened to the housing of the rotation shaft structure.

It may be understood that, in the embodiment that the damping group 509 includes the two balls and the embodiment that the damping group 509 includes one ball, the balls have similar movement principles and connection relationships with respect to the rotation shaft 502a or the rotation shaft 502b. For example, the damping group 509 includes the elastic structural member 5091, the ball 5092a, and the ball 5092b.

In this embodiment of this application, the ball 5092a is stopped in the first stopper slot 502a1, the ball 5092b is stopped in the first stopper slot 502b1, and the first rotation assembly 30 and the second rotation assembly 60 are stopped when the first rotation assembly 30 and the second rotation assembly 60 are unfolded flat, so that the first rotation assembly 30 and the second rotation assembly 60 are in the flattened state. This improves user experience.

Figure 38:
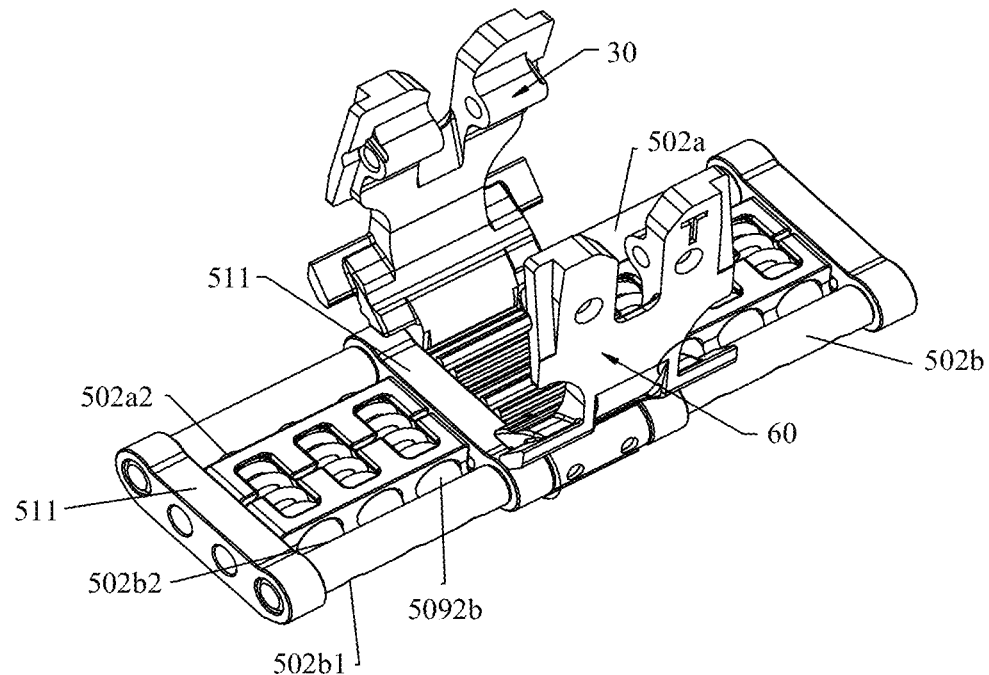
FIG. 38 is a schematic diagram of a partial structure of a rotation shaft structure according to another embodiment of this application.

Refer to FIG. 37 and FIG. 38. FIG. 38 is a schematic diagram of a structure of the rotation shaft structure 1000 shown in FIG. 37 in the closed state. In this embodiment of this application, the rotation shaft 502a may further include a third stopper slot 502a2. The third stopper slot 502a2 is disposed in a rotation direction of the rotation shaft 502a, and is spaced from the first stopper slot 502a1. In addition, the rotation shaft 502b includes a fourth stopper slot 502b2. The fourth stopper slot 502b2 is disposed in a rotation direction of the rotation shaft 502b and is spaced from the second stopper slot 502b1.

When the first rotation assembly 30 and the second rotation assembly 60 are folded, the ball 5092a is located in the third stopper slot 502a2, and the ball 5092b is located in the fourth stopper slot 502b2. The ball 5092a is stopped in the third stopper slot 502a2, the ball 5092b is stopped in the fourth stopper slot 502b2, and the first rotation assembly 30 and the second rotation assembly 60 are stopped when the first rotation assembly 30 and the second rotation assembly 60 are folded, so that the first rotation assembly 30 and the second rotation assembly 60 are in the closed state. This improves portability and improves user experience.

In one embodiment of this embodiment of this application, the first stopper slot 502a1, the second stopper slot 502b1, the third stopper slot 502a2, and the fourth stopper slot 502b2 are all spherical slots, and specifically ½ spherical slots, to respectively adapt to the ball 5092a and the ball 5092b. In this way, the ball better rolls in and rolls out of the stopper slot, so that the rotation shaft structure is more smoothly stopped. This improves user experience.

In another embodiment of this embodiment of this application, the first stopper slot 502a1, the second stopper slot 502b1, the third stopper slot 502a2, and the fourth stopper slot 502b2 may alternatively be ¾ or ¼ spherical slots, or the like. The first stopper slot 502a1, the second stopper slot 502b1, the third stopper slot 502a2, and the fourth stopper slot 502b2 may be cylindrical or in another shape. The first stopper slot 502a1, the second stopper slot 502b1, the third stopper slot 502a2, and the fourth stopper slot 502b2 may have a same shape or different shapes.

In this embodiment of this application, the elastic structural member 5091 is a spring or another elastic component other than a spring. Both the ball 5092a and the ball 5092b are steel balls or balls made of other materials than steel. The ball 5092a, the ball 5092b, and the elastic structural member 5091 have simple structures and are easy to process.

As shown in FIG. 37 and FIG. 38, the rotation shaft 502a includes both the first stopper slot 502a1 and the third stopper slot 502a2 and the rotation shaft 502b includes both the second stopper slot 502b1 and the fourth stopper slot 502b2. When the first housing 2000 and the second housing 3000 are switched from the closed state to the flattened state, the first rotation assembly 30 and the second rotation assembly 60 rotate against each other. The first rotation assembly 30 may drive the rotation shaft 502a to rotate synchronously. The second rotation assembly 60 may drive the rotation shaft 502b to rotate synchronously. In addition, the third stopper slot 502a2 rotates along with the rotation shaft 502a toward a position away from the ball 5092a, until the ball 5092a rolls out of the third stopper slot 502a2 and faces toward the first stopper slot 502a1. The ball 5092a is pushed by the elastic structural member 5091 into the first stopper slot 502a1 to be stopped. The fourth stopper slot 502b2 rotates along with the rotation shaft 502b against a position away from the ball 5092b, until the ball 5092b rolls out of the fourth stopper slot 502b2 and faces toward the second stopper slot 502b1. The ball 5092b is pushed by the elastic structural member 5091 into the second stopper slot 502b1 to be stopped. The first housing 2000 and the second housing 3000 are in the flattened state. In other words, when the first rotation assembly 30 and the second rotation assembly 60 are in the flattened state, the two opposite ends of the elastic structural member 5091 presses against the rotation shaft 502a and the rotation shaft 502b through the balls. The first rotation assembly 30 and the second rotation assembly 60 are respectively stopped by using the rotation shaft 502a and the rotation shaft 502b, to ensure force balance between the first rotation assembly 30 and the second rotation assembly 60, so that the first housing 2000 and the second housing 3000 are kept in the stable flattened state. This improves user experience. In addition, when the first housing 2000 and the second housing 3000 are almost in the flattened state, a part of the ball 5092a is aligned with the first stopper slot 502a1, and a part of the ball 5092b is aligned with the second stopper slot 502b1, the ball 5092a and the ball 5092b are in an unstable state. In this case, the ball 5092a and the ball 5092b are pushed by the elastic structural member 5091 to automatically enter the first stopper slot 502a1 and the second stopper slot 502b1 respectively, so that the first rotation assembly and the second rotation assembly 60 are unfolded flat, to implement automatic unfolding of the rotation shaft structure to an extent.

In addition, when the first housing 2000 and the second housing 3000 are switched from the flattened state to the closed state, the first rotation assembly 30 rotates relative to the second rotation assembly 60, the first rotation assembly 30 drives the rotation shaft 502a to rotate synchronously, and the second rotation assembly 60 drives the rotation shaft 502b to rotate synchronously. In addition, the first stopper slot 502a1 rotates along with the rotation shaft 502a toward a position away from the ball 5092a, until the ball 5092a rolls out of the first stopper slot 502a1 and faces toward the third stopper slot 502a2. The ball 5092a is pushed by the elastic structural member 5091 into the third stopper slot 502a2 to be stopped. The second stopper slot 502b1 rotates along with the rotation shaft 502b against a position away from the ball 5092b, until the ball 5092b rolls out of the second stopper slot 502b1 and faces toward the fourth stopper slot 502b2. The ball 5092b is pushed by the elastic structural member 5091 into the fourth stopper slot 502b2 to be stopped. The rotation shaft structure is switched to the closed state. In other words, when the first housing 2000 and the second housing 3000 are in the closed state, the first rotation assembly 30 and the second rotation assembly 60 are respectively stopped by using the rotation shaft 502a and the rotation shaft 502b, to ensure force balance between the first rotation assembly 30 and the second rotation assembly 60, so that the first housing 2000 and the second housing 3000 are kept in the stable closed state. This improves user experience. In addition, when the first housing 2000 and the second housing 3000 are almost in the closed state, a part of the ball 5092a is aligned with the third stopper slot 502a2, and a part of the ball 5092b is aligned with the fourth stopper slot 502b2. In this case, the ball 5092a and the ball 5092b are pushed by the elastic structural member 5091 to automatically enter the third stopper slot 502a2 and the fourth stopper slot 502b2 respectively, so that the first rotation assembly 30 and the second rotation assembly 60 are folded toward each other, to implement automatic closing of the rotation shaft structure to an extent.

Certainly, in another embodiment, the rotation shaft 502a and the rotation shaft 502b may further be provided with a plurality of stopper slots in the rotation directions of the rotation shaft 502a and the rotation shaft 502b, so that the rotation shaft structure 1000 may also be stopped in a folded state or an intermediate state between the closed state and the flattened state. For example, the first rotation assembly 30 and the second rotation assembly 60 may be stopped at an included angle of 15°, 45°, 75°, or 135°.

In one embodiment of this embodiment of this application, the rotation shaft 502a may include only the first stopper slot 502a1, and/or the rotation shaft 502b may include only the second stopper slot 502b1. The rotation shaft structure 1000 is stopped in the closed state by using another structure.

In this embodiment of this application, because the ball 5092a and the ball 5092b are spheres, in the rotation process of the rotation shaft 502a and the rotation shaft 502b, the ball 5092a is in small-area contact with the peripheral surface of the rotation shaft 502a, the first stopper slot 502a1, and the third stopper slot 502a2, and the ball 5092b is in small-area contact with the peripheral surface of the rotation shaft 502b, the second stopper slot 502b1, and the fourth stopper slot 502b2, which means small friction force. In this way, the ball 5092a rolls more smoothly among the peripheral surface of the rotation shaft 502a, the first stopper slot 502a1, and the third stopper slot 502a2, and the ball 5092b rolls more smoothly among the peripheral surface of the rotation shaft 502b, the second stopper slot 502b1, and the fourth stopper slot 502b2. This improves folding and unfolding experience of the rotation shaft structure.

In addition, in the rotation process of the first rotation assembly 30 and the second rotation assembly 60, the ball 5092a is little abraded when rolling among the peripheral surface of the rotation shaft 502a, the first stopper slot 502a1, and the third stopper slot 502a2, and the ball 5092b is little abraded when rolling among the peripheral surface of the rotation shaft 502b, the second stopper slot 502b1, and the fourth stopper slot 502b2. This effectively prolongs a service life of the damping assembly 500. In addition, when the ball 5092a enters the first stopper slot 502a1 or the third stopper slot 502a2 and the ball 5092b enters the second stopper slot 502b1 or the fourth stopper slot 502b2, the elastic structural member 5091 provides pushing force for the ball 5092a and the ball 5092b, to push the ball 5092a into the first stopper slot 502a1 or the third stopper slot 502a2 and to push the ball 5092b into the second stopper slot 502b1 or the fourth stopper slot 502b2. In this process, the user can sense a force change, to learn that the rotation shaft structure is in the flattened state or the closed state, namely that the first rotation assembly 30 and the second rotation assembly 60 are in the flattened state or the closed state. This improves user experience.

In this embodiment of this application, as shown in FIG. 37, the damping assembly 500 may further include positioning members 510. The positioning members 510 may be disposed between the ball 5092a and the elastic structural member 5091 and between the ball 5092b and the elastic structural member 5091, to ensure relative alignment between the elastic structural member 5091 and both of the ball 5092a and the ball 5092b. The positioning members 510 in this embodiment of this application have a plurality of implementations that are specifically as follows.

Figure 39:
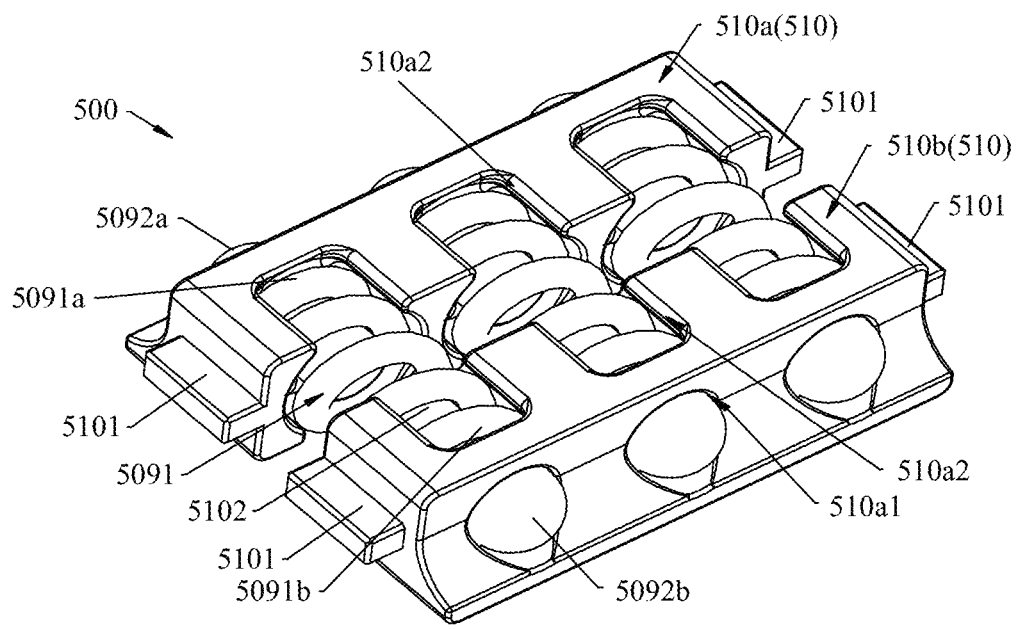
FIG. 39 is a schematic diagram of a structure of a damping assembly according to an embodiment of this application.

In a possible embodiment, refer to FIG. 38 and FIG. 39. FIG. 39 is a schematic diagram of a structure of a damping assembly of the rotation shaft structure shown in FIG. 38. The positioning members 510 may be disposed between the ball 5092a and the elastic structural member 5091 and between the ball 5092b and the elastic structural member 5091. Positioning slots 510a1 and positioning slots 510a2 may be respectively disposed in two opposite faces of the positioning member 510. For ease of distinguishing, the positioning member 510 disposed between the ball 5092a and the elastic structural member 5091 is denoted as a positioning member 510a, and the positioning member 510 disposed between the ball 5092b and the elastic structural member 5091 is denoted as a positioning member 510b. A part of the ball 5092a is accommodated in a positioning slot 510a1 of the positioning member 510a. A part of the first end 5091a of the elastic structural member 5091 is accommodated in a positioning slot 510a2 of the positioning member 510a. A part of the ball 5092b is accommodated in the positioning slot 510a1 of the positioning member 510b. A part of the second end 5091b of the elastic structural member 5091 is located in the positioning slot 510a2 of the positioning member 510b. In other words, the positioning member 510a is configured to position the ball 5092a and the elastic structural member 5091. The positioning member 510b is configured to position the ball 5092b and the elastic structural member 5091. To be specific, the positioning member 510 ensures relative alignment between the elastic structural member 5091 and both of the ball 5092a and the ball 5092b, and ensures that the elastic structural member 5091 can provide enough elastic force for the ball 5092a and the ball 5092b, so that the ball 5092a rolls from the peripheral surface of the rotation shaft 502a into the first stopper slot 502a1 to be stopped, the ball 5092b rolls from the peripheral surface of the rotation shaft 502b into the second stopper slot 502b1 to be stopped, or the ball 5092a and the ball 5092b roll out of the first stopper slot 502a1 and the second stopper slot 502b1 respectively to implement relative rotation of the first rotation assembly 30 and the second rotation assembly 60.

In another embodiment of this embodiment, the positioning member 510a may alternatively include only positioning slots 510a1. A part of the ball 5092a is accommodated in the positioning slot 510a1. The first end 5091a of the elastic structural member 5091 is connected to a side that is of the positioning member 510a and that is opposite to the positioning slot 510a1. The first end 5091a of the elastic structural member 5091 may be connected, in a connection manner such as bonding or clamping, to a side that is of the positioning member 510 and that is opposite to the positioning slot 510a1. Similarly, the positioning member 510b may alternatively include only positioning slots 510a1. A part of the ball 5092b is accommodated in the positioning slot 510a1. The second end 5091b of the elastic structural member 5091 is connected to a side that is of the positioning member 510b and that is opposite to the positioning slot 510a1. The second end 5091b of the elastic structural member 5091 may be connected, in a connection manner such as bonding or clamping, to a side that is of the positioning member 510b and that is opposite to the positioning slot 510a1.

Still as shown in FIG. 37 and FIG. 38, the positioning member 510 may further include positioning cradles 5102. The positioning cradle 5102 is disposed on a face that is of the positioning member 510 and that is opposite to the positioning slot 510a1. Specifically, the positioning cradle 5102 may be disposed in the positioning slot 510a2, and extends into the first end 5091a and/or the second end 5092b of the elastic structural member 5091. In other words, a slot wall of the positioning slot 510a2 is disposed around the positioning cradle 5102, and the positioning cradle 5102 is configured to fit the positioning slot 510a2 to position the first end 5091a and/or the second end 5092b of the elastic structural member 5091, to avoid deviation of the elastic structural member 5091, and ensure that the elastic structural member 5091 can provide enough elastic force for the ball 5092a and the ball 5092b, so that the ball 5092a rolls from the peripheral surface of the rotation shaft 502a into the first stopper slot 502a1 to be stopped, and the ball 5092b rolls from the peripheral surface of the rotation shaft 502b into the second stopper slot 502b1 to be stopped. Certainly, in another embodiment, the positioning member 510 may alternatively not include positioning cradles 5102.

As shown in FIG. 39, in this embodiment of this application, the positioning member 510 may further include sliders 5101. In the length direction of the main shaft structure, the sliders 5101 are disposed on two opposite sides of the positioning member 510.

Figure 40:
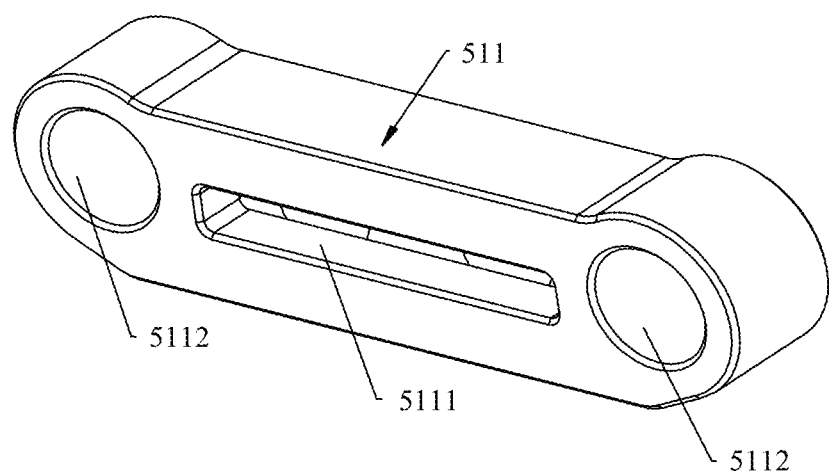
FIG. 40 is a schematic diagram of a structure of a clamping member according to an embodiment of this application.

In some embodiments of this application, as shown in FIG. 37 and FIG. 40, the damping assembly 500 may further include clamping members 511. FIG. 40 is a schematic diagram of a structure of the clamping member 511 of the rotation shaft structure shown in FIG. 37. There may be two clamping members 511. The two clamping members 511 are respectively disposed on two sides that are of the damping group 509 and that are in the length direction of the main shaft assembly. As shown in FIG. 38, two ends of the clamping member 511 are respectively connected to the rotation shaft 502a and the rotation shaft 502b, and the rotation shaft 502a and the rotation shaft 502b can rotate relative to the clamping member 511. In other words, there are two clamping members 511 between the rotation shaft 502a and the rotation shaft 502b that are opposite to each other. As shown in FIG. 40, in this embodiment of this application, the clamping member 511 includes a sliding slot 5111 and two via holes 5112 located on two sides of the sliding slot 5111.

As shown in FIG. 37, the rotation shaft 502a includes a body part 502a3. A first edge part 502a4 may be further disposed at each of two ends of the body part 502a3. The first stopper slot 502a1 is located in the body part 502a3. Similarly, the rotation shaft 502b includes a body part 502b3. A second edge part 502b4 may be further disposed at each of two ends of the body part 502b3. The second stopper slot 502b1 is located in the body part 502b3. The first edge part 502a4 of the rotation shaft 502a and the second edge part 502b4 of the rotation shaft 502b are respectively located in the via holes 5112 of the corresponding clamping member 511, to be limited by the clamping member 511.

In addition, the sliding slot 5111 of the clamping member 511 may accommodate the corresponding sliders 5101. In other words, the sliders 5101 extend into the sliding slot 5111 and fit the sliding slot 5111 of the clamping member 511. Therefore, the positioning members 510 maintain balanced during deformation of the elastic structural member 5091, so that the first rotation assembly 30 and the second rotation assembly 60 are well stopped. In another embodiment, there may alternatively be one or more sliders 5101. Alternatively, there may be one clamping member 511 disposed on one side of the positioning member 510. The clamping member 511 may alternatively be fastened between the rotation shaft 502a and the rotation shaft 502b in another manner such as bonding. Alternatively, the clamping member 511 may be connected to another component of the rotation shaft structure 1000 to implement limiting.

In addition, still as shown in FIG. 37, in some embodiments of this application, the first rotation assembly 30 and the second rotation assembly 60 may still be drivingly connected through the synchronization assembly 400, to implement synchronous rotation of the rotation shaft structure. In this embodiment, for a specific disposing manner of the synchronization assembly 400, refer to the foregoing embodiment. Details are not described herein again.

Figure 41:
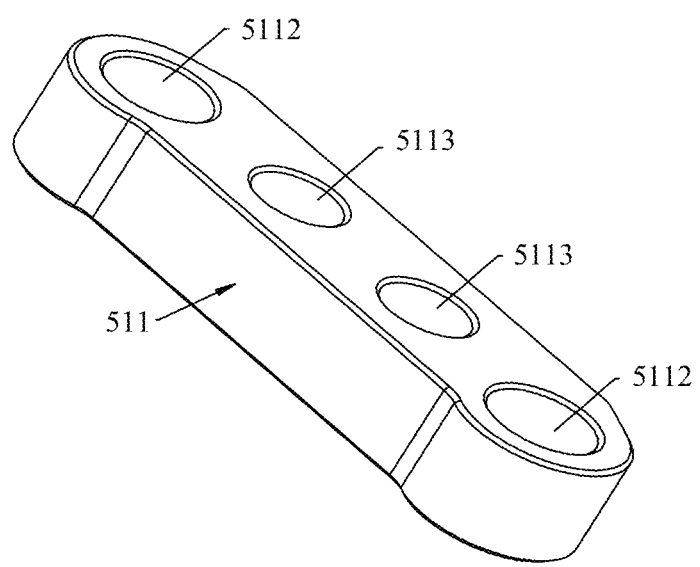
FIG. 41 is a schematic diagram of a structure of a clamping member according to another embodiment of this application.

Refer to FIG. 37 and FIG. 41. FIG. 41 is a schematic diagram of a structure of the clamping member shown in FIG. 40 from another angle. In this embodiment of this application, both bearings of the driven gears 403 of the synchronization assembly 400 may be in rolling fit with the clamping member 511 close to the bearings. During specific disposing, fastening holes 5113 may be disposed in a surface that is of the clamping member 511 and that faces toward the driven gears 403, and the bearings of the driven gears 403 are respectively located in the corresponding fastening holes 5113. In this application, while clamping the positioning members 510, the clamping member 511 may further fasten the driven gears 403, so that the driven gears 403 are more securely connected between the first rotation assembly 30 and the second rotation assembly 60, to help the first rotation assembly 30 and the second rotation assembly 60 rotate well. Certainly, in another implementation, the driven gears 403 may alternatively be fastened through another structure, for example, directly fastened to the main shaft assembly through a structure of the main shaft assembly.

Figure 42:
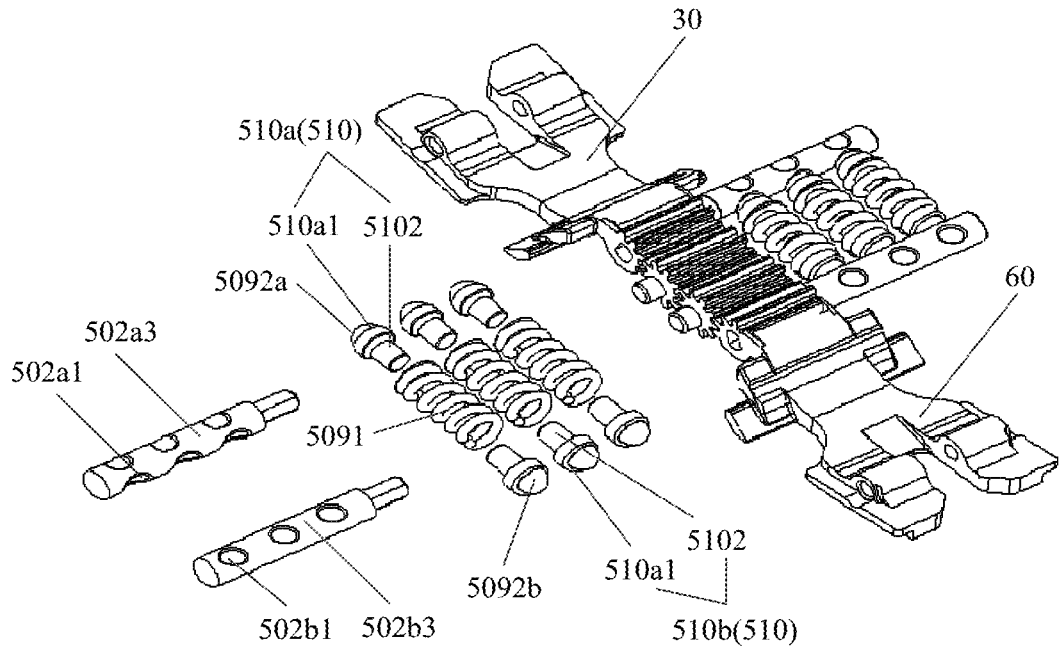
FIG. 42 is a schematic diagram of a partial structure of a rotation shaft structure according to another embodiment of this application.

In some embodiments of this application, in addition to the disposing manner in the foregoing embodiment, for the positioning member 510, refer to FIG. 42. FIG. 42 is a schematic diagram of a partial structure of another rotation shaft structure according to an embodiment of this application. In this embodiment, the positioning member 510 is disposed between the ball 5092a and the elastic structural member 5091 and between the ball 5092b and the elastic structural member 5091. The positioning member 510 may include a positioning slot 510a1 and a positioning cradle 5102. The positioning cradle 5102 is disposed on a face that is of the positioning member 510 and that is opposite to the positioning slot 510a1. For ease of distinguishing, the positioning member 510 disposed between the ball 5092a and the elastic structural member 5091 may be denoted as a positioning member 510a, and the positioning member 510 disposed between the ball 5092b and the elastic structural member 5091 may be denoted as a positioning member 510b. The first end 5091a of the elastic structural member 5091 is sleeved on a positioning cradle 5102 of the positioning member 510a. A part of the ball 5092a is accommodated in a positioning slot 510a1 of the positioning member 510a. The second end 5091b of the elastic structural member 5091 is sleeved on a positioning cradle 5102 of the positioning member 510b. A part of the ball 5092b is accommodated in a positioning slot 510a1 of the positioning member 510b. In other words, the positioning member 510 is configured to position the ball 5092a, the ball 5092b, and the elastic structural member 5091. To be specific, the positioning member 510 ensures relative alignment between the elastic structural member 5091 and both of the ball 5092a and the ball 5092b, and ensures that the elastic structural member 5091 can provide enough elastic force for the ball 5092a and the ball 5092b, so that the ball 5092a rolls from the peripheral surface of the rotation shaft 502a into the first stopper slot 502a1 to be stopped, the ball 5092b rolls from the peripheral surface of the rotation shaft 502b into the second stopper slot 502b1 to be stopped, or the ball 5092a and the ball 5092b roll out of the first stopper slot 502a1 and the second stopper slot 502b1 respectively to implement relative rotation of the first rotation assembly 30 and the second rotation assembly 60.

It may be understood that, in another implementation of this embodiment, the positioning member 510 is disposed only between the ball 5092a and the elastic structural member 5091, or the positioning member 510 is disposed only between the ball 5092b and the elastic structural member 5091. In still another implementation of this embodiment, a clamping member for fastening the positioning member 510 may be disposed, so that the positioning member 510 can be more stably clamped between the ball 5092a and the elastic structural member 5091, and/or between the ball 5092b and the elastic structural member 5091.

In the foregoing several implementations that describe the positioning member 510, the ball 5092a and the ball 5092b can respectively roll in the positioning slots 510a1 of the positioning member 510a and the positioning member 510b. Therefore, when the ball 5092a and the ball 5092b respectively roll relative to the peripheral surfaces of the rotation shaft 502a and the rotation shaft 502b, the ball 5092a and the ball 5092b also rotate, so that when the ball 5092a rolls relative to the peripheral surface of the rotation shaft 502a, the ball 5092a is in contact with the peripheral surface of the rotation shaft 502a at different positions on the peripheral surface of the rotation shaft 502a, and when the ball 5092b rolls relative to the peripheral surface of the rotation shaft 502b, the ball 5092b is in contact with the peripheral surface of the rotation shaft 502b at different positions on the peripheral surface of the rotation shaft 502b. Therefore, the ball 5092a and the ball 5092b respectively roll between the peripheral surfaces of the rotation shaft 502a and the rotation shaft 502b more smoothly. In addition, deformation of the ball 5092a and the ball 5092b caused by abrasion to only one place of the ball 5092a and the ball 5092b in a rolling process is avoided. This effectively prolongs a service life of the damping assembly 500.

In some possible embodiments of this application, when the positioning slot is not connected to the positioning slot, or the positioning member 510 shown in FIG. 42 includes the positioning slot 510a1 and the positioning cradle 5102, the ball 5092a and the ball 5092b may alternatively be respectively fastened to the positioning slots 510a1 of the positioning member 510a and the positioning member 510b. In other words, the ball 5092a and the ball 5092b cannot respectively roll in the positioning slots 510a1 of the positioning member 510a and the positioning member 510b. This can prevent the ball 5092a and the ball 5092b from being disengaged from the positioning slots 510a1 of the corresponding positioning members 510.

Figure 43:
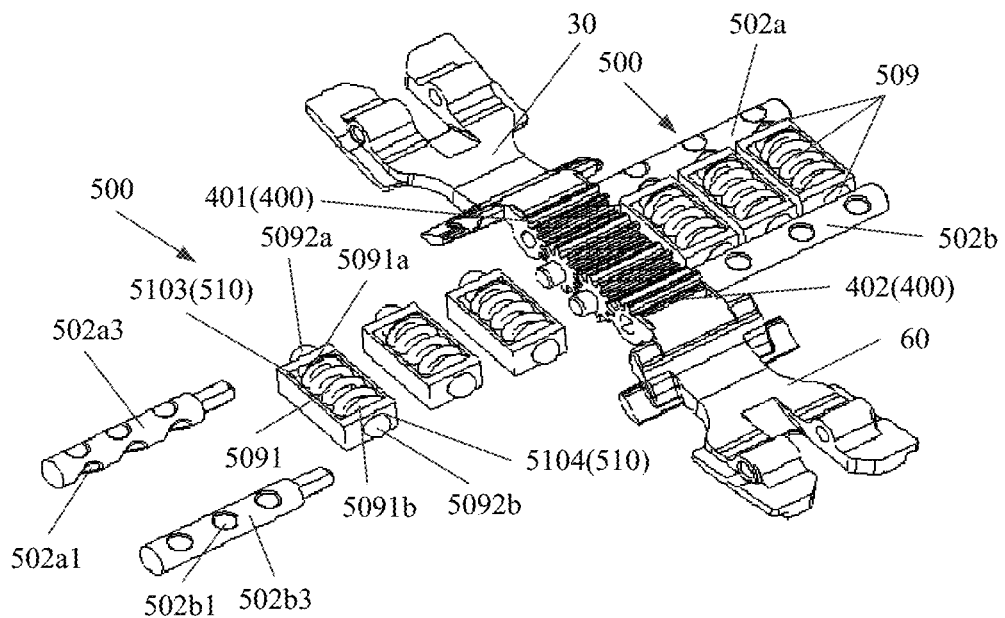
FIG. 43 is a schematic diagram of a partial structure of a rotation shaft structure according to another embodiment of this application.

In still another implementation, refer to FIG. 43. FIG. 43 is a schematic diagram of a partial structure of another rotation shaft structure according to an embodiment of this application. In this embodiment, the positioning member 510 of the damping assembly 500 may be in a form of a guide sleeve. An accommodation slot 5103 is disposed in the positioning member 510. Two opposite slot walls of the accommodation slot 5103 are each provided with a through hole 5104. The elastic structural member is accommodated in the accommodation slot 5103. The first end 5091a of the elastic structural member 5091 presses against the ball 5092a, a part of which is located in the through hole 5104. The second end 5091b of the elastic structural member 5091 presses against the ball 5092b a part, of which is located in the through hole 5104.

In this embodiment, the positioning member 510 may be configured to position the ball 5092a, the ball 5092b, and the elastic structural member 5091. The positioning member 510 ensures relative alignment between the elastic structural member 5091 and both of the ball 5092a and the ball 5092b, and ensures that the elastic structural member 5091 can provide enough elastic force for the ball 5092a and the ball 5092b, so that the ball 5092a rolls from the peripheral surface of the rotation shaft 502a into the first stopper slot 502a1 to be stopped, the ball 5092b rolls from the peripheral surface of the rotation shaft 502b into the second stopper slot 502b1 to be stopped, or the ball 5092a and the ball 5092b roll out of the first stopper slot 502a1 and the second stopper slot 502b1 respectively to implement relative rotation of the first rotation assembly 30 and the second rotation assembly 60.

Further, in this embodiment of this application, still as shown in FIG. 43, there may alternatively be a plurality of damping groups 509 in the damping assembly 500. Correspondingly, to adapt to a quantity of the damping groups 509, there may alternatively be a plurality of first stopper slots 502a1 and a plurality of second stopper slots 502b1. The plurality of first stopper slots 502a1 are disposed at intervals in an extension direction of the rotation shaft 502a, the plurality of second stopper slots 502b1 are disposed at intervals in an extension direction of the rotation shaft 502b, and the plurality of damping groups 509 are disposed at intervals corresponding to the plurality of first stopper slots 502a1 and the plurality of second stopper slots 502b1.

In the rotation process of the rotation shaft 502a and the rotation shaft 502b, the plurality of balls 5092a roll relative to the peripheral surface of the rotation shaft 502a and can be positioned in the corresponding first stopper slots 502a1, and the plurality of balls 5092b roll relative to the peripheral surface of the rotation shaft 502b and can be positioned in the corresponding second stopper slots 502b1. Correspondingly, there are a plurality of third stopper slots 502a2 and a plurality of fourth stopper slots 502b2 in a one-to-one correspondence to the plurality of damping groups 509. In this embodiment of this application, the plurality of damping groups 509 are disposed. Therefore, greater force can be provided for effective stopping of the first rotation assembly 30 and the second rotation assembly 60.

Still as shown in FIG. 40, In one embodiment of this embodiment of this application, the rotation shaft structure may include two damping assemblies 500. In the length direction of the main shaft assembly, the two damping assemblies 500 are respectively disposed on two sides of the synchronization assembly 400, and may be symmetrically disposed with respect to the synchronization assembly 400. In addition, in this embodiment of this application, the two rotation shafts 502a may alternatively be respectively connected to two oppositely disposed axial ends of the first gear 401. The two oppositely disposed axial ends of the first gear 401 are two ends of the first gear 401 in the axial direction. Similarly, the two rotation shafts 502b are respectively connected to two oppositely disposed axial ends of the second gear 402. The two oppositely disposed axial ends of the second gear 402 are two ends of the second gear 402 in the axial direction.

In addition, in this embodiment of this application, rotation directions of the rotation shaft 502a and the first gear 401 and rotation directions of the rotation shaft 502b and the second gear 402 may be limited, so that the rotation shaft 502a and the rotation shaft 502b respectively rotate along with the first rotation assembly 30 and the second rotation assembly 60. It may be understood that, in this application, to limit the rotation directions of the rotation shaft 502a and the first gear 401, a peripheral surface of an end of the rotation shaft 502a may be disposed as a non-arc surface, and a mounting hole that fits the non-arc surface is disposed in the first gear 401, so that the rotation directions are limited through fit between the non-arc surface and the mounting hole. Similarly, the rotation directions of the rotation shaft 502b and the second gear 402 may also be limited through fit between a non-arc surface and a mounting hole.

It may be understood that, in the foregoing embodiment, the rotation shaft 502a is detachably connected to the first gear 401, and the rotation shaft 502b is detachably connected to the second gear 402. This facilitates disassembly and assembly between structures. In some application scenarios of this application, the rotation shaft 502a may be fastened to an end of the first gear 401 and the rotation shaft 502b may be fastened to an end of the second gear 402 alternatively through but not limited to welding, bonding, or the like. This improves connection reliability of the structures.

In this embodiment of this application, the rotation shafts 502a and the rotation shafts 502b are respectively disposed on two sides of the first gear 401 and two sides of the second gear 402, so that the damping assemblies 500 disposed between the rotation shafts 502a and the opposite rotation shafts 502b keep balanced force on the two sides of the first gear 401 and the second gear 402.

It may be understood that the damping assembly 500 in this embodiment of this application may be used between the rotation shafts when the rotation assemblies on two sides are respectively rotationally connected to the main shaft assembly 100 in this embodiment of this application, and may also be used for another rotation shaft structure, provided that the rotation assemblies (for example, the housings and the rotation structural members) on the two sides rotate relative to a middle structure (for example, the main shaft assembly, the mounting brackets, or a base) in this embodiment of this application. Further, in addition to the foldable electronic device, the damping assembly 500 in this embodiment of this application may alternatively be used in any other scenario including two rotation shafts that are disposed in parallel and that rotate relative to each other, to meet a requirement of the rotation assemblies connected to the two rotation shafts for damping force in a rotation process.

In addition, in the foregoing embodiment, when the first rotation assembly 30 may include the first swing arm 32 and the first driven arm 33 and the second rotation assembly 60 includes the second swing arm 62 and the second driven arm 63, the first swing arm 32 may be fastened to the first gear 401, and the second swing arm 62 may be fastened to the second gear 402. Alternatively, the first driven arm 33 is fastened to the first gear 401, and the second driven arm 63 is fastened to the second gear 402. Certainly, the first gear 401 may alternatively be fastened to another possible structure of the first rotation assembly 30, and the second gear 402 may alternatively be fastened to another possible structure of the second rotation assembly 60. This is not specifically limited herein.

Figure 44:
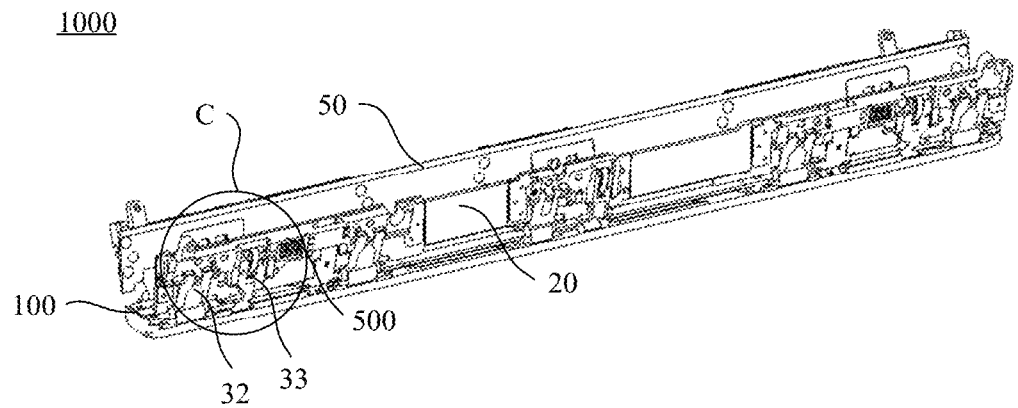
FIG. 44 is a schematic diagram of a structure of a rotation shaft structure according to another embodiment of this application.

In some embodiments of this application, the damping assembly 500 may be disposed on the main shaft assembly 100, or may be disposed on another part of the rotation shaft structure 1000. In a possible embodiment of this application, as shown in FIG. 44, when the first rotation assembly 30 of the rotation shaft structure 1000 includes the first swing arm 32 and the first driven arm 33, considering that the first driven arm 33 may slide relative to the first housing mounting bracket 20, damping force can be provided for sliding of the first driven arm 33, to implement damping effect or automatic suspending, unfolding and closing capabilities of the entire rotation shaft structure 1000.

Figure 45:
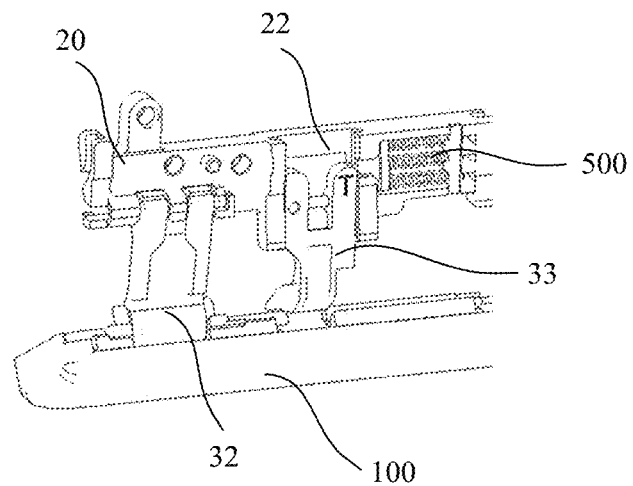
FIG. 45 is a schematic diagram of a partial structure of a rotation shaft structure according to another embodiment of this application.
Figure 46:
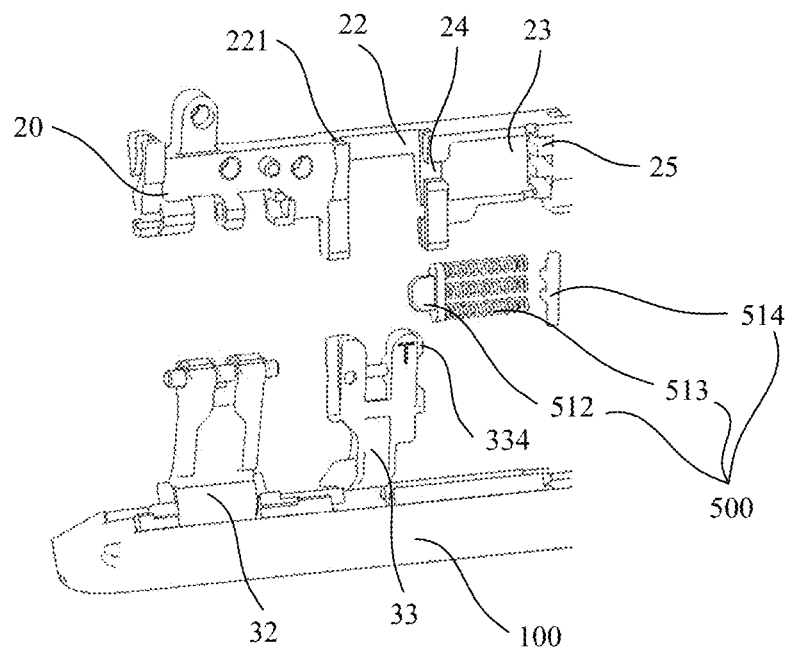
FIG. 46 is a schematic diagram of a partial structure of a rotation shaft structure according to another embodiment of this application.

During specific implementation, as shown in FIG. 45 and FIG. 46, a second sliding slot 23 is further disposed in the first housing mounting bracket 20, and the damping assembly 500 is disposed in the second sliding slot 23. As shown in FIG. 46, in the extending direction of the main shaft assembly 100, the second sliding slot 23 is disposed on one side of the first sliding slot 22, and the first sliding slot 22 is connected to the second sliding slot 23 through an opening 24.

Figure 47:
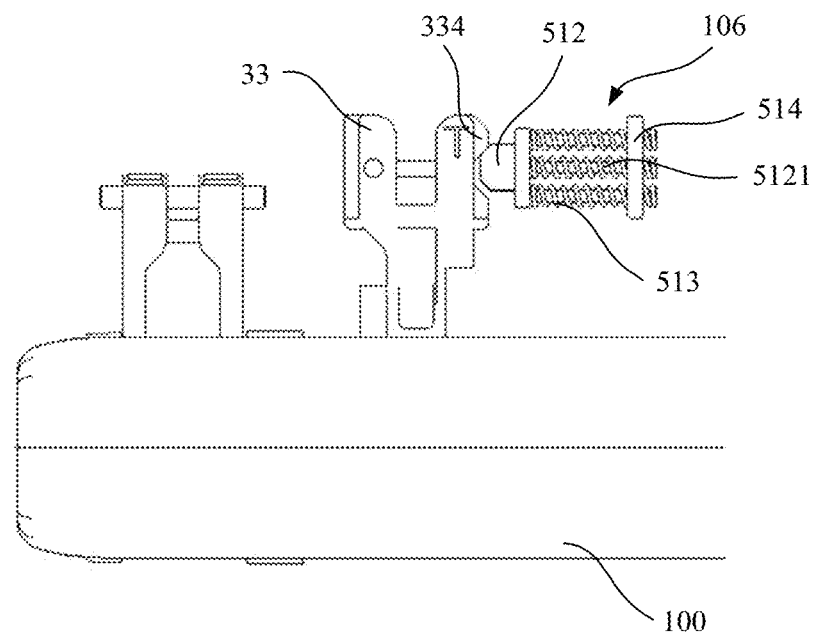
FIG. 47 is a schematic diagram of a partial structure of a rotation shaft structure according to another embodiment of this application.

When the damping assembly 500 is specifically disposed, as shown in FIG. 46 and FIG. 47, the damping assembly 500 may include a slider 512 and an elastic structural member 513. The slider 512 is inserted into the opening 24. The elastic structural member 513 is accommodated in the second sliding slot 23. One end of the elastic structural member 513 presses against a surface of the slider 512, and the other end presses against a slot wall of the second sliding slot 23. Under effect of elastic force of the elastic structural member 513, the slider 512 may slide along the opening 24 and extend into the first sliding slot 22.

In addition, still as shown in FIG. 47, it can be learned from the foregoing that the first driven arm 33 may slide along the first sliding slot 22. Therefore, a protrusion 334 may be disposed on a surface of a side that is of the first driven arm 33 and that faces toward the second sliding slot 23. When the slider 512 extends into the first sliding slot 22, the slider 512 may be clamped to the protrusion 334, so that the slider 512 prevents the first driven arm 33 from continuing to move along the second sliding slot 23. Therefore, the first housing mounting bracket 20 can be kept in a corresponding rotation position.

In some embodiments of this application, as shown in FIG. 47, there may be at least two protrusions 334 on the first driven arm 33, and the at least two protrusions 334 are disposed at intervals, so that when extending into the first sliding slot 22, the slider 512 may be clamped to at least one protrusion 334. This can effectively keep the first housing 2000 in a corresponding rotation position, and improve structural stability of the rotation shaft structure.

During specific implementation, when the first housing 2000 and the second housing 3000 are in the flattened state or the closed state, the slider 512 may be clamped between the two protrusions 334, so that the rotation shaft structure 1000 can be kept in the flattened state or the closed state. When the user operates the electronic device (for example, touches or presses the flexible display), the electronic device is not prone to be easily folded. This improves user experience. In addition, in some embodiments, when the rotation shaft structure 1000 is in the flattened state or the closed state, the slider 512 is not completely located between the two protrusions 334. In this case, the slider 512 and the protrusions 334 may make slope contact to generate damping force (may be clamped as described above), so that the rotation shaft structure 1000 is kept in the flattened state or the closed state.

For another example, when the first housing 2000 and the second housing 3000 are folded from the intermediate state to the flattened state or the closed state (namely when the slider 512 slides from top surface contact to slope contact with the protrusions 334), the slider 512 tends to slide to concave portions on one side of the protrusions 334. In this case, under an external force, the slider 512 and the protrusions 334 make slope contact to generate small damping force. The slider 512 continues to slide into the concave portions on one side of the protrusions 334 until a stable flattened state or closed state is reached, to implement automatic unfolding or closing of the rotation shaft structure 1000 and further implement automatic unfolding or closing of the electronic device.

When the first housing 2000 and the second housing 3000 are folded to the intermediate state, the rotation shaft structure 1000 is folded to the intermediate state. In this case, a top surface of the slider 512 may exactly press against a top surface of the protrusion 334. In this case, the elastic structural member 513 is compressed to a largest extent and generate largest damping force, so that the rotation shaft structure can suspend in the intermediate state of a specific angle, to prevent the electronic device with the rotation shaft structure from being randomly unfolded under external force. This can improve security of the electronic device. In addition, a quantity of the protrusions 334 may be adjusted based on a requirement for a suspending angle and a position of the intermediate state. For example, through a proper design, the protrusions 334 are disposed on the first housing mounting bracket 20 in rotation positions corresponding to included angles of 0°, 20°, 30°, 45°, 50°, 60°, 75°, and 90° between the first surface 2001 of the first housing 2000 and the support surface of the main shaft assembly 100, so that the first housing mounting bracket 20 can be kept in a corresponding rotation position when rotating around the main shaft assembly 100. This helps improve user experience.

In some other embodiments, when the first housing 2000 and the second housing 3000 are folded to the intermediate state, the slider 512 may be exactly clamped between the two protrusions 334, or the slider 512 and the protrusions 334 make slope contact to generate damping force, so that the rotation shaft structure 1000 is kept in the intermediate state.

It may be understood that when the slider 512 is clamped to the protrusion 334, action force is applied to the first housing mounting bracket 20, so that when the first housing mounting bracket 20 continues to rotate around the main shaft assembly 100, the first driven arm 33 continues to slide along the first sliding slot 22, and the slider 512 moves toward the second sliding slot 23 along the opening 24 under extrusion effect of the protrusion 334. In this case, the elastic structural member 513 is in a compressed state.

Figure 48:
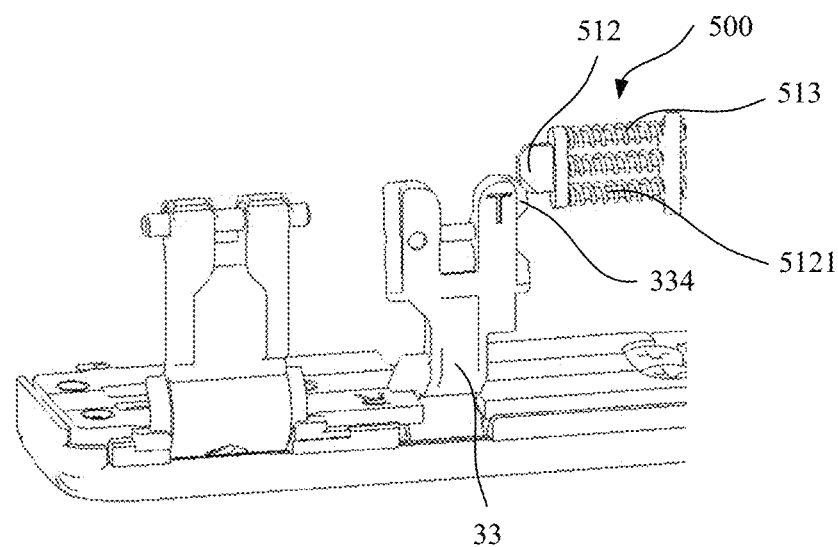
FIG. 48 is a schematic diagram of a partial structure of a rotation shaft structure according to another embodiment of this application.

In some other embodiments of this application, as shown in FIG. 48, the protrusion 334 may alternatively have a smooth surface. In this way, when the protrusion 334 and the slider 512 are extruded, if no force is further applied to the first housing mounting bracket 20, the slider 512 may slide along the surface of the protrusion 334 until the first housing mounting bracket 20 is kept in a rotation position, so that the slider 512 is exactly clamped between the two protrusions 334, or the slider 512 and the protrusions 334 make slope contact to generate damping force, so that the rotation shaft structure 1000 is kept in a stable unfolded state, closed state, or intermediate state. In this embodiment, a chamfer may alternatively be disposed on a surface of the slider 512, to provide a guiding function for relative sliding of the slider 512 and the protrusion 334. This helps reduce friction between the slider 512 and the protrusion 334. Certainly, the chamfer may alternatively be disposed on a surface of the protrusion 334. In addition, the slider 512 may alternatively have a smooth surface, to further reduce friction between the slider 512 and the protrusion 334. This reduces abrasion to the slider 512 and the protrusion 334, and helps prolong a service life of the slider 512 and the protrusion 334.

In a possible embodiment of this application, a surface of the protrusion 334 may alternatively be disposed as a spherical surface, and a surface that is of the slider 512 and that is in contact with the protrusion 334 may also be disposed as a spherical surface. In addition, when the protrusion 334 is specifically formed, for example, grooves may be disposed in a surface of the first driven arm 33, and a part between two adjacent grooves is used to form the protrusion 334; or the protrusion 334 is an independent structure, and is fastened to a specific position of the first driven arm 33 through bonding, welding, or the like.

As shown in FIG. 48, in some embodiments of this application, when the elastic structural member 513 is specifically disposed, the elastic structural member 513 may be but is not limited to a spring, a dome, or the like. When the elastic structural member 513 is a spring, a stopper cradle 5121 may alternatively be disposed on a surface of a side that is of the slider 512 and that faces toward the elastic structural member 513, so that the spring may be sleeved on the stopper cradle 5121, to prevent the spring from being disengaged from the second sliding slot 23 (as shown in FIG. 45). In addition, still as shown in FIG. 47, in this embodiment of this application, a quantity of springs is not limited, and may be selected based on an elasticity coefficient of the springs. For example, there may be at least two springs, to meet a requirement of the slider 512 for movement elastic force and improve structural stability of the damping assembly 500.

Still as shown in FIG. 46, the damping assembly 500 may further include a stopper 514. A stopper slot 25 may be further disposed in the first housing mounting bracket 20. In this way, the stopper 514 may be clamped to the stopper slot 25, to limit the slider 512 and the elastic structural member 513 in the second sliding slot 23, so that the damping assembly 500 is not disengaged from the first housing mounting bracket 20.

In a specific embodiment of this application, still as shown in FIG. 46 and FIG. 47, when the stopper cradle 5121 is disposed on the slider 512, the elastic structural member 513 is a spring, and the spring is sleeved on the stopper cradle 5121, the stopper cradle 5121 may be located between the stopper 514 and the stopper slot 25 after an assembly of the slider 512 and the spring is mounted in the second sliding slot 23. In addition, the stopper 514 is clamped to the stopper slot 25 to limit the stopper cradle 5121, so that the damping assembly 500 is fastened to the first housing mounting bracket 20.

It may be understood that, in this embodiment of this application, the first driven arm 33 and the damping assembly 500 are disposed in a one-to-one correspondence manner, and there may be one or at least two first driven arms 33 and one or at least two damping assemblies 500. As shown in FIG. 43, when there are at least two first driven arms 33 and at least two damping assemblies 500, the at least two first driven arms 33 and the at least two damping assemblies 500 may be disposed at intervals in the length direction of the main shaft assembly 100. This helps improve rotation reliability of the first housing mounting bracket 20 around the main shaft assembly.

In this embodiment of this application, the first folding assembly 200 and the second folding assembly 300 are symmetrically disposed with respect to the main shaft assembly 100, the first housing mounting bracket 20 and the second housing mounting bracket 50 have similar structures, and the first housing mounting bracket 20 and the second housing mounting bracket 50 are connected to the main shaft assembly 100 in similar manners, so that the second housing mounting bracket 50 may be disposed with reference to the disposing manner of the first housing mounting bracket 20 in the foregoing embodiment. Details about a structure of the second housing mounting bracket 50 and a connection manner between the second housing mounting bracket 50 and the main shaft assembly 100 are not described herein again. In addition, it can be learned from the foregoing that, in some embodiments, the first housing mounting bracket 20 and the first housing 2000 may be an integrated structure, and the second housing mounting bracket 50 and the second housing 3000 may be an integrated structure. Therefore, the damping assembly 500 in this embodiment of this application may alternatively be directly disposed on the first housing 2000 and the second housing 3000. A specific disposing manner is the same as a manner of disposing the damping assembly 500 on the first housing mounting bracket 20 and the second housing mounting bracket 50. Details are not described herein again.

Figure 49:
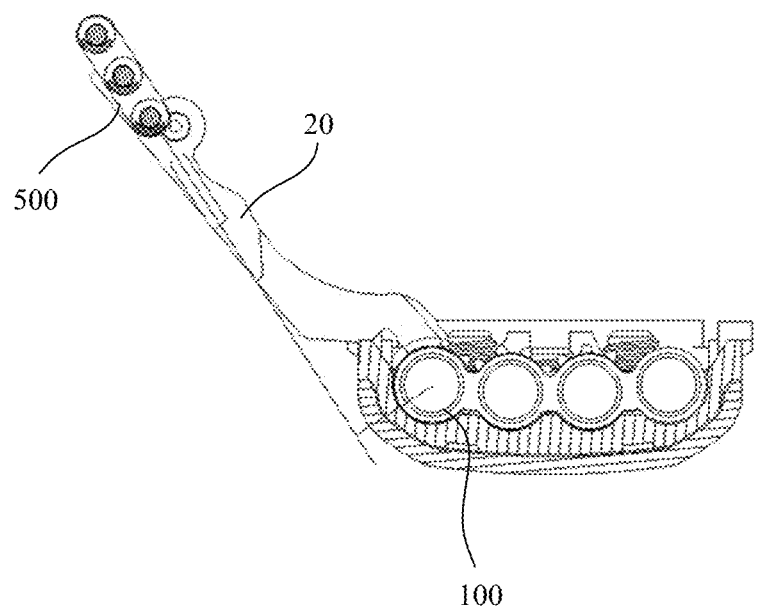
FIG. 49 is a schematic diagram of a partial structure of a rotation shaft structure according to another embodiment of this application.

According to the rotation shaft structure 1000 in this embodiment of this application, when the first housing mounting bracket 20 and the second housing mounting bracket 50 are in a rotation position (as shown in FIG. 44), as shown in FIG. 48, the slider 512 of the damping assembly 500 extends to the first sliding slot 22 (not shown in FIG. 48, as shown in FIG. 46) under effect of the elastic structural member 513, and is clamped to the protrusion 334 of the first driven arm 33, so that the first housing mounting bracket 20 and the second housing mounting bracket 50 are kept in the rotation position. When action force is applied to the first housing mounting bracket 20 (or the second housing mounting bracket 50) to rotate the first housing mounting bracket 20 (or the second housing mounting bracket 50) around the main shaft assembly 100, as shown in FIG. 49, the protrusions 334 extrude the slider 512, and the elastic structural member 513 is compressed. In this state, the slider 512 may freely slide along the surface of the protrusion 334 until being clamped to the protrusion 334, so that the first housing mounting bracket 20 (or the second housing mounting bracket 50) is in a stable state again. This can effectively improve structural stability of the rotation shaft structure 1000.

As shown in FIG. 49, in the rotation shaft structure 1000 in this embodiment of this application, the damping assembly 500 is disposed on the first housing mounting bracket 20 and the second housing mounting bracket 50. Compared with a solution in which the damping assembly 500 is disposed on the main shaft assembly 100, an arm of force of damping force between the damping assembly 500 and the first housing mounting bracket 20 in this embodiment of this application is large. Therefore, the damping assembly 500 can output large torque force in a narrow space, and the first housing mounting bracket 20 and the second housing mounting bracket 50 of the rotation shaft structure 1000 can be stably kept in a specific rotation position. In addition, the rotation shaft structure 1000 in this embodiment of this application can further meet an application scenario in which large torque force is required. In addition, because the damping assembly 500 in this embodiment of this application does not occupy space of the main shaft assembly 100, more space may be reserved for disposing other functional modules or parts in the main shaft assembly 100. This helps implement a diversified function design of the rotation shaft structure 1000.

The damping assembly 500 in this embodiment of this application may be used for the rotation shaft structure 1000 that includes the first driven arm 33 and that can slide relative to the first housing mounting bracket 20. It may be understood that when the rotation shaft structure 1000 is implemented in another form, provided that there are two structures that can slide relative to each other, the damping assembly 500 in this embodiment of this application may also be adaptive to provide same or similar effect. Further, the damping assembly 500 in this embodiment of this application may be used for the rotation shaft structure of the electronic device, and may also be used for any other scenario including two structures with a relative slidable connection relationship, to lock relative positions of the two slidably connected structures.

According to the electronic device in this application, when the first housing 2000 and the second housing 3000 are in the flattened state, the main shaft assembly 100, the first housing 2000, the first support plate 40, the second support plate 70, and the second housing 3000 may jointly provide a flat support surface for the flexible display 4000, to avoid a partial collapse problem of the flexible display 4000, and improve flatness of the flexible display 4000. When the first housing 2000 and the second housing 3000 are in the closed state, a specific angle is formed between the first support plate 40 and the second support plate 70. In this case, a triangle-like display accommodation space is formed among the first support plate 40, the second support plate 70, and the main shaft assembly 100. In addition, the region A of the flexible display 4000 is fastened to the first housing 2000, a part or all of the region B is fastened to the first support plate 40, a part or all of the region D is fastened to the second support plate 70, the region E is fastened to the second housing 3000, and the region C is not fastened to the main shaft assembly 100. In this way, when the first housing 2000 and the second housing 3000 are in the closed state, the bent portion of the flexible display 4000 is accommodated in the display accommodation space formed among the first support plate 40, the second support plate 70, and the main shaft assembly 100, and may be in a shape like a water drop. In this case, a curvature radius of the bent portion of the flexible display 4000 is large, and curvatures of the bent portion of the flexible display 4000 are more uniform. This can reduce creases of the flexible display 4000, and reduce a risk of bending damage to the flexible display 4000.

In addition, in this application, the track slots are disposed in the first support plate 40 and the second support plate 70, and the guide shafts are disposed on the corresponding rotation assemblies, to form the track control mechanism mentioned above. Therefore, track shapes of the track slots can be adjusted to control the movement tracks of the first support plate 40 and the second support plate 70, so that control precision of a movement process of the first support plate 40 and the second support plate 70 is high. This avoids a problem that the flexible display 4000 is stretched or extruded when the first support plate 40 and the second support plate 70 move along to an angle, and effectively reduces bending stress of the flexible display 4000.

The lap joint parts are respectively disposed on the first support plate 40, the second support plate 70, the main shaft assembly 100, the first rotation assembly 30, and the second rotation assembly 60. Through a linkage design of the corresponding lap joint parts, the anti-blocking mechanism mentioned above is formed, to prevent the first support plate 40 and the second support plate 70 from being stuck with another structure, and the first support plate 40 and the second support plate 70 can be folded and unfolded more smoothly and stably, so that the entire rotation shaft structure 1000 moves more stably and smoothly, and use effect is improved.

The rotation auxiliary assembly is the movement clearance elimination mechanism mentioned above, and may respectively apply, to the first support plate 40 and the second support plate 70, pulling force in a direction toward the housings on corresponding sides. In this way, when the rotation shaft structure 1000 is in the flattened state or the closed state, the pulling force can compensate for the angle deviation caused by the assembly clearance between the parts, so that the first support plate 40 and the second support plate 70 move to the specified position. Therefore, an included angle between the first support plate 40 and the second support plate 70 can meet a design requirement, a structure is simple, and performance is excellent.

In this application, to improve user experience of the electronic device, the rotation shaft structure 1000 may further include a synchronization assembly 400. The first folding assembly 200 and the second folding assembly 300 may be rotationally connected through the synchronization assembly 400. In this way, for example, when the user applies, to a housing on one side, rotational force relative to the main shaft assembly 100, the housing on the other side rotates synchronously in an opposite direction. This can improve user experience of folding and unfolding the electronic device. In addition, the synchronization assembly 400 is disposed on the main shaft assembly 100, so that the first housing 2000 and the second housing 3000 can apply uniform force to the flexible display 4000 when rotating toward or against each other, to reduce stretching force on the flexible display 4000.

The damping assembly 500 is disposed, so that the user has an obvious feeling on a folding or unfolding process of the electronic device. The damping assembly 500 herein is the damping mechanism mentioned above. In this application, the damping assembly 500 may be disposed in the main shaft assembly 100. For example, according to a damping design solution in which the first rotation assembly 30 and the second rotation assembly 60 are engaged with the two conjoined cams through the cam structures, enough damping force may be provided for the first rotation assembly 30 and the second rotation assembly 60 in the flattened state, closed state, and intermediate state, so that the first housing 2000 and the second housing 3000 can be kept in a stable state, to meet a use requirement of the user. In addition, in a relative rotation process of the first housing 2000 and the second housing 3000, the damping force applied by the damping assembly 500 to the first rotation assembly 30 and the second rotation assembly 60 may be felt as jerks by the user. This improves user experience.

In addition, according to a damping design solution in which the balls fit the ball slots of the end faces of the first rotation assembly 30 and the second rotation assembly 60, enough damping force may be provided for the first rotation assembly 30 and the second rotation assembly 60 in the flattened state, closed state, and intermediate state, so that a specific included angle is kept between the first surface 2001 of the first housing 2000 and the second surface 3001 of the second housing 3000. Further, both the ball 508 and the ball slot 404 that fits the ball 508 have regular spherical surfaces, which means small friction force between the damping assembly and the synchronization assembly 400 and little abrasion to the ball 508 and the ball slot 404. This can effectively prolong a service life of the damping assembly 500. In addition, because both the ball 508 and the ball slot 404 have regular curved surfaces, processing and inspection are easy.

According to a design solution of the damping assembly in which the damping group is in rolling fit with the rotation shafts of the first rotation assembly 30 and the second rotation assembly 60, when the first rotation assembly 30 and the second rotation assembly 60 rotate relative to each other, damping force may be applied to the two rotation shafts by using the damping group, and enough damping force may be provided for the first rotation assembly 30 and the second rotation assembly 60 in the flattened state, closed state, and intermediate state, so that a specific included angle is kept between the first surface 2001 of the first housing 2000 and the second surface 3001 of the second housing 3000, to meet a use requirement of the user. In addition, the damping force directly acts on the rotation shafts of the first rotation assembly 30 and the second rotation assembly 60, and the forces acting on the rotation shafts are equal. In this way, the forces on the two sides are balanced, so that the first rotation assembly 30 and the second rotation assembly 60 can move stably.

In addition, in a design solution in which the damping assembly 500 is disposed on the housing mounting bracket, an arm of force of damping force between the damping assembly 500 and the housing mounting bracket is large. Therefore, the damping assembly 500 can output large torque force in a narrow space, so that the first housing mounting bracket 20 and the second housing mounting bracket 50 of the rotation shaft structure 1000 can be stably kept in a specific rotation position. In addition, because the damping assembly 500 does not occupy space of the main shaft assembly 100, more space may be reserved for disposing other functional modules or parts in the main shaft assembly 100. This helps implement a diversified function design of the rotation shaft structure 1000.

The foregoing describes various implementation solutions of the foldable electronic device and the rotation shaft structure of the foldable electronic device in this application, and describes specific implementations of this application from various aspects such as core assemblies of the inward folding type electronic device and the rotation shaft structure of the inward folding type electronic device, the track control mechanism, the anti-blocking mechanism, the movement clearance elimination mechanism, the synchronization mechanism, and the damping mechanism. However, this does not limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A rotation shaft structure, comprising:
   a main shaft assembly;
   a first folding assembly comprising:
      a first housing mounting bracket,
      a first rotation assembly comprising a first swing arm and a first driven arm, wherein rotation axis centers of the first driven arm and the first swing arm on the main shaft assembly are parallel to each other and do not coincide with each other, wherein a first end of the first swing arm is rotationally connected to the main shaft assembly, and a second end of the first swing arm is rotationally connected to the first housing mounting bracket, and wherein a first end of the first driven arm is rotationally connected to the main shaft assembly, and a second end of the first driven arm is slidably connected to the first housing mounting bracket, and
      a first support plate rotationally connected to the first housing mounting bracket and slidably connected to the first swing arm or the first driven arm; and
   a second folding assembly comprising:
      a second housing mounting bracket,
      a second rotation assembly comprising a second swing arm and a second driven arm, wherein rotation axis centers of the second driven arm and the second swing arm on the main shaft assembly are parallel to each other and do not coincide with each other, wherein a first end of the second swing arm is rotationally connected to the main shaft assembly, and a second end of the second swing arm is rotationally connected to the second housing mounting bracket, wherein a first end of the second driven arm is rotationally connected to the main shaft assembly, and a second end of the second driven arm is slidably connected to the second housing mounting bracket, and
      a second support plate rotationally connected to the second housing mounting bracket and slidably connected to the second swing arm or the second driven arm,
   wherein the first folding assembly and the second folding assembly are disposed on two sides of the main shaft assembly,
   wherein, when the first housing mounting bracket and the second housing mounting bracket rotate toward each other, the first housing mounting bracket drives the first rotation assembly to rotate around the main shaft assembly, and the second housing mounting bracket drives the second rotation assembly to rotate around the main shaft assembly, wherein the first housing mounting bracket and the first swing arm stretch relative to the first driven arm, and the second housing mounting bracket and the second swing arm stretch relative to the second driven arm, to increase a length of the rotation shaft structure; wherein the first rotation assembly drives the first support plate to rotate in a same direction relative to the first housing mounting bracket, and the second rotation assembly drives the second support plate to rotate in a same direction relative to the second housing mounting bracket, so that when the first support plate and the second support plate rotate to a first position, the first support plate and the second support plate enclose a display accommodation space together with the main shaft assembly.

2. The rotation shaft structure according to claim 1, wherein, when the first housing mounting bracket and the second housing mounting bracket rotate against each other, the first housing mounting bracket drives the first rotation assembly to rotate around the main shaft assembly, and the second housing mounting bracket drives the second rotation assembly to rotate around the main shaft assembly, and wherein the first housing mounting bracket and the first swing arm contract relative to the first driven arm, and the second housing mounting bracket and the second swing arm contract relative to the second driven arm, to reduce a length of the rotation shaft structure; wherein the first rotation assembly drives the first support plate to rotate in a same direction relative to the first housing mounting bracket, and the second rotation assembly drives the second support plate to rotate in a same direction relative to the second housing mounting bracket, so that when the first support plate and the second support plate rotate to a second position, the first support plate, the second support plate, and the main shaft assembly are unfolded flat to form a support surface.

3. The rotation shaft structure according to claim 1, wherein a first circular arc groove is disposed in the first housing mounting bracket, wherein a first circular arc shaft is disposed on the first support plate, and wherein the first circular arc shaft is slidably disposed in the first circular arc groove, to implement a rotational connection between the first housing mounting bracket and the first support plate; and wherein a second circular arc groove is disposed in the second housing mounting bracket, wherein a second circular arc shaft is disposed on the second support plate, and wherein the second circular arc shaft is slidably disposed in the second circular arc groove, to implement a rotational connection between the second housing mounting bracket and the second support plate.

4. The rotation shaft structure according to claim 1, wherein a first guide structure is disposed on the first support plate, wherein a first track slot is disposed in the first guide structure, wherein a first guide shaft is disposed on the first swing arm, and wherein the first guide shaft is slidably connected to the first track slot; and wherein a second guide structure is disposed on the second support plate, wherein a second track slot is disposed in the second guide structure, wherein a second guide shaft is disposed on the second swing arm, and wherein the second guide shaft is slidably connected to the second track slot.

5. The rotation shaft structure according to claim 1, wherein a first guide structure is disposed on the first support plate, wherein a first track slot is disposed in the first guide structure, wherein a first guide shaft is disposed on the first driven arm, and wherein the first guide shaft is slidably connected to the first track slot; and wherein a second guide structure is disposed on the second support plate, wherein a second track slot is disposed in the second guide structure, wherein a second guide shaft is disposed on the second driven arm, and wherein the second guide shaft is slidably connected to the second track slot.

6. The rotation shaft structure according to claim 5, wherein a first end of the first driven arm slidably connected to the first support plate is recessed to form a first concave region, wherein a first end of the first guide shaft is connected to a first side of the first concave region, and a second end is connected to a second side of the first concave region; and a second end of the second driven arm slidably connected to the second support plate is recessed to form a second concave region, wherein a first end of the second guide shaft is connected to a first side of the second concave region, and a second end is connected to a second side of the second concave region.

7. The rotation shaft structure according to claim 5, wherein the first track slot and the second track slot are arc-shaped slots or straight slots.

8. The rotation shaft structure according to claim 1, wherein the first support plate is slidable relative to the first rotation assembly in a direction perpendicular to a rotation axis of the first rotation assembly, and wherein the second support plate is slidable relative to the second rotation assembly in a direction perpendicular to a rotation axis of the second rotation assembly.

9. The rotation shaft structure according to claim 1, wherein a third circular arc groove and a fourth circular arc groove are disposed in the main shaft assembly; and wherein a third circular arc shaft is disposed at a first end of the first swing arm, and a fourth circular arc shaft is disposed one a first end of the second swing arm; wherein the third circular arc shaft is disposed in the third circular arc groove, to implement a rotational connection between the first swing arm and the main shaft assembly; and wherein the fourth circular arc shaft is disposed in the fourth circular arc groove, to implement a rotational connection between the second swing arm and the main shaft assembly.

10. The rotation shaft structure according to claim 9, wherein the main shaft assembly comprises an inner housing and an outer housing, wherein two protrusions are disposed on the inner housing, wherein two recesses are disposed in the outer housing, wherein the outer housing and the inner housing are snap-fitted, and wherein the two protrusions and the two recesses are disposed in a one-to-one correspondence manner to form the third circular arc groove and the fourth circular arc groove.

11. The rotation shaft structure according to claim 1, wherein a first shaft hole is disposed in the first swing arm, wherein a second shaft hole is disposed in the first housing mounting bracket, and wherein the first shaft hole and the second shaft hole are connected through a pin shaft; and wherein a third shaft hole is disposed in the second swing arm, wherein a fourth shaft hole is disposed in the second housing mounting bracket, and wherein the third shaft hole and the fourth shaft hole are connected through a pin shaft.

12. The rotation shaft structure according to claim 1, wherein a first sliding slot is disposed in the first housing mounting bracket, wherein a first sliding rail is disposed on the first driven arm, and wherein the first sliding rail is slidably disposed in the first sliding slot; and wherein a second sliding slot is disposed in the second housing mounting bracket, wherein a second sliding rail is disposed on the second driven arm, and wherein the second sliding rail is slidably disposed in the second sliding slot.

13. The rotation shaft structure according to claim 1, wherein the rotation shaft structure further comprises a synchronization assembly drivingly connected to the first driven arm and the second driven arm, to implement synchronous opposite rotation between the first folding assembly and the second folding assembly.

14. The rotation shaft structure according to claim 13, wherein the synchronization assembly comprises a first gear and a second gear that are engaged with each other, wherein the first gear is fastened to a first end of the first driven arm, the second gear is fastened to a first end of the second driven arm, the first gear and the first driven arm rotate coaxially, and wherein the second gear and the second driven arm rotate coaxially.

15. The rotation shaft structure according to claim 14, wherein the synchronization assembly further comprises an even quantity of driven gears, and wherein the first gear and the second gear are drivingly connected through the even quantity of driven gears.

16. The rotation shaft structure according to claim 15, wherein the rotation shaft structure further comprises a damping assembly located in the main shaft assembly, wherein a first end of the damping assembly elastically presses against the first driven arm and the second driven arm, and wherein the damping assembly is configured to provide damping force when the first driven arm and the second driven arm rotate relative to each other.

17. An electronic device, comprising:
  a first housing;
  a second housing;
  a flexible display; and
  a rotation shaft structure comprising:
    a main shaft assembly, and
    a first folding assembly comprising
      a first housing mounting bracket,
      a first rotation assembly comprising a first swing arm and a first driven arm, wherein rotation axis centers of the first driven arm and the first swing arm on the main shaft assembly are parallel to each other and do not coincide with each other, wherein a first end of the first swing arm is rotationally connected to the main shaft assembly, and a second end of the first swing arm is rotationally connected to the first housing mounting bracket, and wherein a first end of the first driven arm is rotationally connected to the main shaft assembly, and a second end of the first driven arm is slidably connected to the first housing mounting bracket, and
      a first support plate rotationally connected to the first housing mounting bracket and slidably connected to the first swing arm or the first driven arm, and
    a second folding assembly comprising:
      a second housing mounting bracket,
      a second rotation assembly comprising a second swing arm and a second driven arm, wherein rotation axis centers of the second driven arm and the second swing arm on the main shaft assembly are parallel to each other and do not coincide with each other, wherein a first end of the second swing arm is rotationally connected to the main shaft assembly, and a second end of the second swing arm is rotationally connected to the second housing mounting bracket, wherein a first end of the second driven arm is rotationally connected to the main shaft assembly, and a second end of the second driven arm is slidably connected to the second housing mounting bracket, and
      a second support plate rotationally connected to the second housing mounting bracket and slidably connected to the second swing arm or the second driven arm,
    wherein the first folding assembly and the second folding assembly are disposed on two sides of the main shaft assembly,
    wherein, when the first housing mounting bracket and the second housing mounting bracket rotate toward each other, the first housing mounting bracket drives the first rotation assembly to rotate around the main shaft assembly, and the second housing mounting bracket drives the second rotation assembly to rotate around the main shaft assembly, and wherein the first housing mounting bracket and the first swing arm stretch relative to the first driven arm, and the second housing mounting bracket and the second swing arm stretch relative to the second driven arm, to increase a length of the rotation shaft structure; wherein the first rotation assembly drives the first support plate to rotate in a same direction relative to the first housing mounting bracket, and the second rotation assembly drives the second support plate to rotate in a same direction relative to the second housing mounting bracket, so that when the first support plate and the second support plate rotate to a first position, the first support plate and the second support plate enclose a display accommodation space together with the main shaft assembly; and
    wherein the first housing mounting bracket is fastened to the first housing, wherein the second housing mounting bracket is fastened to the second housing, wherein the first housing comprises a first surface, wherein the second housing comprises a second surface, wherein the flexible display continuously covers the first surface of the first housing, wherein the rotation shaft structure, and the second surface of the second housing, and the flexible display is respectively fastened to the first surface of the first housing and the second surface of the second housing.

18. The electronic device according to claim 17, wherein the flexible display comprises a first region, a second region, a third region, a fourth region, and a fifth region that are consecutively disposed, wherein the first region is fastened to the first surface of the first housing, wherein the second region is fastened to a surface that is of the first support plate and that faces toward the flexible display, wherein the third region is disposed opposite to the main shaft assembly, wherein the third region is movable relative to the main shaft assembly, wherein the fourth region is fastened to a surface that is of the second support plate and that faces toward the flexible display, and wherein the fifth region is fastened to the second surface of the second housing.

19. The electronic device according to claim 17, wherein a rotation axis center of the first support plate relative to the first housing mounting bracket is at a distance of a predetermined height from the flexible display, and a rotation axis center of the second support plate relative to the second housing mounting bracket is at a distance of a predetermined height from the flexible display.

20. The electronic device according to claim 17, wherein when the first housing mounting bracket and the second housing mounting bracket rotate against each other, the first housing mounting bracket drives the first rotation assembly to rotate around the main shaft assembly, and the second housing mounting bracket drives the second rotation assembly to rotate around the main shaft assembly, and wherein the first housing mounting bracket and the first swing arm contract relative to the first driven arm, and wherein the second housing mounting bracket and the second swing arm contract relative to the second driven arm, to reduce a length of the rotation shaft structure; wherein the first rotation assembly drives the first support plate to rotate in a same direction relative to the first housing mounting bracket, and wherein the second rotation assembly drives the second support plate to rotate in a same direction relative to the second housing mounting bracket, so that when the first support plate and the second support plate rotate to a second position, the first support plate, the second support plate, and the main shaft assembly are unfolded flat to form a support surface.

21. The electronic device according to claim 17, wherein a first circular arc groove is disposed in the first housing mounting bracket, wherein a first circular arc shaft is disposed on the first support plate, and wherein the first circular arc shaft is slidably disposed in the first circular arc groove, to implement a rotational connection between the first housing mounting bracket and the first support plate; and a second circular arc groove is disposed in the second housing mounting bracket, wherein a second circular arc shaft is disposed on the second support plate, and wherein the second circular arc shaft is slidably disposed in the second circular arc groove, to implement a rotational connection between the second housing mounting bracket and the second support plate.

22. The electronic device according claim 21, wherein the first support plate has a first surface disposed toward the flexible display and a second surface disposed opposite to the first surface; wherein the second support plate has a third surface disposed toward the flexible display, and a fourth surface disposed opposite to the third surface; wherein the first surface and the third surface are configured to support the flexible display;

wherein the first circular arc shaft disposed on the second surface of the first support plate and the second circular arc shaft disposed on the fourth surface of the second support plate.

23. The electronic device according to claim 17, wherein a first guide structure is disposed on the first support plate, wherein a first track slot is disposed in the first guide structure, wherein a first guide shaft is disposed on the first swing arm, and wherein the first guide shaft is slidably connected to the first track slot; and wherein a second guide structure is disposed on the second support plate, wherein a second track slot is disposed in the second guide structure, wherein a second guide shaft is disposed on the second swing arm, and wherein the second guide shaft is slidably connected to the second track slot.

24. The electronic device according to claim 17, wherein a first guide structure is disposed on the first support plate, wherein a first track slot is disposed in the first guide structure, wherein a first guide shaft is disposed on the first driven arm, and wherein the first guide shaft is slidably connected to the first track slot; and wherein a second guide structure is disposed on the second support plate, wherein a second track slot is disposed in the second guide structure, wherein a second guide shaft is disposed on the second driven arm, and wherein the second guide shaft is slidably connected to the second track slot.

25. The electronic device according to claim 24, wherein a first end of the first driven arm slidably connected to the first support plate is recessed to form a first concave region, wherein a first end of the first guide shaft is connected to a first side of the first concave region, and a second end is connected to a second side of the first concave region; and wherein a first end of the second driven arm slidably connected to the second support plate is recessed to form a second concave region, wherein a first end of the second guide shaft is connected to a first side of the second concave region, and a second end is connected to a second side of the second concave region.

26. The electronic device according claim 24, wherein the first support plate has a first surface disposed toward the flexible display and a second surface disposed opposite to the first surface; wherein the second support plate has a third surface disposed toward the flexible display, and wherein a fourth surface disposed opposite to the third surface; wherein the first surface and the third surface are configured to support the flexible display;

wherein the first guide structure disposed on the second surface of the first support plate and the second guide structure disposed on the fourth surface of the second support plate.

27. The electronic device according to claim 17, wherein a third circular arc groove and a fourth circular arc groove are disposed in the main shaft assembly; and wherein a third circular arc shaft is disposed at a first end of the first swing arm, and a fourth circular arc shaft is disposed at a first end of the second swing arm; wherein the third circular arc shaft is disposed in the third circular arc groove, to implement a rotational connection between the first swing arm and the main shaft assembly; and wherein the fourth circular arc shaft is disposed in the fourth circular arc groove, to implement a rotational connection between the second swing arm and the main shaft assembly.

28. The electronic device according to claim 27, wherein the main shaft assembly comprises an inner housing and an outer housing, wherein two protrusions are disposed on the inner housing, wherein two recesses are disposed in the outer housing, wherein the outer housing and the inner housing are snap-fitted, and wherein the two protrusions and the two recesses are disposed in a one-to-one correspondence manner to form the third circular arc groove and the fourth circular arc groove.

29. The electronic device according to claim 17, wherein a first shaft hole is disposed in the first swing arm, wherein a second shaft hole is disposed in the first housing mounting bracket, and wherein the first shaft hole and the second shaft hole are connected through a pin shaft; and wherein a third shaft hole is disposed in the second swing arm, wherein a fourth shaft hole is disposed in the second housing mounting bracket, and wherein the third shaft hole and the fourth shaft hole are connected through a pin shaft.

30. The electronic device according to claim 17, wherein a first sliding slot is disposed in the first housing mounting bracket, wherein a first sliding rail is disposed on the first driven arm, and wherein the first sliding rail is slidably disposed in the first sliding slot; and wherein a second sliding slot is disposed in the second housing mounting bracket, wherein a second sliding rail is disposed on the second driven arm, and wherein the second sliding rail is slidably disposed in the second sliding slot.

* * * * *

UNITED STATES PATENT AND TRADEMARK OFFICE
CERTIFICATE OF CORRECTION

PATENT NO. : 12,047,521 B2
APPLICATION NO. : 17/837965
DATED : July 23, 2024
INVENTOR(S) : Changliang Liao et al.

It is certified that error appears in the above-identified patent and that said Letters Patent is hereby corrected as shown below:

In the Claims

In Claim 9, Column 92, Line 29, delete "disposed one a first end" and insert --disposed at a first end--.

Signed and Sealed this
Eighth Day of October, 2024

Katherine Kelly Vidal
*Director of the United States Patent and Trademark Office*